United States Patent
You et al.

(10) Patent No.: US 12,323,954 B2
(45) Date of Patent: Jun. 3, 2025

(54) METHOD AND DEVICE FOR OPERATION OF IAB NODE IN SITUATION IN WHICH MULTIPLE PARENT NODES ARE CONNECTED TO SINGLE IAB NODE

(71) Applicant: LG ELECTRONICS INC., Seoul (KR)

(72) Inventors: Hyangsun You, Seoul (KR); Hyunsoo Ko, Seoul (KR); Joonkui Ahn, Seoul (KR); Haewook Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 336 days.

(21) Appl. No.: 17/905,378

(22) PCT Filed: Mar. 16, 2021

(86) PCT No.: PCT/KR2021/003234
§ 371 (c)(1),
(2) Date: Aug. 31, 2022

(87) PCT Pub. No.: WO2021/187863
PCT Pub. Date: Sep. 23, 2021

(65) Prior Publication Data
US 2023/0126621 A1     Apr. 27, 2023

(30) Foreign Application Priority Data
Mar. 16, 2020 (KR) .................. 10-2020-0031800
Mar. 30, 2020 (KR) .................. 10-2020-0038148

(51) Int. Cl.
*H04W 72/044* (2023.01)
*H04W 36/18* (2009.01)
*H04W 84/04* (2009.01)

(52) U.S. Cl.
CPC ....... *H04W 72/044* (2013.01); *H04W 36/185* (2023.05); *H04W 84/047* (2013.01)

(58) Field of Classification Search
None
See application file for complete search history.

(56) References Cited

U.S. PATENT DOCUMENTS

2019/0350023 A1   11/2019   Novlan et al.
2019/0373627 A1   12/2019   Luo et al.
(Continued)

FOREIGN PATENT DOCUMENTS

KR   10-2020-0016817    2/2020
WO   2019-194737    10/2019

OTHER PUBLICATIONS

Korean Intellectual Property Office Application No. 10-2022-7026171, Notice of Allowance dated Oct. 5, 2023, 3 pages.
(Continued)

*Primary Examiner* — Hassan A Phillips
*Assistant Examiner* — Gautam Sharma
(74) *Attorney, Agent, or Firm* — LEE, HONG, DEGERMAN, KANG & WAIMEY

(57) ABSTRACT

The present specification proposes a method for an operation of preventing a collision of resources and a method for an operation of an IAB node at the time of occurrence of a collision of resources and/or timing misalignment in a case in which multiple parent nodes are connected to a single IAB node.

12 Claims, 54 Drawing Sheets

(56) References Cited

U.S. PATENT DOCUMENTS

| | | | | |
|---|---|---|---|---|
| 2022/0110112 | A1* | 4/2022 | Wei | H04W 72/0453 |
| 2022/0159642 | A1* | 5/2022 | Liu | H04W 72/20 |
| 2022/0159676 | A1* | 5/2022 | Wei | H04W 72/0446 |
| 2022/0182977 | A1* | 6/2022 | Miao | H04W 72/51 |
| 2022/0191893 | A1* | 6/2022 | Miao | H04B 7/15542 |
| 2022/0278741 | A1* | 9/2022 | Dahlman | H04B 7/15542 |
| 2022/0295456 | A1* | 9/2022 | Liu | H04W 92/20 |
| 2022/0338173 | A1* | 10/2022 | Zheng | H04W 72/0446 |

OTHER PUBLICATIONS

Ericsson, "IAB resource configuration and multiplexing," R1-1906588, 3GPP TSG-RAN WG1 Meeting #97, May 2019, 9 pages.

LG Electronics, "Discussions on IAB resource multiplexing enhancements," R1-2100717, 3GPP TSG RAN WG1 #104-e, e-Meeting, Feb. 2021, 9 pages.

LG Electronics, "Discussions on resource multiplexing among backhaul and access links," R1-1900614, 3GPP TSG RAN WG1 Ad-hoc Meeting 1901, Jan. 2019, 5 pages.

Huawei et al., "Resource multiplexing between backhaul and access in IAB," R1-1903938, 3GPP TSG RAN WG1 Meeting #96bis, Apr. 2019, 12 pages.

Ericsson, "IAB resource configuration and coordination," R1-1904834, 3GPP TSG-RAN WG1 Meeting #96bis, Apr. 2019, 7 pages.

Huawei et al., "Resource multiplexing between backhaul and access in IAB," R1-1908036, 3GPP TSG RAN WG1 Meeting #98, Aug. 2019, 8 pages.

Ericsson, "IAB resource configuration and multiplexing," R1-1909026, 3GPP TSG-RAN WG1 Meeting #98, Aug. 2019, 11 pages.

CMCC, "Discussion on resource multiplexing among backhaul and access links," R1-1912533, 3GPP TSG RAN WG1 #99, Nov. 2019, 9 pages.

Qualcomm Incorporated, "(TP for NR_IAB BL CR to TS 38.473) F1AP—PHY layer configuration," R3-200415, 3GPP TSG-RAN WG3 Meeting #107-e, Electronic Meeting, Mar. 2020, 70 pages.

PCT International Application No. PCT/KR2021/003234, International Search Report dated Jun. 23, 2021, 4 page.

Intel Corporation, "Mechanisms for Resource Multiplexing among Backhaul and Access links," R1-1912202, 3GPP TSG RAN WG1 #99, Nov. 2019, 7 pages.

Huawei, "BL CR to 38.401 Support for IAB," R3-201287, 3GPP TSG RAN WG3 Meeting #107-e, E-meeting, Mar. 2020, 19 pages.

Qualcomm (Rapporteur), "CR to 38.300 on Integrated Access and Backhaul for NR," R2-2002407, 3GPP TSG-RAN WG2 Meeting #109-e, E-meeting, Mar. 2020, 18 pages.

Japan Patent Office Application No. 2022-555828, Office Action dated Jul. 4, 2023, 2 pages.

Qualcomm Incorporated, "Updated IAB resource management framework," R1-1905006, 3GPP TSG RAN WG1 Meeting #96bis, Apr. 2019, 8 pages.

European Patent Office Application Serial No. 21772074.7 Search Report dated Mar. 19, 2024, 12 pages.

Nokia et al., "Mechanisms for resource multiplexing among backhaul and access links," R1-1911194, 3GPP TSG RAN WG1 Meeting #98bis, Oct. 2019, 14 pages.

Qualcomm Incorporated, "Updated IAB Resource Management Framework," R1-1907267, 3GPP TSG RAN WG1 Meeting #97, May 2019, 7 pages.

LG Electronics, "Discussions on access and backhaul link multiplexing and timing," R1-1812566, 3GPP TSG RAN WG1 Meeting #95, Nov. 2018, 5 pages.

* cited by examiner

METHOD AND DEVICE FOR OPERATION OF IAB NODE IN SITUATION IN WHICH MULTIPLE PARENT NODES ARE CONNECTED TO SINGLE IAB NODE

CROSS-REFERENCE TO RELATED APPLICATION(S)

This application is the National Stage filing under 35 U.S.C. 371 of International Application No. PCT/KR2021/003234, filed on Mar. 16, 2021, which claims the benefit of earlier filing date and right of priority to Korean Application Nos. 10-2020-0031800, filed on Mar. 16, 2020, and 10-2020-0038148, filed on Mar. 30, 2020, the contents of which are all hereby incorporated by reference herein in their entireties.

BACKGROUND OF THE DISCLOSURE

Field of the Disclosure

This disclosure relates to wireless communication.

Related Art

One potential technology aimed at enabling future cellular network deployment scenarios and applications is support for wireless backhaul and relay links. This enables flexible and highly dense deployment of NR cells without the need to proportionally densify the transport network.

It is expected that greater bandwidth in NR compared to LTE with the native deployment of massive MIMO or multi-beam systems will be available. Thus (e.g., mmWave spectrum) creates opportunities for the development and deployment of integrated access and backhaul links. This makes it easier for a deployment of a dense network of self-backhauled NR cells in a more integrated manner by establishing multiple control and data channels/procedures defined to provide access or access to the terminals. Such systems are referred to as integrated access and backhaul links (IAB).

SUMMARY OF THE DISCLOSURE

The present specification proposes an operation method for preventing resource collision when a plurality of parent nodes are connected to one IAB node, and a method for operating an IAB node when resource collision and/or timing misalignment occurs.

According to the present specification, when a plurality of parent nodes are connected to one IAB node, communication between IAB nodes can be efficiently performed without resource collision, and even when resource collision occurs, a guard symbol is set.

Effects that can be obtained through specific examples of the present specification are not limited to the effects listed above. For example, various technical effects that a person having ordinary skill in the related art can understand or derive from this specification may exist. Accordingly, the specific effects of the present specification are not limited to those explicitly described herein, and may include various effects that can be understood or derived from the technical characteristics of the present specification.

BRIEF DESCRIPTION OF THE DRAWINGS

The following drawings were created to explain a specific example of the present specification. Since the names of specific devices described in the drawings or the names of specific signals/messages/fields are presented by way of example, the technical features of the present specification are not limited to the specific names used in the following drawings.

FIG. 25 shows timing alignment case 1.

FIG. 26 shows timing alignment case 6.

FIG. 27 shows timing alignment case 7.

DESCRIPTION OF EXEMPLARY EMBODIMENTS

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDCCH" may be proposed as an example of the "control information". In addition, when indicated as "control information (i.e., PDCCH)", it may also mean that "PDCCH" is proposed as an example of the "control information".

Technical features described individually in one figure in the present specification may be individually implemented, or may be simultaneously implemented.

Figure 1:
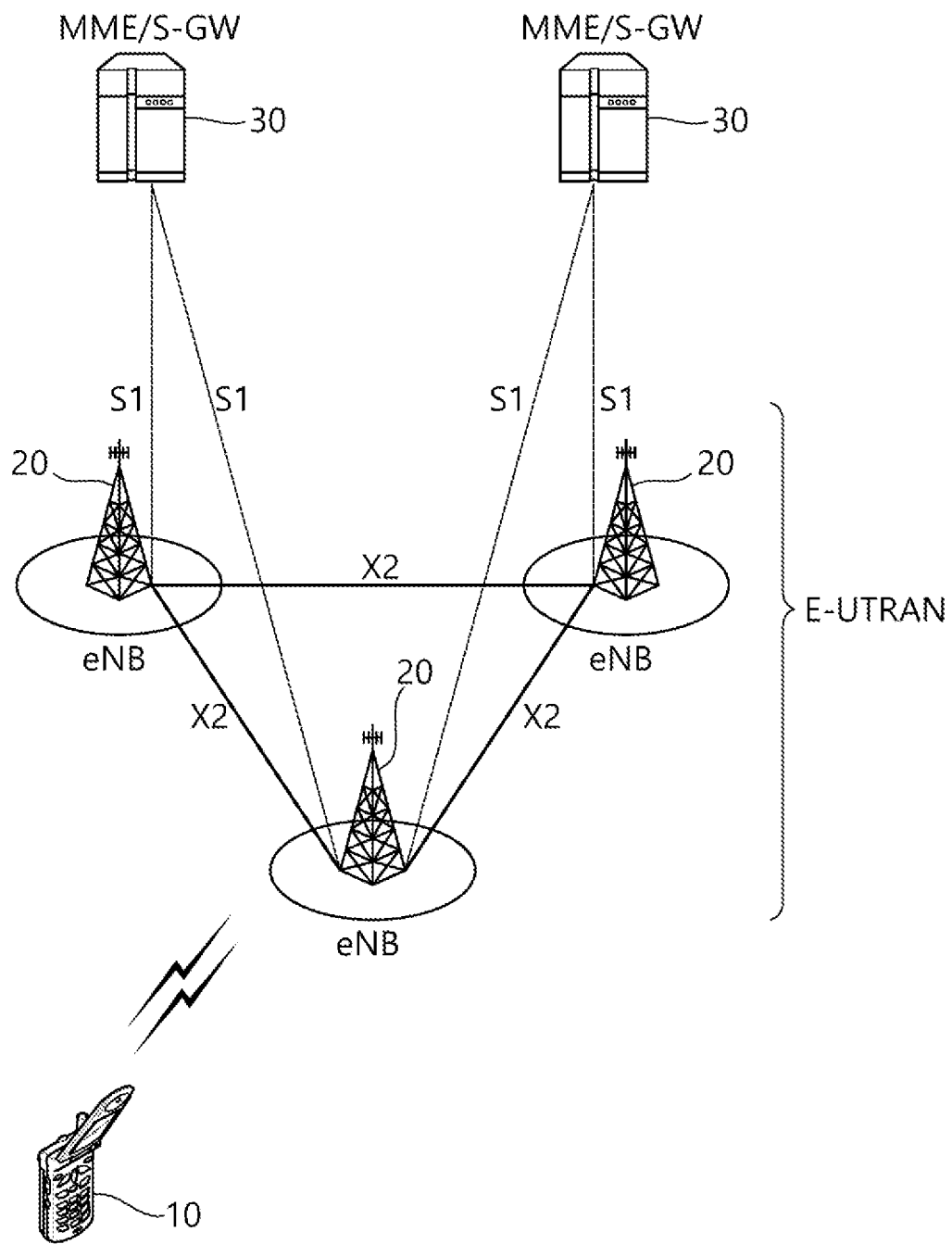
FIG. 1 shows a wireless communication system to which the present disclosure can be applied.

FIG. 1 shows a wireless communication system to which the present disclosure may be applied. The wireless communication system may be referred to as an Evolved-UMTS Terrestrial Radio Access Network (E-UTRAN) or a Long Term Evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
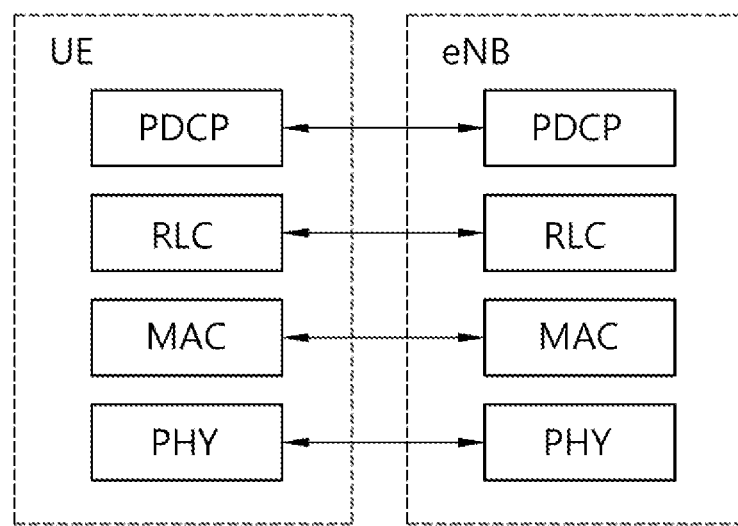
FIG. 2 is a diagram showing a wireless protocol architecture for a user plane.
Figure 3:
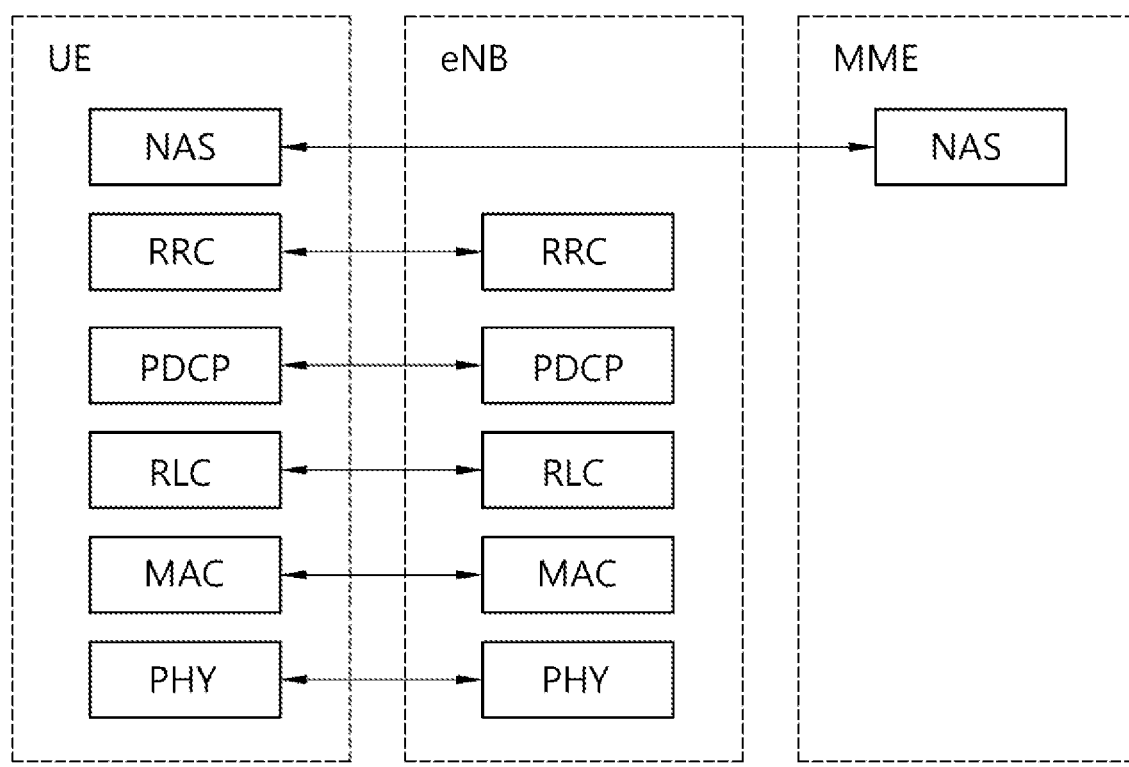
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer(=higher layer) with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time of transmission, and may be, for example, a subframe or a slot.

Hereinafter, a new radio access technology (new RAT, NR) will be described.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultrareliable and low latency communication (URLLC) is discussed. This new technology may be called new radio access technology (new RAT or NR) in the present disclosure for convenience.

Figure 4:
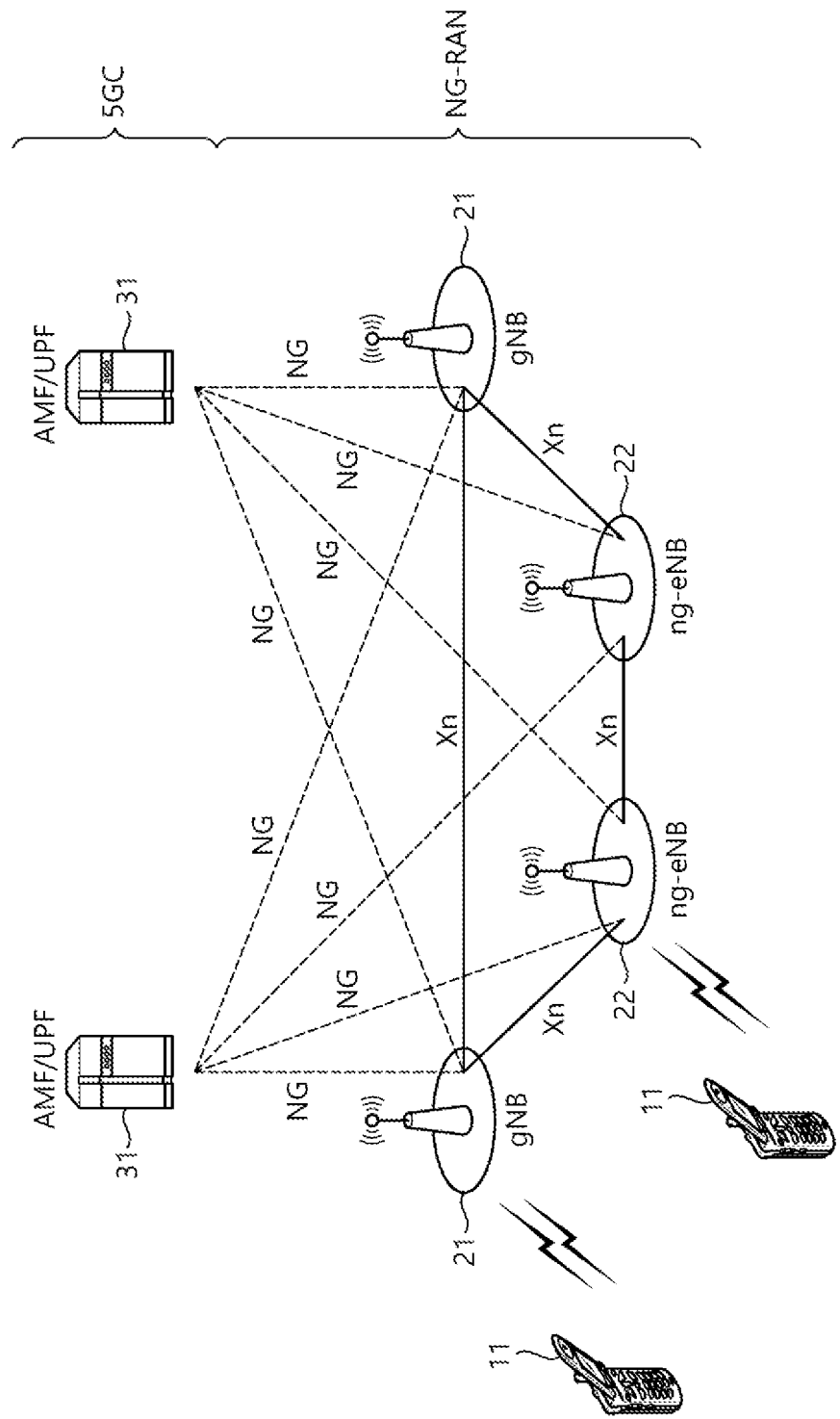
FIG. 4 shows another example of a wireless communication system to which the technical features of the present disclosure can be applied.

FIG. 4 illustrates another example of a wireless communication system to which technical features of the present disclosure are applicable.

Specifically, FIG. 4 shows system architecture based on a 5G new radio access technology (NR) system. Entities used in the 5G NR system (hereinafter, simply referred to as "NR") may absorb some or all functions of the entities (e.g., the eNB, the MME, and the S-GW) introduced in FIG. 1. The entities used in the NR system may be identified by terms with "NG" to be distinguished from LTE entities.

Referring to FIG. 4, the wireless communication system includes at least one UE 11, a next-generation RAN (NG-RAN), and a 5G core network (5GC). The NG-RAN includes at least one NG-RAN node. The NG-RAN node is an entity corresponding to the BS 20 illustrated in FIG. 5. The NG-RAN node includes at least one gNB 21 and/or at least one ng-eNB 22. The gNB 21 provides an end point of NR control-plane and user-plane protocols to the UE 11. The ng-eNB 22 provides an end point of E-UTRA user-plane and control-plane protocols to the UE 11.

The 5GC includes an access and mobility management function (AMF), a user plane function (UPF), and a session management function (SMF). The AMF hosts functions of NAS security and idle-state mobility processing. The AMF is an entity that includes the functions of a conventional MME. The UPF hosts functions of mobility anchoring function and protocol data unit (PDU) processing. The UPF is an entity that includes the functions of a conventional S-GW. The SMF hosts functions of UE IP address allocation and PDU session control.

The gNB and the ng-eNB are connected to each other via an Xn interface. The gNB and the ng-eNB are also connected to the 5GC through an NG interface. Specifically, the gNB and the ng-eNB are connected to the AMF through an NG-C interface, and to the UPF through an NG-U interface.

Figure 5:
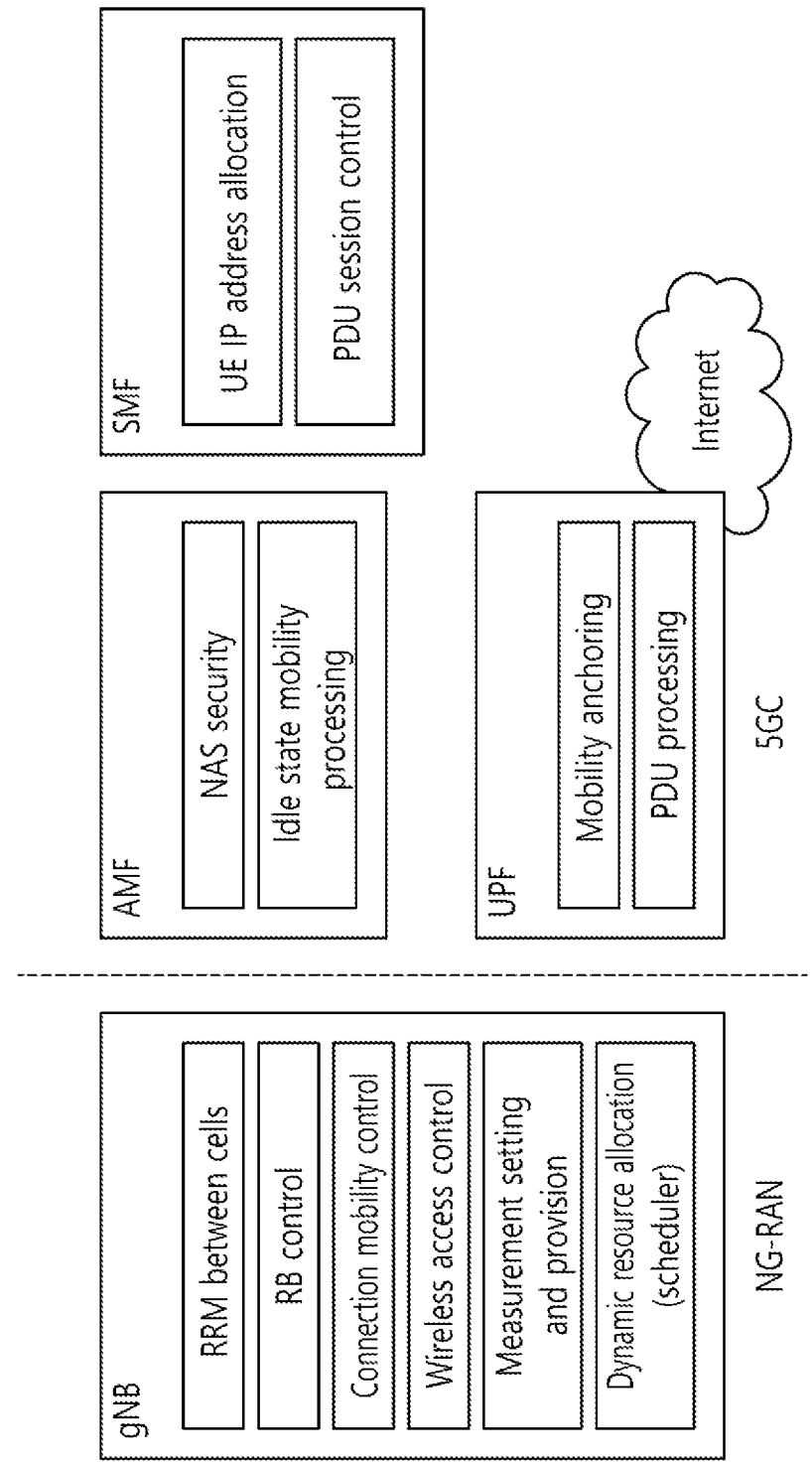
FIG. 5 illustrates a functional division between an NG-RAN and a 5GC.

FIG. 5 illustrates a functional division between an NG-RAN and a 5GC.

Referring to FIG. 5, the gNB may provide functions such as an inter-cell radio resource management (Inter Cell RRM), radio bearer management (RB control), connection mobility control, radio admission control, measurement configuration & provision, dynamic resource allocation, and the like. The AMF may provide functions such as NAS security, idle state mobility handling, and so on. The UPF may provide functions such as mobility anchoring, PDU processing, and the like. The SMF may provide functions such as UE IP address assignment, PDU session control, and so on.

Figure 6:
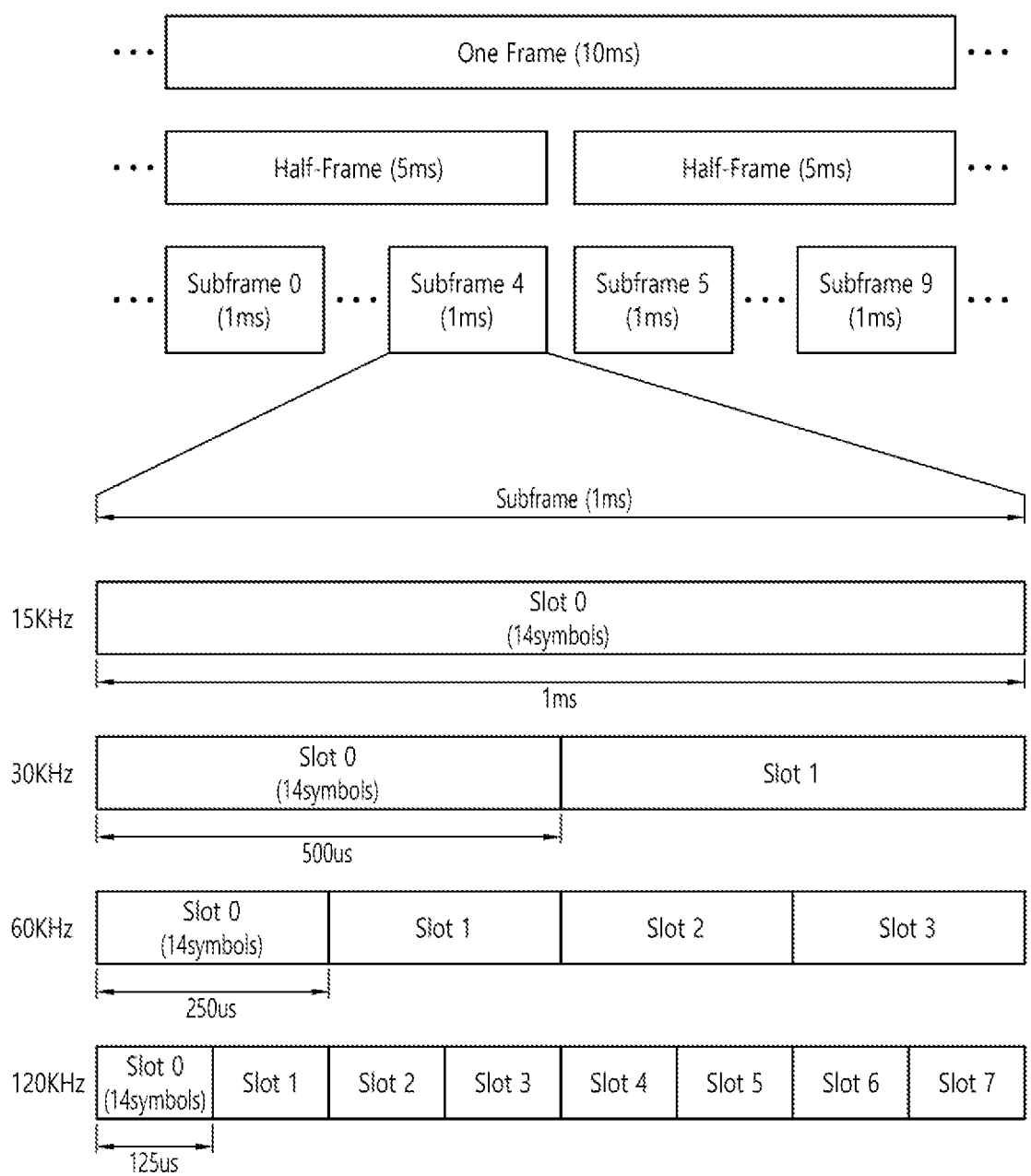
FIG. 6 illustrates an example of a frame structure that may be applied in NR.

FIG. 6 illustrates an example of a frame structure that may be applied in NR.

Referring to FIG. 6, a frame may be configured in 10 milliseconds (ms), and may include 10 subframes configured in 1 ms.

In NR, uplink and downlink transmission may be composed of frames. A radio frame has a length of 10 ms and may be defined as two 5 ms half-frames (HF). The HF may be defined as five 1 ms subframes (SFs). The SF may be divided into one or more slots, and the number of slots within the SF depends on a subcarrier spacing (SCS). Each slot includes 12 or 14 OFDM(A) symbols according to a cyclic prefix (CP). In case of using a normal CP, each slot includes 14 symbols. In case of using an extended CP, each slot includes 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

One or a plurality of slots may be included in the subframe according to subcarrier spacing.

The following table 1 illustrates a subcarrier spacing configuration μ.

TABLE 1

| μ | Δf = $2^μ · 15$[kHz] | Cyclic prefix |
|---|---|---|
| 0 | 15 | Normal |
| 1 | 30 | Normal |
| 2 | 60 | Normal Extended |
| 3 | 120 | Normal |
| 4 | 240 | Normal |

The following table 2 illustrates the number of slots in a frame ($N^{frame,μ}_{slot}$), the number of slots in a subframe ($N^{subframe,μ}_{slot}$), the number of symbols in a slot ($N^{slot}_{symb}$), and the like, according to subcarrier spacing configurations μ.

TABLE 2

| μ | $N^{slot}_{symb}$ | $N^{frame,μ}_{slot}$ | $N^{subframe,μ}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 3 illustrates that the number of symbols per slot, the number of slots per frame, and the number of slots per subframe vary depending on the SCS, in case of using an extended CP.

TABLE 3

| SCS ($15 · 2^μ$) | $N^{slot}_{symb}$ | $N^{frame,μ}_{slot}$ | $N^{subframe,μ}_{slot}$ |
|---|---|---|---|
| 60 kHZ (μ = 2) | 12 | 40 | 4 |

NR supports multiple numerologies (or subcarrier spacing (SCS)) for supporting diverse 5G services. For example, if the SCS is 15 kHz, a wide area of the conventional cellular bands may be supported. If the SCS is 30 kHz/60 kHz, a dense-urban, lower latency, and wider carrier bandwidth is supported. If the SCS is 60 kHz or higher, a bandwidth greater than 24.25 GHz is used in order to overcome phase noise.

An NR frequency band may be defined as a frequency range of two types (FR1, FR2). Values of the frequency range may be changed. For example, the frequency range of the two types (FR1, FR2) may be as shown below in Table 4. For convenience of explanation, among the frequency ranges that are used in an NR system, FR1 may mean a "sub 6 GHz range", and FR2 may mean an "above 6 GHz range" and may also be referred to as a millimeter wave (mmW).

TABLE 4

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed. For example, as shown in Table 5 below, FR1 may include a band in the range of 410 MHz to 7125 MHz. That is, FR1 may include a frequency band of at least 6 GHz (or 5850, 5900, 5925 MHz, and so on). For example, a frequency band of at least 6 GHz (or 5850, 5900, 5925 MHz, and so on) included in FR1 may include an unlicensed band. The unlicensed band may be used for diverse purposes, e.g., the unlicensed band for vehicle-specific communication (e.g., automated driving).

TABLE 5

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

In an NR system, OFDM(A) numerologies (e.g., SCS, CP length, and so on) may be differently configured between a plurality of cells integrated to one UE. Accordingly, an (absolute time) duration of a time resource (e.g., SF, slot or TTI) (for convenience, collectively referred to as a time unit (TU)) configured of the same number of symbols may be differently configured between the integrated cells.

Figure 7:
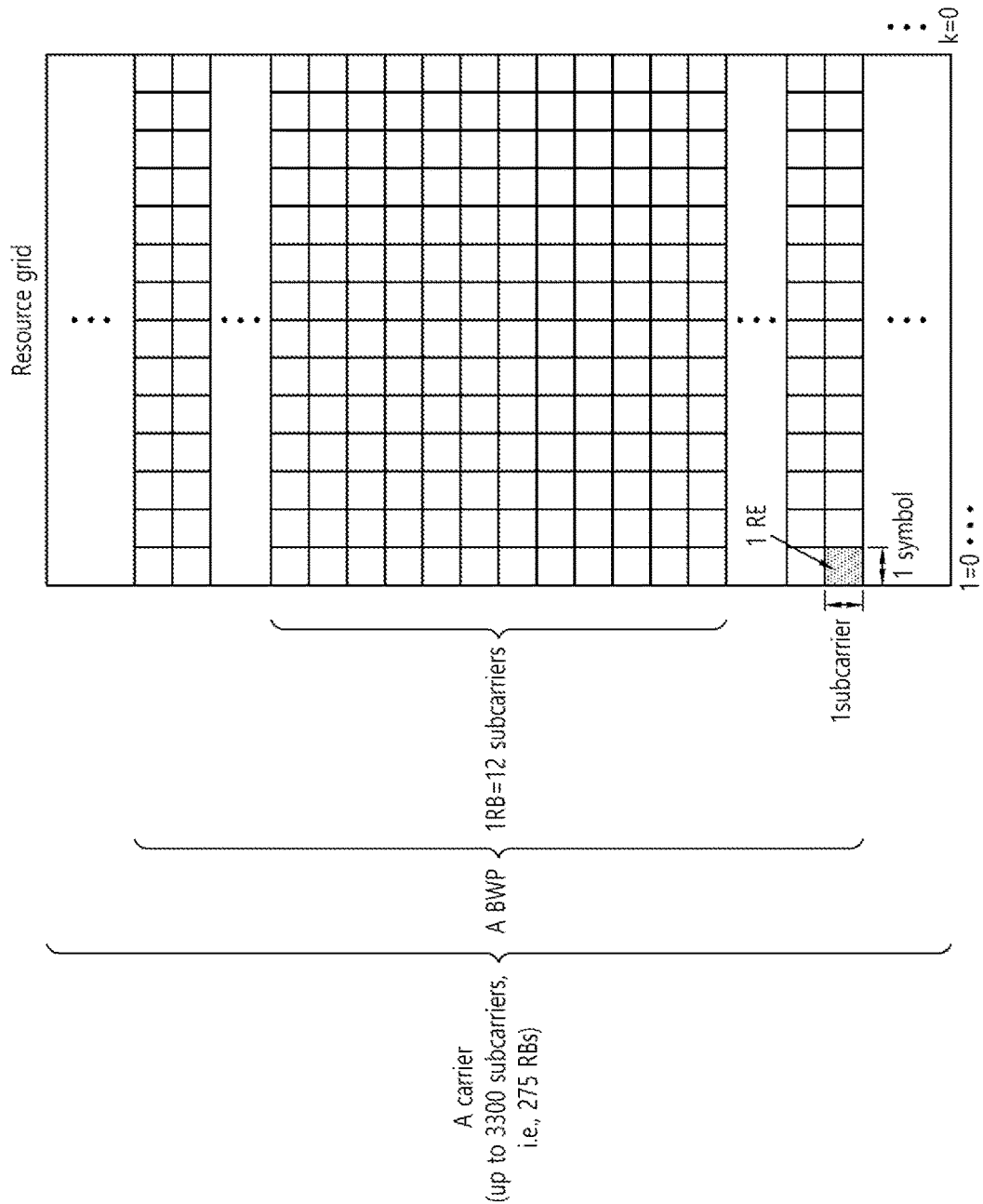
FIG. 7 illustrates a slot structure.

FIG. 7 illustrates a slot structure.

Referring to FIG. 7, a slot may include a plurality of symbols in a time domain. For example, in case of a normal CP, one slot may include 14 symbols. However, in case of an extended CP, one slot may include 12 symbols. Or, in case of a normal CP, one slot may include 7 symbols. However, in case of an extended CP, one slot may include 6 symbols.

A carrier may include a plurality of subcarriers in a frequency domain. A resource block (RB) may be defined as a plurality of consecutive subcarriers (e.g., 12 subcarriers) in the frequency domain. A bandwidth part (BWP) may be defined as a plurality of consecutive (physical) resource blocks ((P)RBs) in the frequency domain, and the BWP may correspond to one numerology (e.g., SCS, CP length, and so on). The carrier may include up to N (e.g., 5) BWPs. Data communication may be performed via an activated BWP. In a resource grid, each element may be referred to as a resource element (RE), and one complex symbol may be mapped thereto.

A physical downlink control channel (PDCCH) may include one or more control channel elements (CCEs) as illustrated in the following table.

TABLE 6

| Aggregation level | Number of CCEs |
|---|---|
| 1 | 1 |
| 2 | 2 |
| 4 | 4 |
| 8 | 8 |
| 16 | 16 |

That is, the PDCCH may be transmitted through a resource including 1, 2, 4, 8, or 16 CCEs. Here, the CCE includes six resource element groups (REGs), and one REG includes one resource block in a frequency domain and one orthogonal frequency division multiplexing (OFDM) symbol in a time domain.

Meanwhile, a new unit called a control resource set (CORESET) may be introduced in the NR. The UE may receive a PDCCH in the CORESET.

Figure 8:
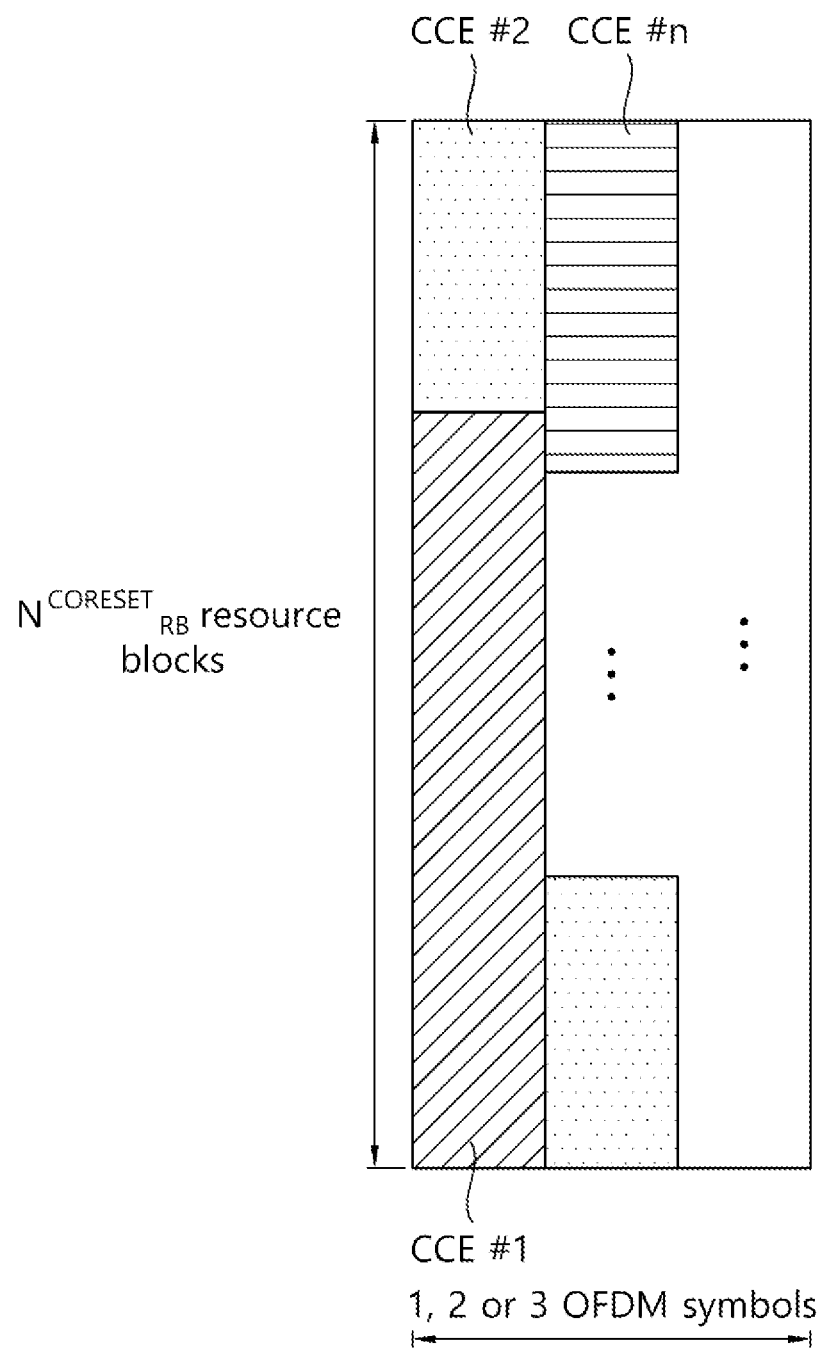
FIG. 8 illustrates CORESET.

FIG. 8 illustrates CORESET.

Referring to FIG. 8, the CORESET includes $N^{CORESET}_{RB}$ number of resource blocks in the frequency domain, and $N^{CORESET}_{symb} \in \{1, 2, 3\}$ number of symbols in the time domain. $N^{CORESET}_{RB}$ and $N^{CORESET}_{symb}$ may be provided by a base station via higher layer signaling. As illustrated in FIG. 8, a plurality of CCEs (or REGs) may be included in the CORESET.

The UE may attempt to detect a PDCCH in units of 1, 2, 4, 8, or 16 CCEs in the CORESET. One or a plurality of CCEs in which PDCCH detection may be attempted may be referred to as PDCCH candidates.

A plurality of CORESETs may be configured for the UE.

Figure 9:
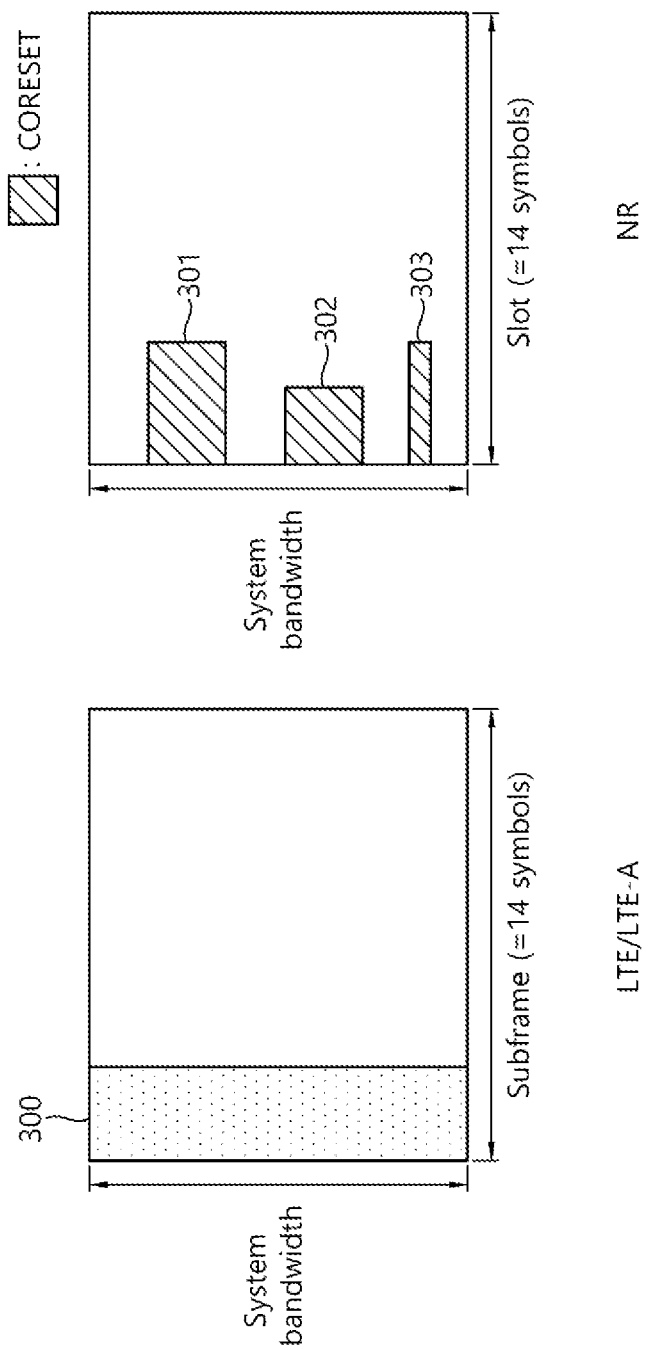
FIG. 9 is a diagram illustrating a difference between a related art control region and the CORESET in NR.

FIG. 9 is a diagram illustrating a difference between a related art control region and the CORESET in NR.

Referring to FIG. 9, a control region 300 in the related art wireless communication system (e.g., LTE/LTE-A) is configured over the entire system band used by a base station (BS). All the UEs, excluding some (e.g., eMTC/NB-IoT UE) supporting only a narrow band, shall be able to receive wireless signals of the entire system band of the BS in order to properly receive/decode control information transmitted by the BS.

On the other hand, in NR, CORESET described above was introduced. CORESETs 301, 302, and 303 are radio resources for control information to be received by the UE and may use only a portion, rather than the entirety of the system bandwidth. The BS may allocate the CORESET to each UE and may transmit control information through the allocated CORESET. For example, in FIG. 9, a first CORE-SET 301 may be allocated to UE 1, a second CORESET 302 may be allocated to UE 2, and a third CORESET 303 may be allocated to UE 3. In the NR, the UE may receive control information from the BS, without necessarily receiving the entire system band.

The CORESET may include a UE-specific CORESET for transmitting UE-specific control information and a common CORESET for transmitting control information common to all UEs.

Meanwhile, NR may require high reliability according to applications. In such a situation, a target block error rate (BLER) for downlink control information (DCI) transmitted through a downlink control channel (e.g., physical downlink control channel (PDCCH)) may remarkably decrease compared to those of conventional technologies. As an example of a method for satisfying requirement that requires high reliability, content included in DCI can be reduced and/or the amount of resources used for DCI transmission can be increased. Here, resources can include at least one of resources in the time domain, resources in the frequency domain, resources in the code domain and resources in the spatial domain.

Meanwhile, in NR, the following technologies/features can be applied.

<Self-Contained Subframe Structure>

Figure 10:
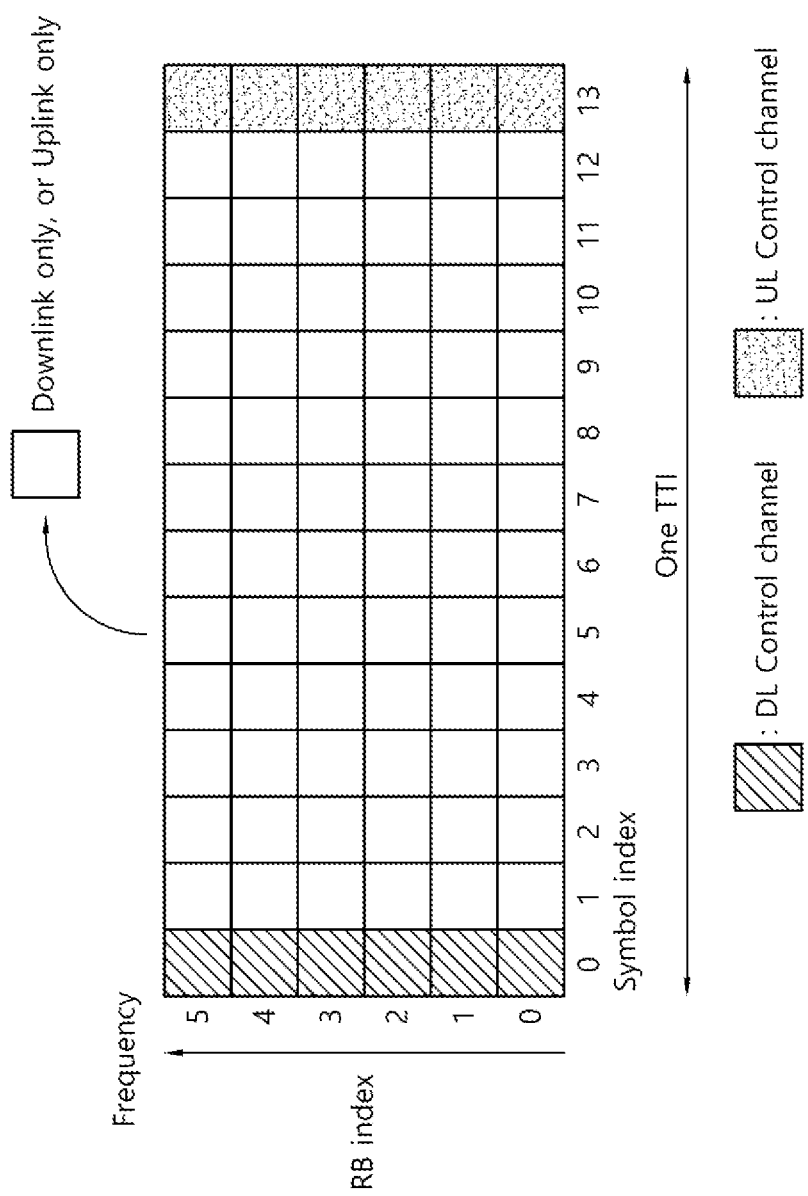
FIG. 10 illustrates an example of a frame structure for new radio access technology.

FIG. 10 illustrates an example of a frame structure for new radio access technology.

In NR, a structure in which a control channel and a data channel are time-division-multiplexed within one TTI, as shown in FIG. 10, can be considered as a frame structure in order to minimize latency.

In FIG. 10, a shaded region represents a downlink control region and a black region represents an uplink control region. The remaining region may be used for downlink (DL) data transmission or uplink (UL) data transmission. This structure is characterized in that DL transmission and UL transmission are sequentially performed within one subframe and thus DL data can be transmitted and UL ACK/NACK can be received within the subframe. Consequently, a time required from occurrence of a data transmission error to data retransmission is reduced, thereby minimizing latency in final data transmission.

In this data and control TDMed subframe structure, a time gap for a base station and a UE to switch from a transmission mode to a reception mode or from the reception mode to the transmission mode may be required. To this end, some OFDM symbols at a time when DL switches to UL may be set to a guard period (GP) in the self-contained subframe structure.

Figure 11:
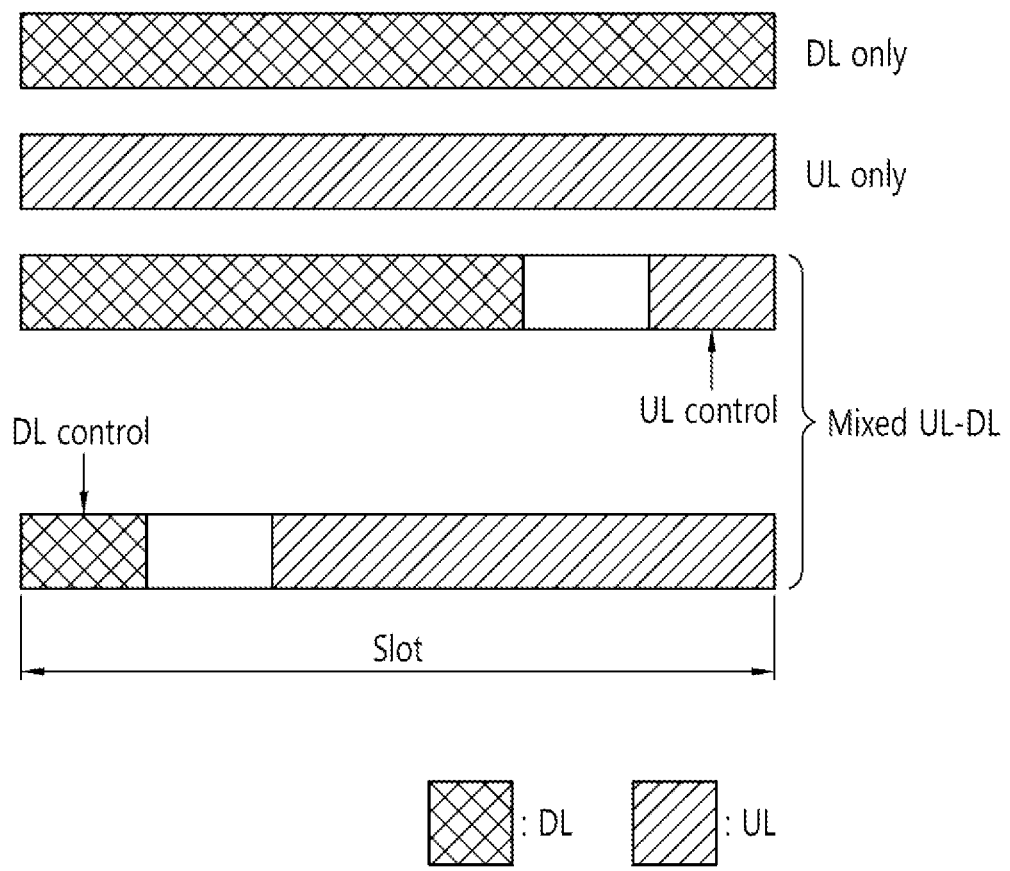
FIG. 11 illustrates a structure of a self-contained slot.

FIG. 11 illustrates a structure of a self-contained slot.

Referring to FIG. 11, one slot may have a self-contained structure in which all of a DL control channel, DL or UL data, and a UL control channel may be included. For example, first N symbols (hereinafter, DL control region) in the slot may be used to transmit a DL control channel, and last M symbols (hereinafter, UL control region) in the slot may be used to transmit a UL control channel. N and M are integers greater than or equal to 0. A resource region (hereinafter, a data region) which exists between the DL control region and the UL control region may be used for DL data transmission or UL data transmission. For example, the following configuration may be considered. Respective durations are listed in a temporal order.

1. DL only configuration
2. UL only configuration
3. Mixed UL-DL configuration

DL region+Guard period (GP)+UL control region

DL control region+GP+UL region

Here, the DL region may be (i) DL data region, (ii) DL control region+DL data region. The UL region may be (i) UL data region, (ii) UL data region+UL control region A PDCCH may be transmitted in the DL control region, and a physical downlink shared channel (PDSCH) may be transmitted in the DL data region. A physical uplink control channel (PUCCH) may be transmitted in the UL control region, and a physical uplink shared channel (PUSCH) may be transmitted in the UL data region. Downlink control information (DCI), for example, DL data scheduling information, UL data scheduling information, and the like, may be transmitted on the PDCCH. Uplink control information (UCI), for example, ACK/NACK information about DL data, channel state information (CSI), and a scheduling request (SR), may be transmitted on the PUCCH. A GP provides a time gap in a process in which a BS and a UE switch from a TX mode to an RX mode or a process in which the BS and the UE switch from the RX mode to the TX mode. Some symbols at the time of switching from DL to UL within a subframe may be configured as the GP.

<Analog Beamforming #1>

Wavelengths are shortened in millimeter wave (mmW) and thus a large number of antenna elements can be installed in the same area. That is, the wavelength is 1 cm at 30 GHz and thus a total of 100 antenna elements can be installed in the form of a 2-dimensional array at an interval of 0.5 lambda (wavelength) in a panel of 5×5 cm. Accordingly, it is possible to increase a beamforming (BF) gain using a large number of antenna elements to increase coverage or improve throughput in mmW.

In this case, if a transceiver unit (TXRU) is provided to adjust transmission power and phase per antenna element, independent beamforming per frequency resource can be performed. However, installation of TXRUs for all of about 100 antenna elements decreases effectiveness in terms of cost. Accordingly, a method of mapping a large number of antenna elements to one TXRU and controlling a beam direction using an analog phase shifter is considered. Such analog beamforming can form only one beam direction in all bands and thus cannot provide frequency selective beamforming.

Hybrid beamforming (BF) having a number B of TXRUs which is smaller than Q antenna elements can be considered as an intermediate form of digital BF and analog BF. In this case, the number of directions of beams which can be simultaneously transmitted are limited to B although it depends on a method of connecting the B TXRUs and the Q antenna elements.

<Analog Beamforming #2>

When a plurality of antennas is used in NR, hybrid beamforming which is a combination of digital beamforming and analog beamforming is emerging. Here, in analog beamforming (or RF beamforming) an RF end performs precoding (or combining) and thus it is possible to achieve the performance similar to digital beamforming while reducing the number of RF chains and the number of D/A (or A/D) converters. For convenience, the hybrid beamforming structure may be represented by N TXRUs and M physical antennas. Then, the digital beamforming for the L data layers to be transmitted at the transmitting end may be represented by an N by L matrix, and the converted N digital signals are converted into analog signals via TXRUs, and analog beamforming represented by an M by N matrix is applied.

Figure 12:
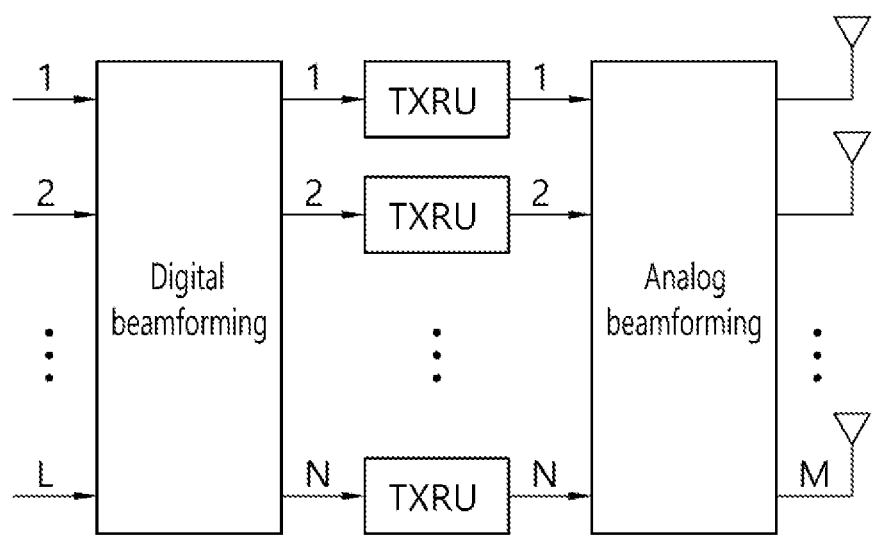
FIG. 12 is an abstract schematic diagram of a hybrid beamforming structure in terms of a TXRU and a physical antenna.

FIG. 12 is an abstract diagram of a hybrid beamforming structure from the viewpoint of the TXRU and the physical antenna.

In FIG. 12, the number of digital beams is L, and the number of analog beams is N. Furthermore, in the NR system, a direction of supporting more efficient beamforming to a UE located in a specific area is considered by designing the base station to change analog beamforming in units of symbols. Further, when defining N specific TXRUs and M RF antennas as one antenna panel in FIG. 12, in the NR system, a method of introducing a plurality of antenna panels to which hybrid beamforming independent of each other can be applied is being considered.

As described above, when the base station uses a plurality of analog beams, since analog beams advantageous for signal reception may be different for each UE, a beam sweeping operation, in which at least for a synchronization signal, system information, paging, etc., a plurality of analog beams to be applied by the base station in a specific subframe are changed for each symbol, that allows all UEs to have a reception occasion is being considered.

Figure 13:
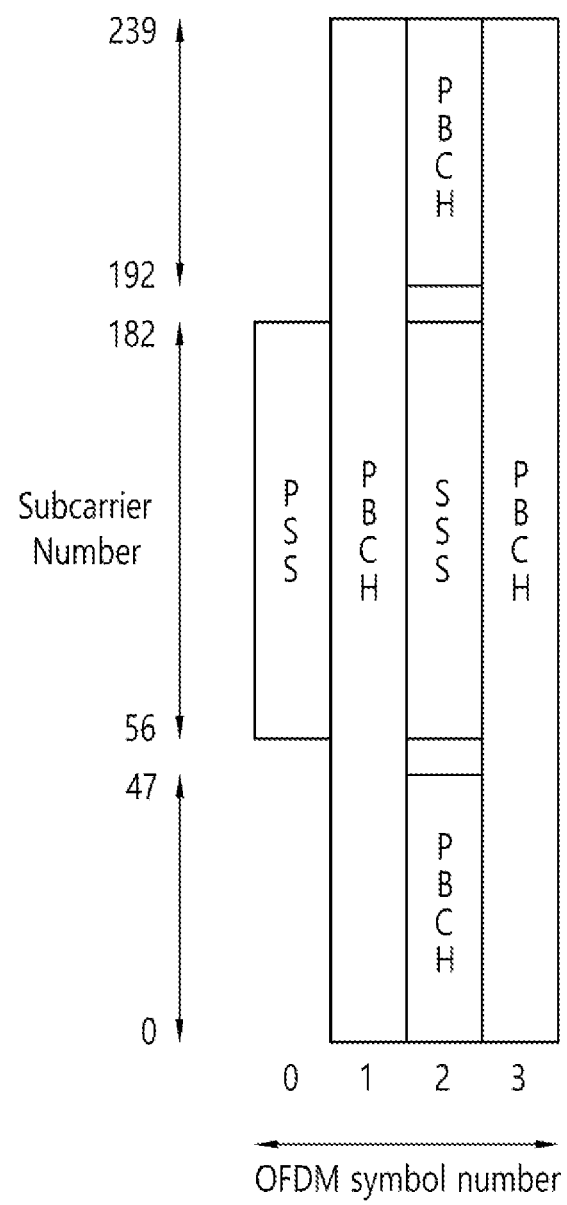
FIG. 13 shows a synchronization signal and a PBCH (SS/PBCH) block.

FIG. 13 shows a synchronization signal and a PBCH (SS/PBCH) block.

Referring to FIG. 13, an SS/PBCH block may include a PSS and an SSS, each of which occupies one symbol and 127 subcarriers, and a PBCH, which spans three OFDM symbols and 240 subcarriers where one symbol may include an unoccupied portion in the middle reserved for the SSS. The periodicity of the SS/PBCH block may be configured by a network, and a time position for transmitting the SS/PBCH block may be determined on the basis of subcarrier spacing.

Polar coding may be used for the PBCH. A UE may assume band-specific subcarrier spacing for the SS/PBCH block as long as a network does not configure the UE to assume different subcarrier spacings.

The PBCH symbols carry frequency-multiplexed DMRS thereof. QPSK may be used for the PBCH. 1008 unique physical-layer cell IDs may be assigned.

For a half frame with SS/PBCH blocks, first symbol indices for candidate SS/PBCH blocks are determined according to subcarrier spacing of SS/PBCH blocks, which will be described later.

Case A—Subcarrier spacing 15 kHz: The first symbols of the candidate SS/PBCH blocks have an index of {2, 8}+14*n. For carrier frequencies less than or equal to 3 GHz, n=0, 1. For carrier frequencies greater than 3 GHz and less than or equal to 6 GHz, n=0, 1, 2, 3.

Case B—Subcarrier spacing 30 kHz: The first symbols of the candidate SS/PBCH blocks have an index of {4, 8, 16, 20}+28*n. For carrier frequencies less than or equal to 3 GHz, n=0. For carrier frequencies greater than 3 GHz and less than or equal to 6 GHz, n=0, 1.

Case C—Subcarrier spacing 30 kHz: The first symbols of candidate SS/PBCH blocks have an index of {2, 8}+14*n. For carrier frequencies less than or equal to 3 GHz, n=0, 1. For carrier frequencies greater than 3 GHz and less than or equal to 6 GHz, n=0, 1, 2, 3.

Case D—Subcarrier spacing 120 kHz: The first symbols of the candidate SS/PBCH blocks have an index of {4, 8, 16, 20}+28*n. For carrier frequencies greater than 6 GHz, n=0, 1, 2, 3, 5, 6, 7, 8, 10, 11, 12, 13, 15, 16, 17, 18.

Case E—Subcarrier spacing 240 kHz: The first symbols of the candidate SS/PBCH blocks have an index of {8, 12, 16, 20, 32, 36, 40, 44}+56*n. For carrier frequencies greater than 6 GHz, n=0, 1, 2, 3, 5, 6, 7, 8.

Candidate SS/PBCH blocks in a half frame are indexed in ascending order from 0 to L−1 on the time axis. The UE shall determine 2 LSB bits for L=4 and 3 LSB bits for L>4 of the SS/PBCH block index per half frame from one-to-one mapping with the index of the DM-RS sequence transmitted in the PBCH. For L=64, the UE shall determine 3 MSB bits of the SS/PBCH block index per half frame by the PBCH payload bits.

By the higher layer parameter 'SSB-transmitted-SIB1', the index of SS/PBCH blocks in which the UE cannot receive other signals or channels in REs overlapping with REs corresponding to SS/PBCH blocks can be set. In addition, according to the higher layer parameter 'SSB-transmitted', the index of SS/PBCH blocks per serving cell in which the UE cannot receive other signals or channels in REs overlapping with REs corresponding to the SS/PBCH blocks can be set. The setting by 'SSB-transmitted' may take precedence over the setting by 'SSB-transmitted-SIB1'. A periodicity of a half frame for reception of SS/PBCH blocks per serving cell may be set by a higher layer parameter 'SSB-periodicityServingCell'. If the UE does not set the periodicity of the half frame for the reception of SS/PBCH blocks, the UE shall assume the periodicity of the half frame. The UE may assume that the periodicity is the same for all SS/PBCH blocks in the serving cell.

Figure 14:
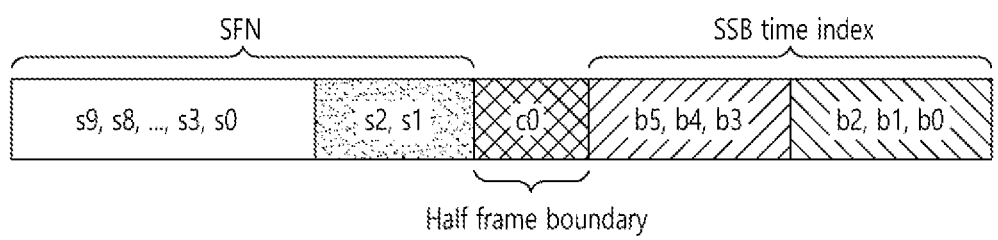
FIG. 14 is for explaining a method for a UE to obtain timing information.

FIG. 14 is for explaining a method for a UE to obtain timing information.

First, the UE may obtain 6-bit SFN information through the MIB (Master Information Block) received in the PBCH. In addition, SFN 4 bits can be obtained in the PBCH transport block.

Second, the UE may obtain a 1-bit half frame indicator as part of the PBCH payload. In less than 3 GHz, the half frame indicator may be implicitly signaled as part of the PBCH DMRS for Lmax=4.

Finally, the UE may obtain the SS/PBCH block index by the DMRS sequence and the PBCH payload. That is, LSB 3 bits of the SS block index can be obtained by the DMRS sequence for a period of 5 ms. Also, the MSB 3 bits of the timing information are explicitly carried within the PBCH payload (for >6 GHz).

In initial cell selection, the UE may assume that a half frame with SS/PBCH blocks occurs with a periodicity of 2 frames. Upon detecting the SS/PBCH block, the UE determines that a control resource set for the Type0-PDCCH common search space exists if $k_{SSB} \leq 23$ for FR1 and $k_{SSB} \leq 11$ for FR2. The UE determines that there is no control resource set for the Type0-PDCCH common search space if $k_{SSB} > 23$ for FR1 and $k_{SSB} > 11$ for FR2.

For a serving cell without transmission of SS/PBCH blocks, the UE acquires time and frequency synchronization of the serving cell based on reception of the SS/PBCH blocks on the PSCell or the primary cell of the cell group for the serving cell.

Hereinafter, system information acquisition will be described.

System information (SI) is divided into a master information block (MIB) and a plurality of system information blocks (SIB s) where:
  the MIB is transmitted always on a BCH according to a period of 40 ms, is repeated within 80 ms, and includes parameters necessary to obtain system information block type1 (SIB1) from a cell;
  SIB1 is periodically and repeatedly transmitted on a DL-SCH. SIB1 includes information on availability and scheduling (e.g., periodicity or SI window size) of other SIBs. Further, SIB1 indicates whether the SIBs (i.e., the other SIBs) are periodically broadcast or are provided by request. When the other SIBs are provided by request, SIB1 includes information for a UE to request SI;
  SIBs other than SIB1 are carried via system information (SI) messages transmitted on the DL-SCH. Each SI message is transmitted within a time-domain window (referred to as an SI window) periodically occurring;
  For a PSCell and SCells, an RAN provides required SI by dedicated signaling. Nevertheless, a UE needs to acquire an MIB of the PSCell in order to obtain the SFN timing of a SCH (which may be different from an MCG). When relevant SI for a SCell is changed, the RAN releases and adds the related SCell. For the PSCell, SI can be changed only by reconfiguration with synchronization (sync).

Figure 15:
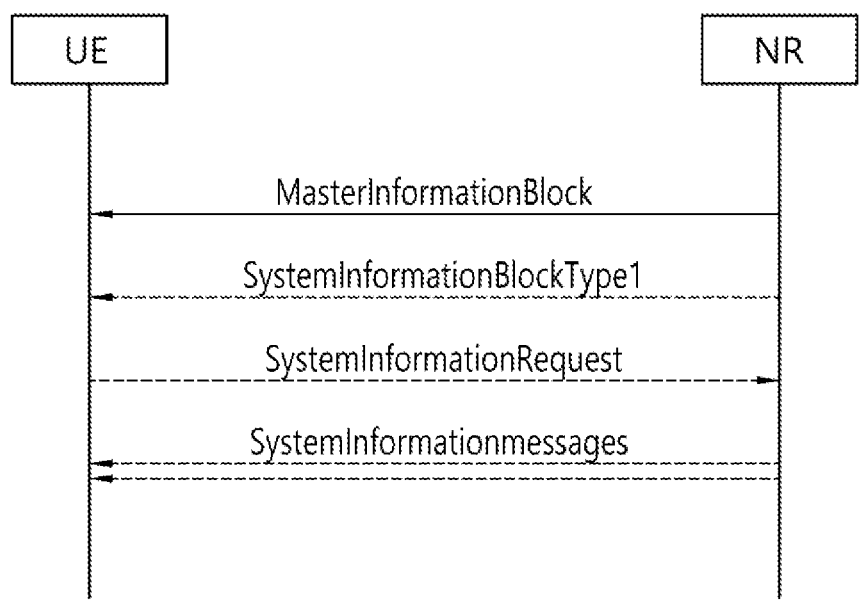
FIG. 15 shows an example of a process of acquiring system information of a UE.

FIG. 15 shows an example of a process of acquiring system information of a UE.

According to FIG. 15, the UE may receive the MIB from the network and then receive the SIB1. Thereafter, the UE may transmit a system information request to the network, and may receive a 'SystemInformation message' from the network in response thereto.

The UE may apply a system information acquisition procedure for acquiring AS (access stratum) and NAS (non-access stratum) information.

UEs in RRC_IDLE and RRC_INACTIVE states shall ensure (at least) valid versions of MIB, SIB1 and SystemInformationBlockTypeX (according to the relevant RAT support for UE-controlled mobility).

The UE in RRC_CONNECTED state shall guarantee valid versions of MIB, SIB1, and SystemInformationBlockTypeX (according to mobility support for the related RAT).

The UE shall store the related SI obtained from the currently camped/serving cell. The SI version obtained and stored by the UE is valid only for a certain period of time. The UE may use this stored version of the SI after, for example, cell reselection, return from out of coverage, or system information change indication.

Hereinafter, random access will be described.

The random access procedure of the UE can be summarized as in the following table.

TABLE 7

| | Type of signal | Action/Acquired Information |
|---|---|---|
| Step 1 | Uplink PRACH preamble | Initial beam acquisition<br>Random Election of RA-Preamble ID |
| Step 2 | Random access response on DL-SCH | Timing arrangement information<br>RA-preamble ID<br>Initial uplink grant, temporary C-RNTI |
| Step 3 | Uplink transmission on UL-SCH | RRC connection request<br>UE identifier |
| Step 4 | Contention resolution of downlink | C-RNTI on PDCCH for initial access<br>C-RNTI on PDCCH for UE in RRC_CONNECTED state |

Figure 16:
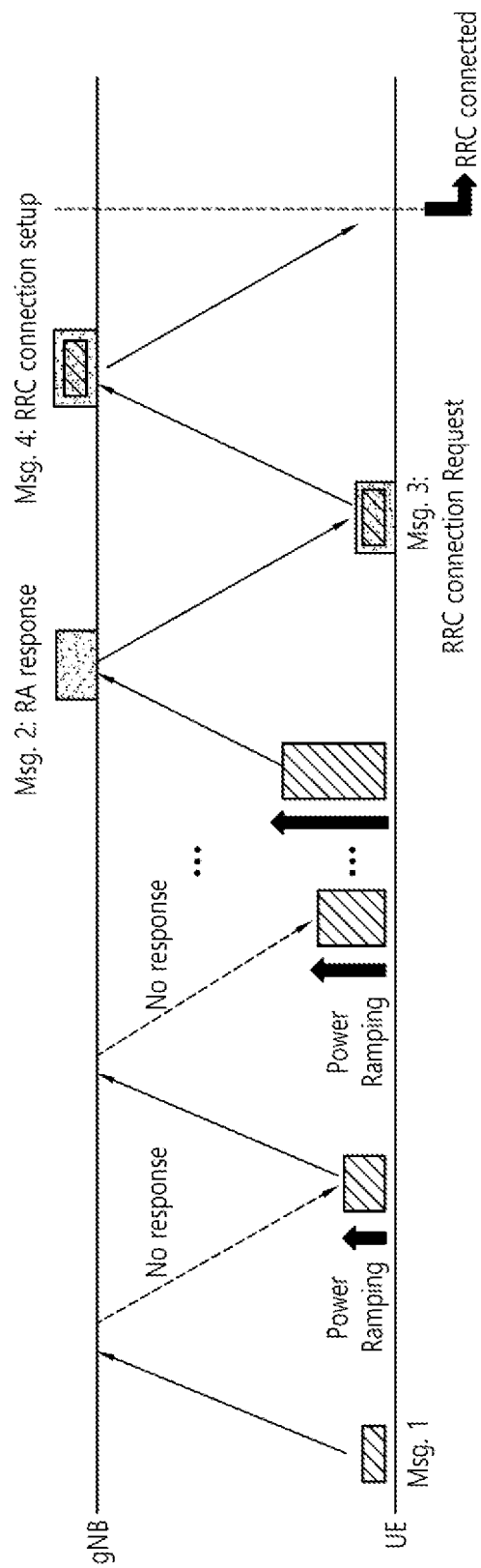
FIG. 16 is for explaining a random access procedure.

FIG. 16 is for explaining a random access procedure.

Referring to FIG. 16, first, the UE may transmit a physical random access channel (PRACH) preamble in uplink as message (Msg) 1 of the random access procedure.

Random access preamble sequences having two different lengths are supported. A long sequence of length 839 applies to subcarrier spacings of 1.25 kHz and 5 kHz, and a short sequence of length 139 applies to subcarrier spacings of 15, 30, 60, and 120 kHz. A long sequence supports an unrestricted set and a limited set of types A and B, whereas a short sequence supports only an unrestricted set.

A plurality of RACH preamble formats are defined with one or more RACH OFDM symbols, a different cyclic prefix (CP), and a guard time. The PRACH preamble configuration to be used is provided to the UE as system information.

If there is no response to Msg1, the UE may retransmit the power-rammed PRACH preamble within a prescribed number of times. The UE calculates the PRACH transmission power for retransmission of the preamble based on the most recent estimated path loss and power ramping counter. If the UE performs beam switching, the power ramping counter does not change.

Figure 17:
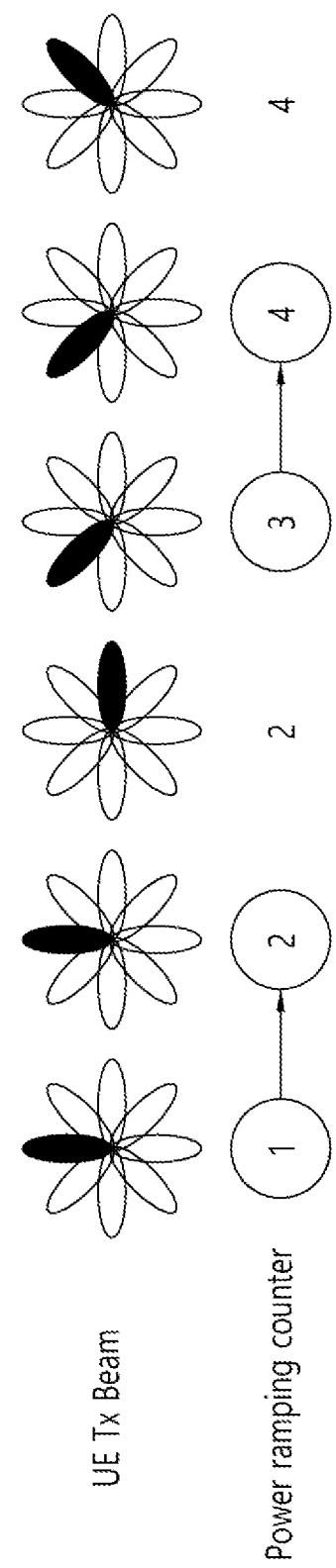
FIG. 17 is a diagram for describing a power ramping counter.

FIG. 17 is a diagram for describing a power ramping counter.

The UE may perform power ramping for retransmission of the random access preamble based on the power ramping counter. Here, as described above, the power ramping counter does not change when the UE performs beam switching during PRACH retransmission.

Referring to FIG. 17, when the UE retransmits the random access preamble for the same beam, the UE increments the power ramping counter by 1 as the power ramping counter increases from 1 to 2 and from 3 to 4. However, when the beam is changed, the power ramping counter does not change during PRACH retransmission.

Figure 18:
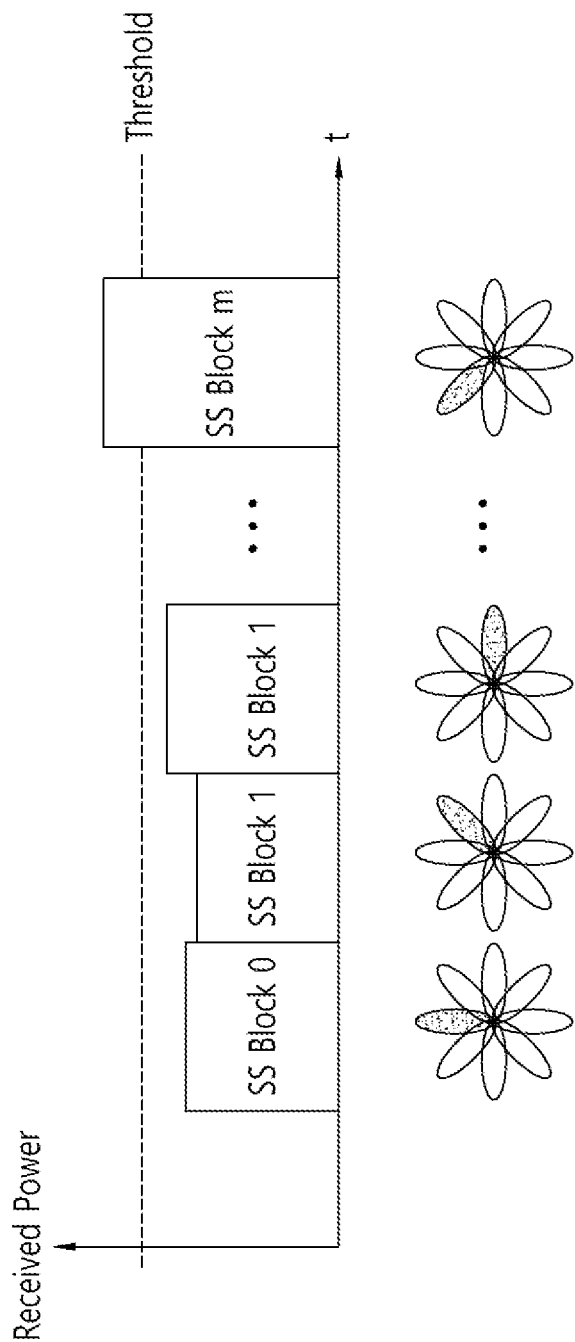
FIG. 18 is for explaining the concept of the threshold value of the SS block for the RACH resource relationship.

FIG. 18 is for explaining the concept of the threshold value of the SS block for the RACH resource relationship.

The system information informs the UE of the relationship between SS blocks and RACH resources. The threshold of the SS block for the RACH resource relationship is based on RSRP and network configuration. Transmission or retransmission of the RACH preamble is based on an SS block that satisfies a threshold. Accordingly, in the example of FIG. 18, since the SS block m exceeds the threshold of the received power, the RACH preamble is transmitted or retransmitted based on the SS block m.

Thereafter, when the UE receives a random access response on the DL-SCH, the DL-SCH may provide timing arrangement information, an RA-preamble ID, an initial uplink grant, and a temporary C-RNTI.

Based on the information, the UE may perform uplink transmission on the UL-SCH as Msg3 of the random access procedure. Msg3 may include the RRC connection request and UE identifier.

In response, the network may transmit Msg4, which may be treated as a contention resolution message, in downlink. By receiving this, the UE can enter the RRC connected state.

<Bandwidth Part (BWP)>

In the NR system, a maximum of 400 MHz can be supported per component carrier (CC). If a UE operating in such a wideband CC operates with RF for all CCs turn on all the time, UE battery consumption may increase. Or, considering use cases operating in one wideband CC (e.g., eMBB, URLLC, mMTC, etc.), different numerologies (e.g., subcarrier spacings (SCSs)) can be supported for different frequency bands in the CC. Or, UEs may have different capabilities for a maximum bandwidth. In consideration of this, an eNB may instruct a UE to operate only in a part of the entire bandwidth of a wideband CC, and the part of the bandwidth is defined as a bandwidth part (BWP) for convenience. A BWP can be composed of resource blocks (RBs) consecutive on the frequency axis and can correspond to one numerology (e.g., a subcarrier spacing, a cyclic prefix (CP) length, a slot/mini-slot duration, or the like).

Meanwhile, the eNB can configure a plurality of BWPs for a UE even within one CC. For example, a BWP occupying a relatively small frequency region can be set in a PDCCH monitoring slot and a PDSCH indicated by a PDCCH can be scheduled on a BWP wider than the BWP. When UEs converge on a specific BWP, some UEs may be set to other BWPs for load balancing. Otherwise, BWPs on both sides of a bandwidth other than some spectra at the center of the bandwidth may be configured in the same slot in consideration of frequency domain inter-cell interference cancellation between neighbor cells. That is, the eNB can configure at least one DL/UL BWP for a UE associated with(=related with) a wideband CC and activate at least one of DL/UL BWPs configured at a specific time (through L1 signaling or MAC CE or RRC signaling), and switching to other configured DL/UL BWPs may be indicated (through L1 signaling or MAC CE or RRC signaling) or switching to a determined DL/UL BWP may occur when a timer value expires on the basis of a timer. Here, an activated DL/UL BWP is defined as an active DL/UL BWP. However, a UE may not receive a configuration for a DL/UL BWP when the UE is in an initial access procedure or RRC connection is not set up. In such a situation, a DL/UL BWP assumed by the UE is defined as an initial active DL/UL BWP.

<DRX (Discontinuous Reception)>

Discontinuous Reception (DRX) refers to an operation mode in which a UE (User Equipment) reduces battery consumption so that the UE can discontinuously receive a downlink channel. That is, the UE configured for DRX can reduce power consumption by discontinuously receiving the DL signal.

The DRX operation is performed within a DRX cycle indicating a time interval in which On Duration is periodically repeated. The DRX cycle includes an on-duration and a sleep duration (or a DRX opportunity). The on-duration indicates a time interval during which the UE monitors the PDCCH to receive the PDCCH.

DRX may be performed in RRC (Radio Resource Control)_IDLE state (or mode), RRC_INACTIVE state (or mode), or RRC_CONNECTED state (or mode). In RRC_IDLE state and RRC_INACTIVE state, DRX may be used to receive paging signal discontinuously.

RRC_IDLE state: a state in which a radio connection (RRC connection) is not established between the base station and the UE.

RRC_INACTIVE state: A wireless connection (RRC connection) is established between the base station and the UE, but the wireless connection is inactive.

RRC_CONNECTED state: a state in which a radio connection (RRC connection) is established between the base station and the UE.

DRX can be basically divided into idle mode DRX, connected DRX (C-DRX), and extended DRX.

DRX applied in the IDLE state may be named idle mode DRX, and DRX applied in the CONNECTED state may be named connected mode DRX (C-DRX).

Extended/Enhanced DRX (eDRX) is a mechanism that can extend the cycles of idle mode DRX and C-DRX, and Extended/Enhanced DRX (eDRX) can be mainly used for (massive) IoT applications. In idle mode DRX, whether to allow eDRX may be configured based on system information (e.g., SIB1). SIB1 may include an eDRX-allowed parameter. The eDRX-allowed parameter is a parameter indicating whether idle mode extended DRX is allowed.

<Idle Mode DRX>

In the idle mode, the UE may use DRX to reduce power consumption. One paging occasion (paging occasion; PO) is a subframe in which P-RNTI (Paging-Radio Network Temporary Identifier) can be transmitted through PDCCH (Physical Downlink Control Channel), MPDCCH (MTC PDCCH), or NPDCCH (a narrowband PDCCH) (which addresses the paging message for NB-IoT).

In P-RNTI transmitted through MPDCCH, PO may indicate a start subframe of MPDCCH repetition. In the case of the P-RNTI transmitted through the NPDCCH, when the subframe determined by the PO is not a valid NB-IoT downlink subframe, the PO may indicate the start subframe of the NPDCCH repetition. Therefore, the first valid NB-IoT downlink subframe after PO is the start subframe of NPDCCH repetition.

One paging frame (PF) is one radio frame that may include one or a plurality of paging occasions. When DRX is used, the UE only needs to monitor one PO per DRX cycle. One paging narrow band (PNB) is one narrow band in which the UE performs paging message reception. PF, PO, and PNB may be determined based on DRX parameters provided in system information.

Figure 19:
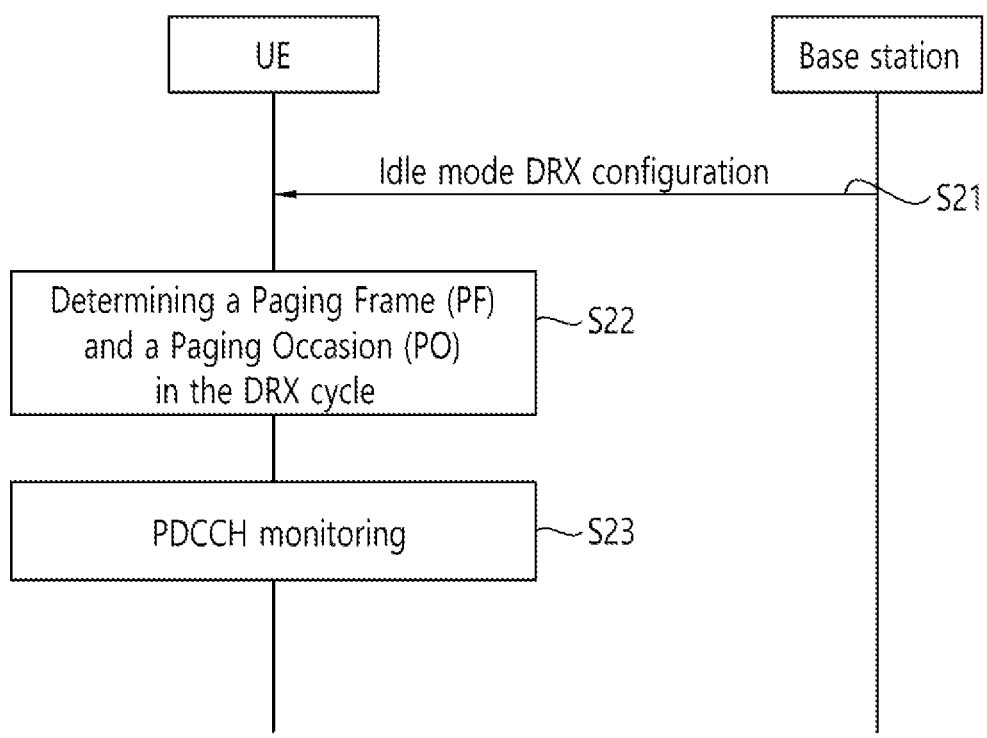
FIG. 19 is a flowchart illustrating an example of performing an idle mode DRX operation.

FIG. 19 is a flowchart illustrating an example of performing an idle mode DRX operation.

According to FIG. 19, the UE may receive idle mode DRX configuration information from the base station through higher layer signaling (e.g., system information) (S21).

The UE may determine a Paging Frame (PF) and a Paging Occasion (PO) to monitor the PDCCH in the paging DRX cycle based on the idle mode DRX configuration information (S22). In this case, the DRX cycle may include an on-duration and a sleep duration (or an opportunity of DRX).

The UE may monitor the PDCCH in the PO of the determined PF (S23). Here, for example, the UE monitors only one subframe (PO) per paging DRX cycle. In addition, when the UE receives the PDCCH scrambled by the P-RNTI during the on-duration (i.e., when paging is detected), the UE may transition to the connected mode and may transmit/receive data to/from the base station.

<Connected Mode DRX(C-DRX)>

C-DRX means DRX applied in the RRC connection state. The DRX cycle of C-DRX may consist of a short DRX cycle and/or a long DRX cycle. Here, a short DRX cycle may correspond to an option.

When C-DRX is configured, the UE may perform PDCCH monitoring for the on-duration. If the PDCCH is successfully detected during PDCCH monitoring, the UE may operate (or run) an inactive timer and maintain an awake state. Conversely, if the PDCCH is not successfully detected during PDCCH monitoring, the UE may enter the sleep state after the on-duration ends.

When C-DRX is configured, a PDCCH reception occasion (e.g., a slot having a PDCCH search space) may be configured non-contiguously based on the C-DRX configuration. In contrast, if C-DRX is not configured, a PDCCH reception occasion (e.g., a slot having a PDCCH search space) may be continuously configured in the present disclosure.

On the other hand, PDCCH monitoring may be limited to a time interval set as a measurement gap (gap) regardless of the C-DRX configuration.

Figure 20:
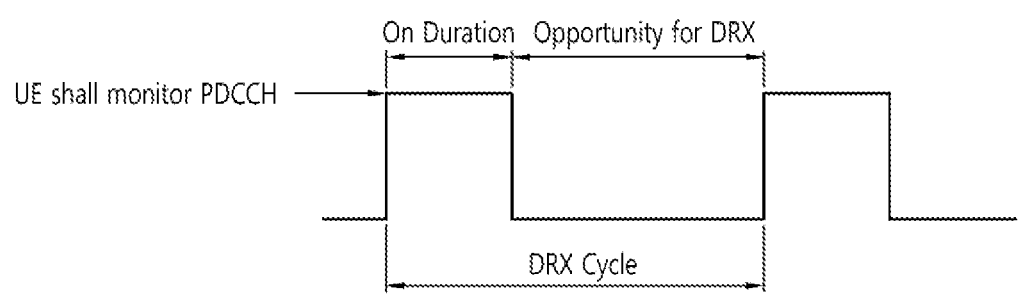
FIG. 20 illustrates a DRX cycle.

FIG. 20 illustrates a DRX cycle.

Referring to FIG. 20, a DRX cycle includes "On Duration" and "Opportunity for DRX". The DRX cycle defines a time interval in which "On Duration" is periodically repeated. "On Duration" represents a time period that the UE monitors to receive the PDCCH. When DRX is configured, the UE performs PDCCH monitoring during "On Duration". If there is a PDCCH successfully detected during PDCCH monitoring, the UE operates an inactivity timer and maintains an awake state. Meanwhile, if there is no PDCCH successfully detected during PDCCH monitoring, the UE enters a sleep state after the "On Duration" is over. Accordingly, when DRX is configured, PDCCH monitoring/reception may be discontinuously performed in the time domain in performing the procedures and/or methods described/suggested above. For example, when DRX is configured, in the present disclosure, a PDCCH reception occasion (e.g., a slot having a PDCCH search space) may be set discontinuously according to the DRX configuration. Meanwhile, when DRX is not configured, PDCCH monitoring/reception may be continuously performed in the time domain in performing the procedure and/or method described/proposed above. For example, when DRX is not configured, a PDCCH reception occasion (e.g., a slot having a PDCCH search space) may be continuously set in the present disclosure. Meanwhile, regardless of DRX configuration, PDCCH monitoring may be restricted in a time period set as a measurement gap.

Table 8 shows a UE procedure related to the DRX (RRC_CONNECTED state). Referring to Table 8, DRX configuration information is received through higher layer (e.g., RRC) signaling, and DRX ON/OFF is controlled by a DRX command of the MAC layer. When DRX is configured, the UE may discontinuously perform PDCCH monitoring in performing the procedure and/or method described/proposed in the present disclosure.

TABLE 8

| | Type of signals | UE procedure |
|---|---|---|
| 1$^{st}$ step | RRC signalling (MAC-CellGroupConfig) | Reception of DRX configuration information |
| 2$^{nd}$ Step | MAC CE ((Long) DRX command MAC CE) | Reception of DRX command |
| 3$^{rd}$ Step | — | Monitor a PDCCH during an 'on-duration' of a DRX cycle) |

MAC-CellGroupConfig may include configuration information required to set a medium access control (MAC) parameter for a cell group. MAC-CellGroupConfig may also include configuration information on DRX. For example, MAC-CellGroupConfig may include information as follows in defining DRX.

Value of drx-OnDurationTimer: It defines a length of a start interval of a DRX cycle.

Value of drx-InactivityTimer: It defines a length of a time interval in which the UE is awake after a PDCCH occasion in which the PDCCH indicating initial UL or DL data is detected Value of drx-HARQ-RTT-TimerDL: It defines a length of a maximum time interval until DL retransmission is received, after initial DL transmission is received.

Value of drx-HARQ-RTT-TimerUL: It defines a length of a maximum time interval until a grant for UL retransmission is received, after a grant for UL initial transmission is received.

drx-LongCycleStartOffset: It defines a time length and a start point of a DRX cycle drx-ShortCycle (optional): It defines a time length of a short DRX cycle Here, if any one of drx-OnDurationTimer, drx-InactivityTimer, drx-HARQ-RTT-TimerDL, drx-HARQ-RTT-TimerUL is in operation, the UE performs PDCCH monitoring at every PDCCH occasion while maintaining an awake state.

Hereinafter, an integrated access and backhaul link (IAB) will be described. Meanwhile, hereinafter, for convenience of description, a proposed method will be described based on a new RAT (NR) system. However, the range of the system to which the proposed method is applied is expandable to other systems such as 3GPP LTE/LTE-A systems in addition to the NR system.

One of the potential technologies aimed at enabling future cellular network deployment scenarios and applications is support for wireless backhaul and relay links, and it enables flexible and highly dense deployment of NR cells without the need to proportionally densify the transport network.

It is expected that greater bandwidth in NR compared to LTE will be available (e.g., mmWave spectrum) with the native deployment of massive MIMO or multi-beam systems, thus, opportunities are created for the development and deployment of integrated access and backhaul links. This makes it easier of a dense network of self-backhauled NR cells in a more integrated manner by establishing multiple control and data channels/procedures defined to provide access or access to the UEs. Such systems are referred to as integrated access and backhaul links (IAB).

The following terms may be used in the present disclosure.

AC (x): an access link between the node (x) and the UE(s).

BH (xy): a backhaul link between the node (x) and the node (y).

In this case, the node may mean a donor gNB (DgNB) or a relay node (RN). Here, the DgNB or the donor node may be a gNB that provides a function to support backhaul to IAB nodes.

In addition, in the present disclosure, for convenience of explanation, when relay node 1 and relay node 2 exist, relay node 1 which is connected to relay node 2 by a backhaul link and relaying data transmitted and received to relay node 2 is called a parent node of relay node 2, and relay node 2 is called a child node of relay node 1.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 21:
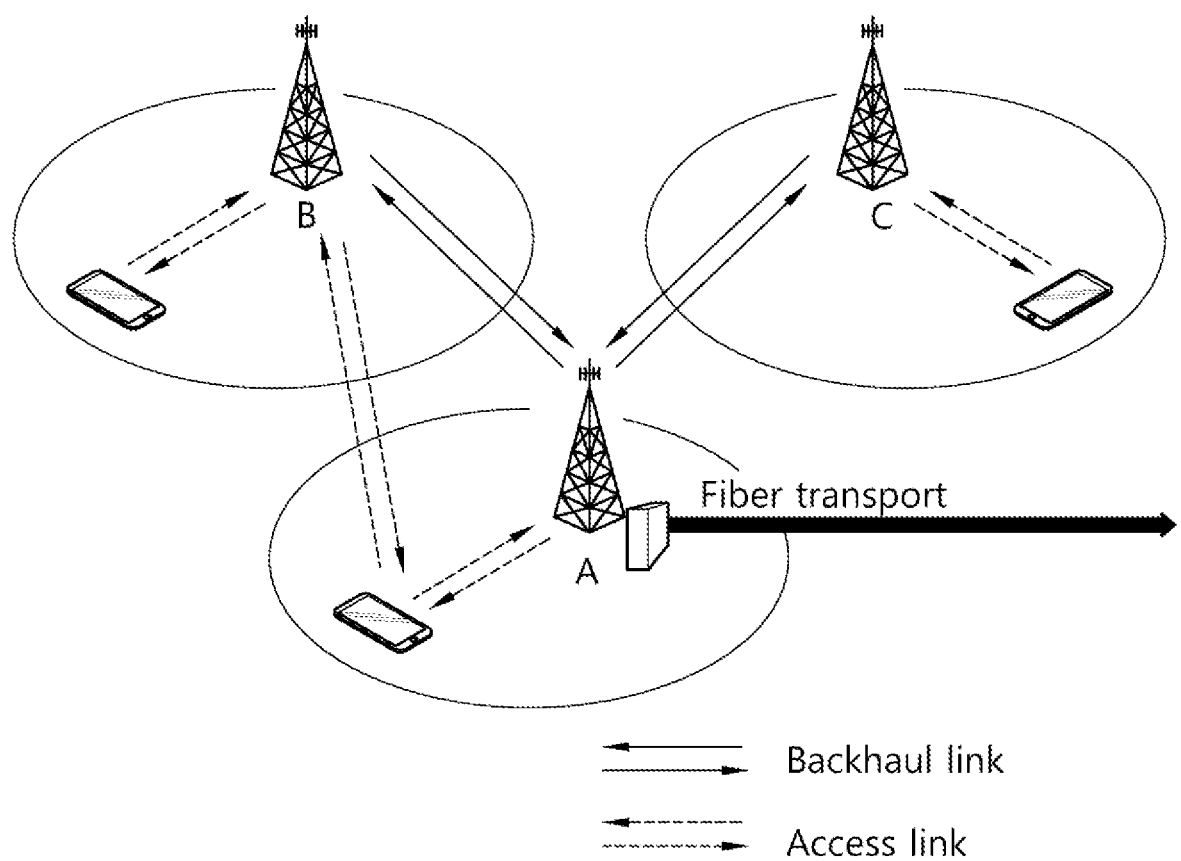
FIG. 21 schematically illustrates an example for a network with integrated access and backhaul links (IAB).

FIG. 21 schematically illustrates an example for a network with integrated access and backhaul links (IAB).

According to FIG. 21, relay nodes (rTRPs) may multiplex access and backhaul links in the time, frequency, or space domain (i.e., beam-based operation).

The operation of different links may operate on the same frequency or on different frequencies (which may also be referred to as 'in-band' or 'out-band' relays, respectively). Although efficient support of out-of-band relays is important for some NR deployment scenarios, it is very important to understand the requirements of in-band operation, which implies tight interworking with access links operating on the same frequency to accommodate duplex restrictions and avoid/mitigate interference.

Furthermore, operating an NR system in the millimeter wave spectrum have some unique challenges. It involves experiencing severe short-term blocking that cannot be easily mitigated by the current RRC-based handover mechanism due to the larger time scale required for completion of the procedure compared to short blocking. Overcoming short blocking in mmWave systems may require a fast RAN-based mechanism for switching between rTRPs that does not necessarily require the inclusion of a core network. The aforementioned need for mitigation of short blocking for NR operation in the millimeter wave spectrum, along with the need for easier deployment of self-backhauled NR cells, creates a need for the development of an integrated framework that allows for fast switching of access and backhaul links. Over-the-air (OTA) coordination between rTRPs may also be considered to mitigate interference and support end-to-end path selection and optimization.

The following requirements and aspects shall be addressed by the IAB for NR:

Efficient and flexible operation for in-band and out-of-band relaying in indoor and outdoor scenarios Multi-hop and redundant connections End-to-end path selection and optimization Support of backhaul links with high spectral efficiency Support of legacy NR UEs Legacy NR is designed to support half-duplex devices. As such, half-duplex may be supported and worthy of being targeted in an IAB scenario. Furthermore, IAB devices having a full duplex may also be considered.

Figure 22:
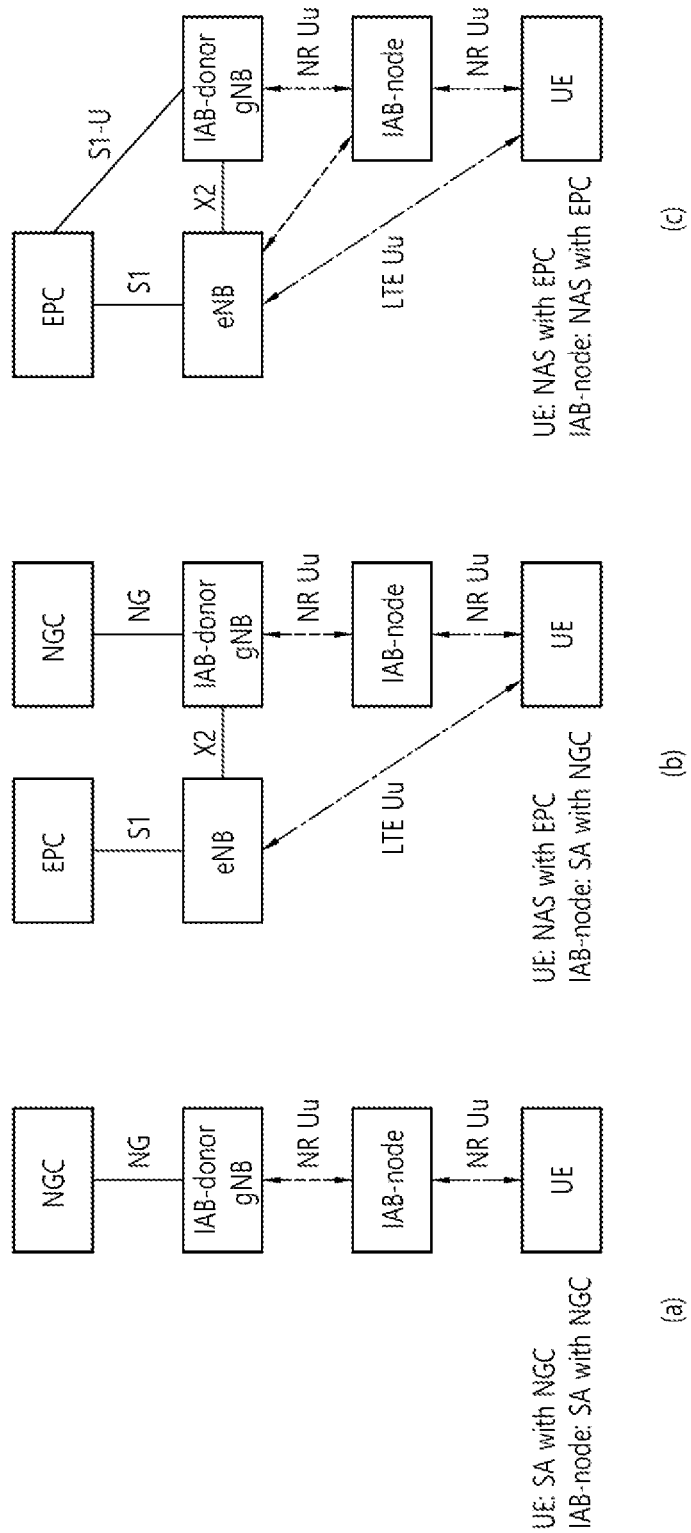
FIG. 22 shows an example of the operation of the IAB system in a standalone (SA) mode and a non-standalone (NSA) mode.

FIG. 22 shows an example of the operation of the IAB system in a standalone (SA) mode and a non-standalone (NSA) mode. Specifically, (a) of FIG. 22 shows an example of the operation of the UE and IAB node considering NGC in SA mode, (b) of FIG. 22 shows an example of the operation of the IAB node considering NGC in SA mode and the UE considering EPC in NSA mode, (c) of FIG. 22 shows an example of the operation of the UE and IAB node considering EPC in the NSA mode.

The IAB node may operate in SA mode or NSA mode. When operating in NSA mode, the IAB node uses only the NR link for backhauling. A UE connected to the IAB node may select an operation mode different from that of the IAB node. The UE may further connect to a different type of core network than the connected IAB node. In this case, (e) DECOR ((enhanced) dedicated core network) or slicing may be used for CN selection. An IAB node operating in NSA mode may be connected to the same or different eNB(s). UEs operating in the NSA mode may be connected to the same or different eNB from the IAB node to which they are connected. FIG. 22 shows an example in consideration of NGC in SA mode and an example in consideration of EPC in NSA mode.

In the IAB scenario, if each relay node (RN) does not have the scheduling capability, the donor gNB (DgNB) shall schedule the entire links between the DgNB, related relay nodes and UEs. In other words, the DgNB should make a scheduling decision for all links by collecting traffic information from all related relay nodes, and then inform each relay node of the scheduling information.

On the other hand, distributed scheduling can be performed when each relay node has a scheduling capability. Then, immediate scheduling of the uplink scheduling request of the UE is possible, and the backhaul/access link can be used more flexibly by reflecting the surrounding traffic conditions.

Figure 23:
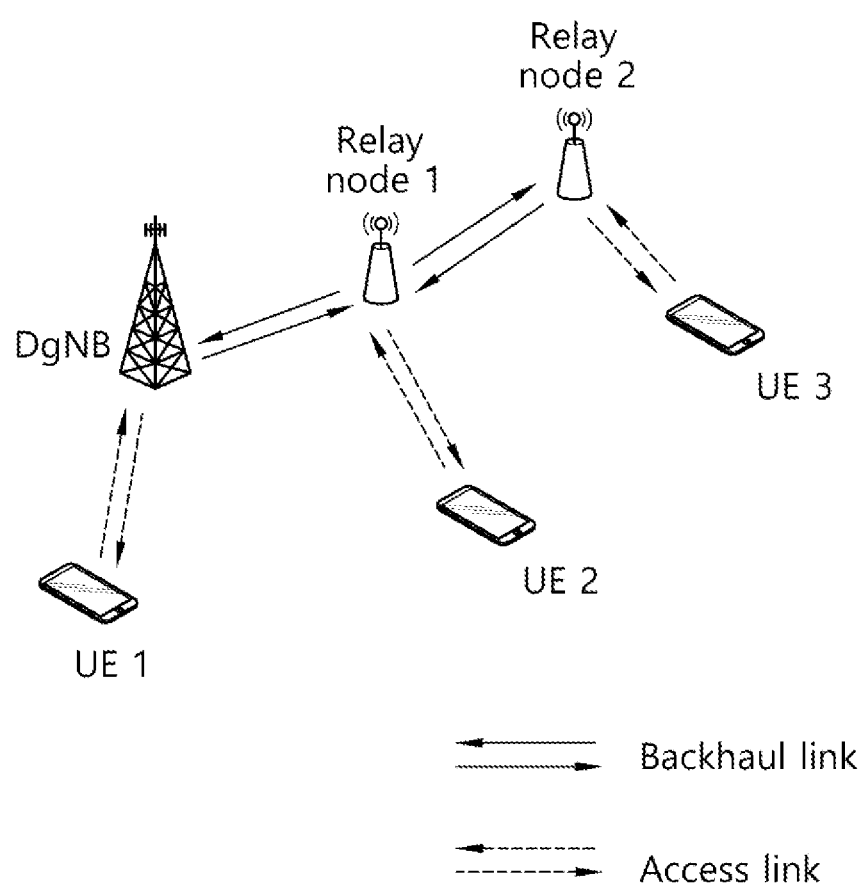
FIG. 23 schematically shows an example of the configuration of access and backhaul links.

FIG. 23 schematically illustrates an example of the configuration of access and backhaul links.

FIG. 23 shows an example in which a backhaul link and an access link are configured when DgNB and IAB relay nodes (RNs) exist. RN(b) and RN(e) are connecting a backhaul link, RN(c) is connecting a backhaul link to RN(b), RN(d) is connecting a backhaul link to RN(c).

Referring to FIG. 23, the DgNB not only receives the scheduling request of UE1, but also receives the scheduling request of UE2 and UE3. Then, the DgNB makes a scheduling decision of two backhaul links and three access links, and informs the scheduling results. Thus, such centralized scheduling involves scheduling delays and introduces latency issues.

On the other hand, distributed scheduling can be performed if each relay node has a scheduling capability. Then, immediate scheduling for the uplink scheduling request of the UE can be performed, and the backhaul/access links can be used more flexibly by reflecting the surrounding traffic conditions.

Figure 24:
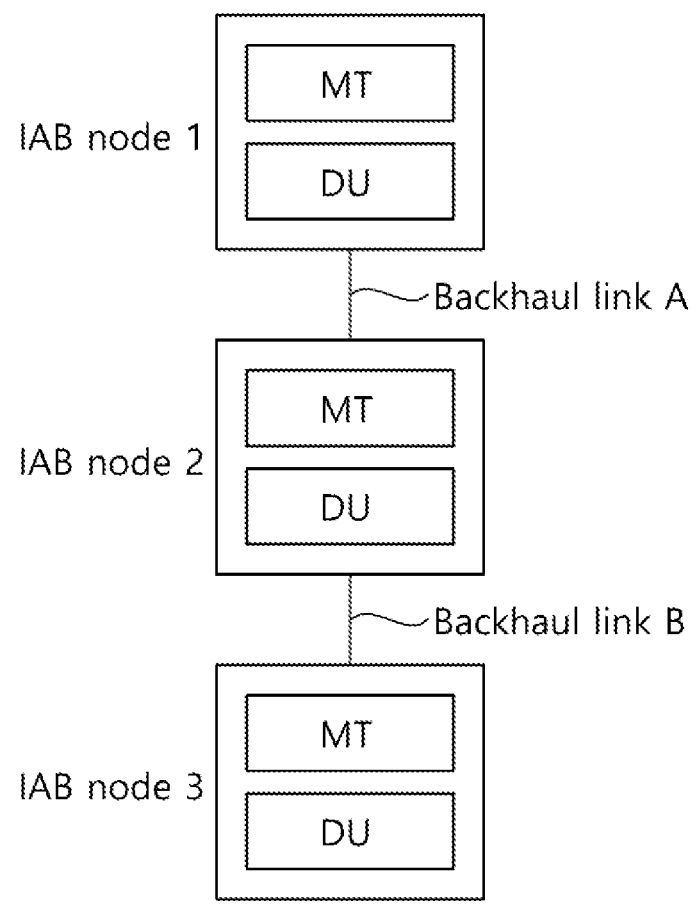
FIG. 24 is for explaining links and relationships between IAB nodes.

FIG. 24 is for explaining links and relationships between IAB nodes.

Referring to FIG. 24, IAB node 1 is connected to IAB node 2 by a backhaul link A. And, for the backhaul link A, IAB node 1 is a parent node of IAB node 2, and IAB node 2 is a child node of IAB node 1. In addition, IAB node 2 is connected to IAB node 3 by a backhaul link B. And, for the backhaul link B, IAB node 2 is a parent node of IAB node 3, and IAB node 3 is a child node of IAB node 2.

Here, each of the IAB nodes may perform two functions. One is mobile termination (MT), which maintains a wireless backhaul connection to an upper IAB node or a donor node. And, the other is a DU (distributed unit), which provides access connection with UEs or connection with MT of a lower IAB node.

For example, from the point of view of IAB Node 2, the DU of IAB Node 2 has a functional backhaul link B with the MT of IAB Node 3. At the same time, the MT of the IAB node 2 has a functional backhaul link A with the DU of the IAB node 1. Here, the child link of the DU of the IAB node 2 may mean a backhaul link B between the IAB node 2 and the IAB node 3. Also, here, the parent link of the MT of the IAB node 2 may refer to the backhaul link A between the IAB node 2 and the IAB node 1.

Hereinafter, the initial access of the IAB node will be described.

In order to initially establish a connection with a parent node or a donor node, the IAB node may follow the same procedure as the UE's initial access procedure including cell search, system information acquisition, and random access. SSB/CSI-RS based RRM measurement is the starting point of IAB node discovery and measurement.

A method of avoiding SSB configuration conflicts between IAB nodes, the IAB inter-node discovery procedure applying half-duplex restriction and multi-hop topology, including the feasibility of IAB node discovery based on CSI-RS, should be considered. Considering the cell ID used by a given IAB node, the following two cases may be considered.

Case 1: Donor node and IAB node share the same cell ID
Case 2: Donor node and IAB node maintain separate cell IDs Furthermore, a mechanism for multiplexing of RACH transmission from UEs and RACH transmission from IAB nodes should be further considered.

For standalone (SA) deployment, the initial IAB node discovery (stage 1) by the MT follows the same initial access procedure as the UE, including cell search, system information acquisition, and random access based on the same SSB available to the access UEs, to initially establish a connection with a parent IAB node or an IAB donor.

In the case of NSA (non-standalone) deployment (from the point of view of access/access UE), the IAB node MT follows the aforementioned stage 1 initial connection in SA deployment (from the point of view of the access UE) when performing the initial connection on the NR carrier. The SSB/RMSI period assumed by the MTs for the initial connection may be longer than the 20 ms assumed for the rel-15 UEs of the NR, and one of the candidate values 20 ms, 40 ms, 80 ms, and 160 ms is selected.

Here, this means that candidate parent IAB nodes/donors shall support both NSA functionality for UE and SA functionality for MT on the NR carrier.

When the IAB node MT performs initial access on the LTE carrier, stage 2 solutions can be used with parent selection of the IAB node by the MT on the NR carrier.

Hereinafter, backhaul link measurement will be described.

Measurements for multiple backhaul links for link management and path selection should be considered. To support half-duplex limiting in terms of a given IAB node, IAB supports detection and measurement of candidate backhaul links (after initial connection) using resources orthogonal to the resources used by access UEs for cell detection and measurement. In this regard, the following may be further considered.

TDM of a plurality of SSBs (e.g., may follow hop order, cell ID, etc.)
SSB muting across IAB nodes
Multiplexing of SSB for access UEs and IAB nodes within or across half-frames
Additional IAB node discovery signal to be TDMed with SSB transmission (e.g., CSI-RS)
Use of off-raster SSB
different transmission period for backhaul link detection and measurement compared to the period used by access UEs Coordination mechanisms for different solutions should be further considered, including coordination mechanisms for measurement time and reference signal (RS) transmission for IAB nodes.

Improvement of SMTC and CSI-RS configuration to support RRM measurement for IAB nodes may be considered.

For the purpose of backhaul link RSRP/RSRQ RRM measurement, IAB supports SSB-based and CSI-RS-based solutions.

After the IAB node DU is activated, for the purpose of inter IAB node and donor detection (stage 2), the IAB inter-node discovery procedure needs to consider the half-duplex limit for the IAB node and multi-hop topology. The following solution is supported: SSB based solution—use of SSBs orthogonal (TDM and/or FDM) to SSBs used for access UEs.

Hereinafter, backhaul link management will be described.

The IAB node supports a mechanism for detecting/recovering backhaul link failures. Enhancements to beam failure recovery (BFR) and radio link failure (RLF) procedures are advantageous and should be supported for NR IAB as follows.

Improvement of support for interaction (interaction) between beam failure recovery success indication and RLF.
Improvement of current beam management procedures for faster beam switching/coordination/recovery to avoid backhaul link outage should be considered for IAB nodes.

Further, for example, when the backhaul link of the parent IAB node fails, etc., the need for an additional backhaul link condition notification mechanism from the parent IAB node to the child IAB node and the need for the corresponding IAB node operation is discussed. Solutions to avoid RLF in child IAB node due to parent backhaul link failure should be supported.

Hereinafter, a mechanism for changing a path or transmitting/receiving in a plurality of backhaul links will be described.

Mechanisms (e.g., multi-TRP (Tx/Rx point) operation and intra-frequency dual connectivity) for efficient re-route or transmit/receive simultaneously in multiple backhaul links should be considered.

Hereinafter, the scheduling of the backhaul and access link will be described.

Downlink IAB node transmission (i.e., transmission from the IAB node on the backhaul link to the child IAB node served by the IAB node and transmission to the UEs served by the IAB node on the access link) shall be scheduled by the IAB node itself. Uplink IAB transmission (transmission from the IAB node to its parent or donor node on the backhaul link) shall be scheduled by a parent node or a donor node.

The following describes multiplexing of access and backhaul links.

IAB supports TDM, FDM and SDM between access and backhaul links at the IAB node according to half-duplex restrictions. A mechanism for efficient TDM/FDM (frequency division multiplexing)/SDM (spatial division multiplexing) multiplexing of access/backhaul traffic across multiple hops taking into account IAB node half-duplex restrictions should be considered. The following solutions for different multiplexing options can be further considered.

A mechanism for orthogonal partitioning of time slots or frequency resources between access and backhaul links across one or more hops
  Utilization of different DL/UL slot settings for access and backhaul links
  DL and UL power control enhancement and timing requirements to allow intra-panel FDM and SDM of backhaul and access link
  Interference management including cross-link interference Hereinafter, resource coordination will be described.

Mechanisms for scheduling coordination, resource allocation and path selection across the IAB node/donor node and multiple backhaul hops should be considered. The coordination of resources (frequency, time in terms of slot/slot format, etc.) between semi-static IAB nodes (on the time scale of RRC signaling) should be supported. The following aspects may be further considered.

Distributed or centralized coordination mechanism
  Resource granularity of the required signal (e.g., TDD configuration pattern)
  Exchange of L1 (layer-1) and/or L3 (layer-3) measurements between IAB nodes
  Exchange of topology-related information (e.g. hop order) affecting backhaul link physical layer design
  Coordination of resources (frequency, time in terms of slot/slot format, etc.) faster than semi-static coordination Hereinafter, IAB node synchronization and timing alignment will be described.

Feasibility of over-the-air (OTA) synchronization and the impact of timing misalignment on IAB performance (e.g., the number of supportable hops) should be considered. Assuming a timing requirement of 3 us or less at IAB nodes in overlapping coverage, TA-based OTA synchronization can support multi-hop IAB networks (up to 5 hops) for FR 2. TA based OTA synchronization may not be sufficient to support multiple hops in FR1.

The next level of alignment between IAB nodes/IAB donors or within IAB nodes is discussed.

Slot-level alignment
  Symbol-level alignment
  No alignment

A mechanism for timing alignment in a multi-hop IAB network is discussed. IAB supports TA-based synchronization between IAB nodes including multiple backhaul hops. Improvements to existing timing alignment mechanisms are discussed, including TAs required for IAB nodes to support different transmission timing alignment cases.

The following transmission timing alignment case across IAB nodes and IAB donors is discussed.

Case 1: DL transmission timing alignment across IAB node and IAB donor: If downlink transmission and uplink reception are not well aligned at the parent node, the child node needs additional information on the alignment to properly set its downlink transmission timing for OTA-based timing and synchronization.
  Case 2: Downlink and uplink transmission timings are aligned for one IAB node.
  Case 3: Downlink and uplink reception timings are aligned for one IAB node.
  Case 4: For one IAB node, in case of transmission using case 2 when receiving using case 3.
  Case 5: Case 4 for backhaul link timing for one IAB node in different time slots and Case 1 for access link timing
  Case 6: Sum of downlink transmission timing of Case 1 and uplink transmission timing of Case 2: The downlink transmission timing of all IAB nodes is aligned with the downlink timing of the parent IAB node or the donor; The uplink transmission timing of the IAB node may be aligned with the downlink transmission timing of the IAB node.
  Case 7: Sum of the downlink transmission timing of Case 1 and the uplink reception timing of Case 3: The downlink transmission timing of all IAB nodes is aligned with the downlink timing of the parent IAB node or the donor; The uplink reception timing of the IAB node may be aligned with the downlink reception timing of the IAB node; If downlink transmission and uplink reception are not well aligned in the parent node, the child node needs additional information on the alignment to properly set its downlink transmission timing for OTA-based timing and synchronization.

Impact of different cases on TDM/FDM/SDM multiplexing of parent and child links, potential impact of incomplete timing adjustment, overhead of required downlink/uplink switching gap, cross-link interference, the impact of feasibility and access UEs (particularly compatibility with rel-15 UEs) when an IAB node is connected with one or more parent nodes are discussed.

Case 1 is supported for both access and backhaul link transmission timing alignment.

Cases 2-5 are not supported for IAB.

The use of case 6 for IAB nodes, if supported, should be under the control of the parent or network. To enable alignment of downlink transmission between IAB nodes, examples of the following solutions have been identified.

Alternative 1: IAB nodes may have to perform parallel (always time multiplexed) Case 1 and Case 6 uplink transmissions.
  Alternative 2: Signaling between the parent and the IAB node for the time difference of the downlink transmission and uplink reception timing at the parent node to correct potential misalignment of the downlink transmission timing at the child node: The child IAB node compares the corresponding difference in its downlink transmission timing and backhaul reception timing; If the signaled difference of the parent node is greater than that measured by the child node, if the transmission timing is smaller, the child node advances its transmission timing.

Here, Alternative 1 and Alternative 2 may have to maintain separate reception timing in the parent node for case 6 uplink transmission from other child nodes.

In case 7, by introducing TDM between child IAB node/Rel-16 UEs supporting an effective negative TA and a new TA value and child IAB nodes/UEs that do not support the new TA value, it is compatible for Rel-15 UEs. To enable alignment between downlink and uplink reception within an IAB node, examples of the following solutions have been identified.

Alternative 1: Introduce negative initial time alignment (TA) to be applied to the child node of the IAB node to which the case 7 timing is applied.

Alternative 2: In the IAB node, apply a positive TA that enables symbol alignment rather than slot alignment between downlink reception and uplink reception.

Alternative 3: Signaling of the relative offset of the most recent TA value, to be applied to the child node of the IAB node to which the case 7 timing is applied to achieve an efficient negative TA.

In addition to OTA synchronization, other techniques such as GNSS and PTP may be used to obtain synchronization between IAB nodes.

In the following, cross-link interference measurement and management will be described.

The impact of cross-link interference (CLI) on access and backhaul links (including spanning multiple hops) shall be considered. Furthermore, interference measurement and management solutions should be considered.

Hereinafter, a CLI mitigation technique will be described.

CLI mitigation techniques including advanced receiver and transmitter coordination should be considered and prioritized in terms of complexity and performance. CLI mitigation technology shall be able to manage the following IAB-to-node interference scenarios.

Case 1: The victim IAB node receives in downlink through its MT, and the interfering IAB node transmits in uplink through its MT.

Case 2: The victim IAB node receives in downlink through its MT, and the interfering IAB node transmits in downlink through its DU.

Case 3: The victim IAB node receives in uplink through its DU, and the interfering IAB node transmits in uplink through its MT.

Case 4: The victim IAB node receives in uplink through its DU, and the interfering IAB node transmits in downlink through its DU.

In the case of FDM/SDM reception between access and backhaul links at a given IAB node, the interference experienced at the IAB node should be further considered.

Hereinafter, spectral efficiency enhancement will be described.

Support of 1024 quadrature amplitude modulation (QAM) for the backhaul link should be considered.

Hereinafter, DAPS-HO (dual active protocol stack based handover) will be described.

From the functional point of view of the UE, DAPS may generally have the following characteristics:
1) Transmission Operation:
   Common SN
   Separate header compression for a source cell and a target cell
   Separate ciphering for source cell and target cell
2) Reception Operation:
   Separate deciphering for source cell and target cell
   Separate header decompression for source cell and target cell
   Common PDCP reordering
   in-sequence delivery and duplication detection
   common buffer management In general, the network side and the UE have a common process and function for transmission and reception. The only difference is whether these functions are co-located or not. On the network side, all functions except for DL PDCP SN allocation and UL PDCP reordering do not coexist and are separately performed by the source eNB or the target eNB. Accordingly, it is assumed that two PDCP entities are located in the source eNB and the target eNB, respectively.

On the UE side, all functions including SN allocation and PDCP reordering are co-located. Therefore, all functions for DAPS can be modeled as a single PDCP entity on the UE side. For single UL data transmission, only header compression and security processing for the source eNB or target eNB is used.

Hereinafter, RF/baseband requirements of the UE for DAPS-HO will be described.

In order to minimize interruption, the UE needs to continue transmitting/receiving data with the source cell when performing the random access procedure to the target cell regardless of whether it is SAPS or DAPS. This is possible only when the UE supports simultaneous transmission/reception for two cells. According to the RAN4 response LS, in most cases it works for UEs with dual Rx/dual Tx chains, and more restrictions should be applied to UEs with dual Rx/single Tx RF chains or single Rx/single Tx RF chains. Furthermore, there is a request for UE capability split for efficient use of baseband and RF resources. The UE baseband and RF resource tuning is not very simple for SAPS, resulting in additional disruption and complexity of the UE.

For a UE with a dual Rx/single Tx RF chain, in order to simultaneously support uplink data transmission to the source eNB and uplink RACH to the target eNB, if some requirements can be satisfied, for example, if the bandwidth of the source cell is greater than the bandwidth of the target cell, if the transmission power difference for the two cells is within a certain limit, the simultaneous transmission may still be supported. Otherwise, some kind of uplink TDM pattern is required, which adds additional downtime and uplink switching complexity. However, this UE option provides flexibility of implementation types of various UEs in terms of hardware and power efficiency (particularly, UEs in which low tier devices, uplink CA and/or uplink MIMO are not possible). From a standard point of view, at least these types of UEs should be supported as another option.

For a UE with a single Rx/single Tx RF chain, if some requirements can be satisfied, for example, if the bandwidth of the source cell is greater than the bandwidth of the target cell, and the transmit/receive power difference for the two cells is within a certain limit, simultaneous transmission/reception may still be supported. Otherwise, a TDM design is required for both the downlink and the uplink, which adds additional complexity to both the UE and the network side. Furthermore, RF chain switching is required for both downlink and uplink, which increases HO downtime and switching complexity.

In general, instead of limiting the solution to only one type of capability, solutions for all types of UE capabilities should be designed. Therefore, a solution that supports both dual Rx/dual Tx as a baseline and dual Rx/single Tx and single Rx/single Tx as an alternative option should be considered.

If the UE indicates the capability for DAPS-HO, the UE may be provided with a source master cell group (MCG) and a target MCG.

If a master cell group (MCG) and a secondary cell group (SCG) using NR radio access in FR1 and/or FR2 are configured for the UE, the UE is configured with the maximum power $P_{MCG}$ for transmission on the MCG by p-DAPS-FR1 and/or p-DAPS-FR2, is configured with the maximum power $P_{SCG}$ for transmission on SCG by p-DAPS-FR1 and/or p-DAPS-FR2. Inter-CG power sharing mode is set by UplinkPowerSharingDAPS-HO-mode for FR1 and/or UplinkPowerSharingDAPS-HO-mode for FR2. The UE determines the transmission power on the MCG and the transmission power on the SCG for each frequency range.

If the UE indicates UplinkPowerSharingDAPS-HO=Semistatic-mode1 and if UplinkPowerSharingDAPS-HO-mode=Semi-static-mode1 is provided, the UE considers the target MCG as the MCG and the source MCG as the SCG to determine the transmission power for the target MCG or the source MCG for UplinkPowerSharingDAPS-HO=Semi-static-mode1.

If the UE indicates UplinkPowerSharingDAPS-HO=Semistatic-mode2 and is provided with UplinkPowerSharingDAPS-HO-mode=Semi-static-mode2, the UE considers the target MCG as the MCG and the source MCG as the SCG to determine the transmission power for the target MCG or the source MCG for UplinkPowerSharingDAPS-HO=Semi-static-mode2.

If the UE indicates UplinkPowerSharingDAPS-HO=Dynamic and is provided with UplinkPowerSharingDAPS-HO-mode=Dynamic, the UE considers the target MCG as the MCG and the source MCG as the SCG to determine the transmission power for the target MCG or the source MCG for UplinkPowerSharingDAPS-HO=Dynamic.

If the UE is not provided with UplinkPowerSharingDAPS-HO and the UE transmissions on the target cell and the source cell overlap, the UE transmits only on the target cell.

If the carrier frequencies for the target MCG and the source MCG are intra-frequency and intra-band when UE transmission on the target cell and the source cell overlaps in time resources, if the carrier frequencies for the target MCG and the source MCG are not within the frequency (intra-frequency) but within the band (intra-band) when the UE transmissions on the target cell and the source cell overlap in the time resource and the frequency resource, UE transmissions on the target cell and the source cell overlap.

For intra-frequency DAPS-HO operation, the UE expects that the active downlink BWP and the active uplink BWP on the target cell are in the active downlink BWP and the active uplink BWP on the source cell, respectively.

The UE may provide pdcch-BlindDetectionMCG1-UE to indicate the ability to monitor the maximum number of PDCCH candidates per slot corresponding to $N^{target}_{cells}$ downlink cells for the target MCG, and may provide pdcch-BlindDetectionMCG2-UE to indicate the ability to monitor the maximum number of PDCCH candidates per slot corresponding to $N^{source}_{cells}$ downlink cells for the source MCG. If the UE is provided with search space sets for both the target MCG and the source MCG, the UE does not expect to have a USS set without assigned PDCCH candidates for monitoring both the target MCG and the source MCG in any slot.

Hereinafter, the proposal of the present disclosure will be described in more detail.

The following drawings were created to explain a specific example of the present specification. Since the names of specific devices described in the drawings or the names of specific signals/messages/fields are presented by way of example, the technical features of the present specification are not limited to the specific names used in the following drawings. In addition, the methods/configurations proposed in this specification may be combined in various ways.

The existing IAB node performed a TDM operation in which the IAB node DU and the IAB node MT operate through different time resources. On the other hand, it may be required to perform resource multiplexing such as SDM/FDM and full duplexing (FD) between the IAB node DU and the IAB node MT for efficient resource management. As shown in FIG. 24, the link between IAB Node 2 (MT of IAB Node 2) and the parent node of IAB Node 2 (DU of IAB Node 1) is called the parent link, and a link between IAB node 2 (DU of IAB node 2) and child node of IAB node 2 (MT of IAB node 3) may be referred to as a child link. At this time, in addition to the TDM operation between the parent link and the child link, SDM/FDM and FD operations are being discussed.

Figure 25:
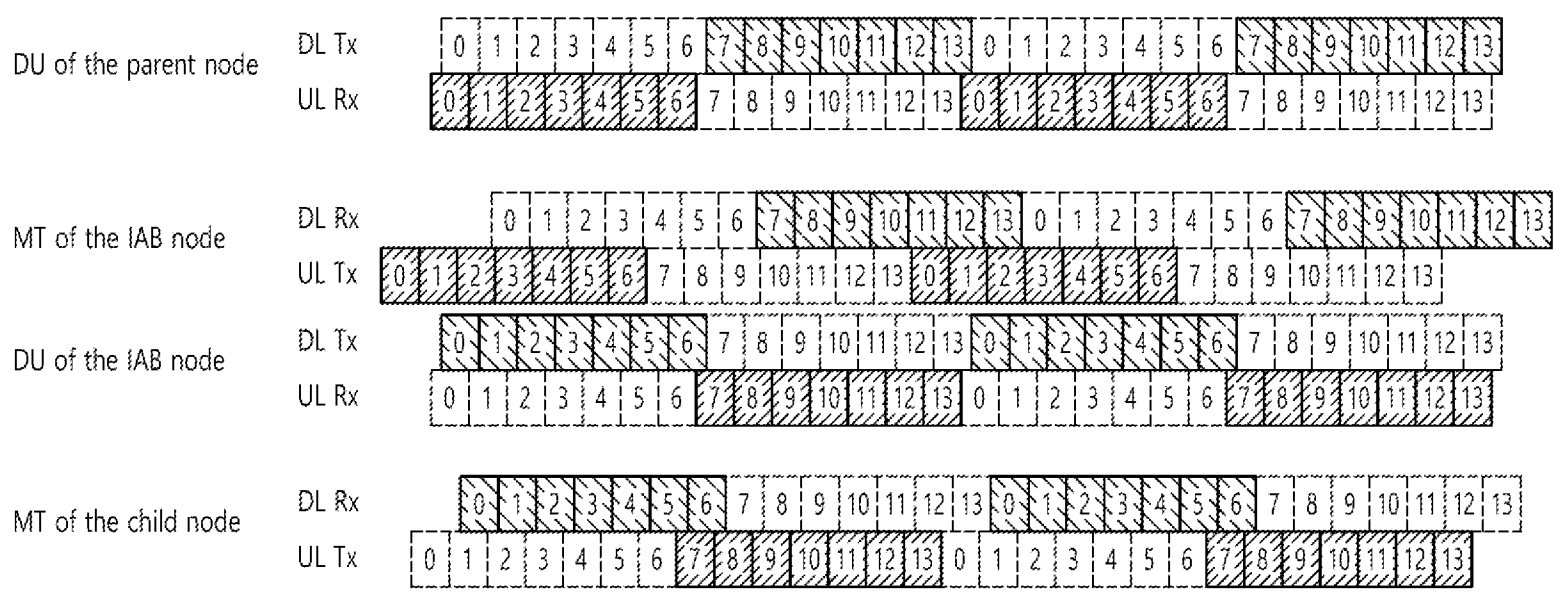
Figure 26:
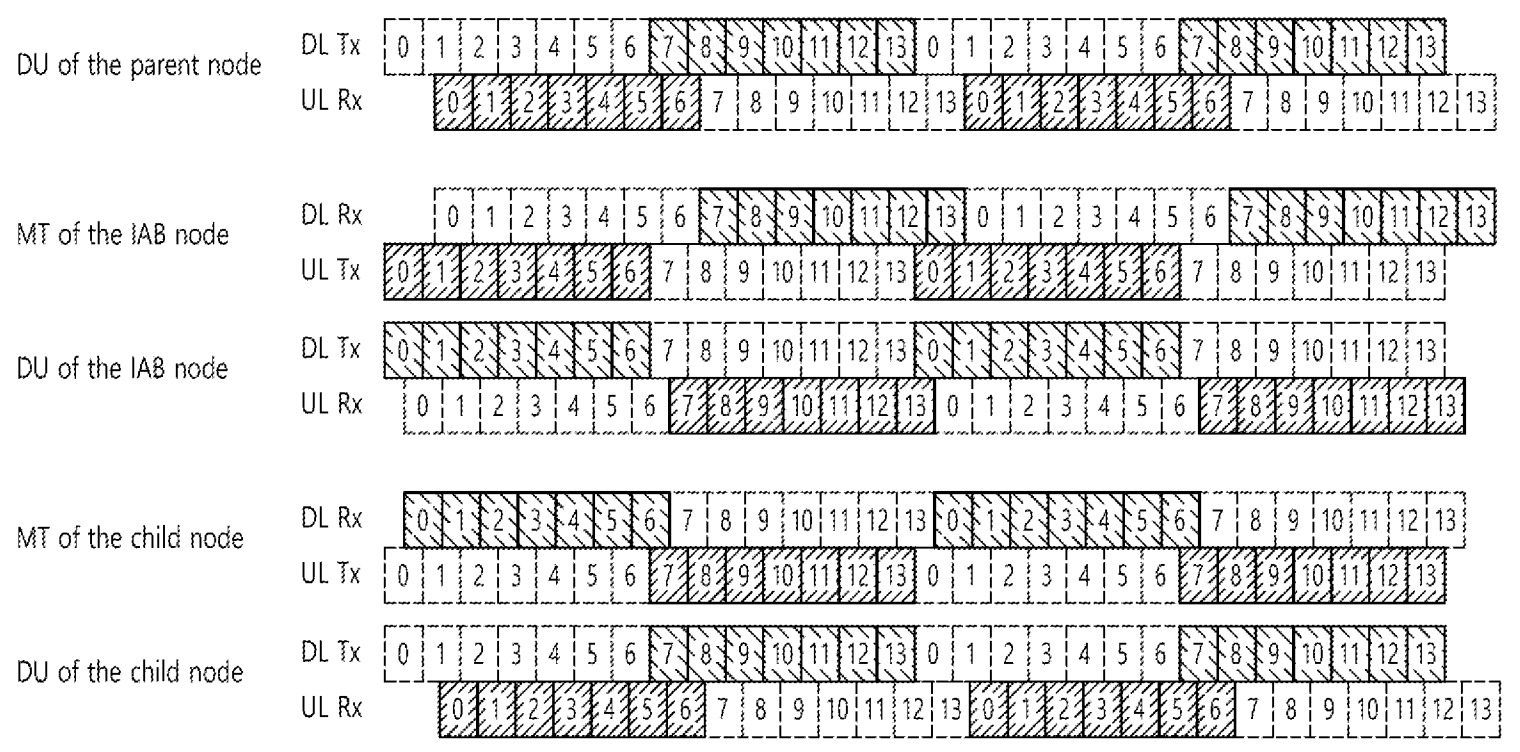
Figure 27:
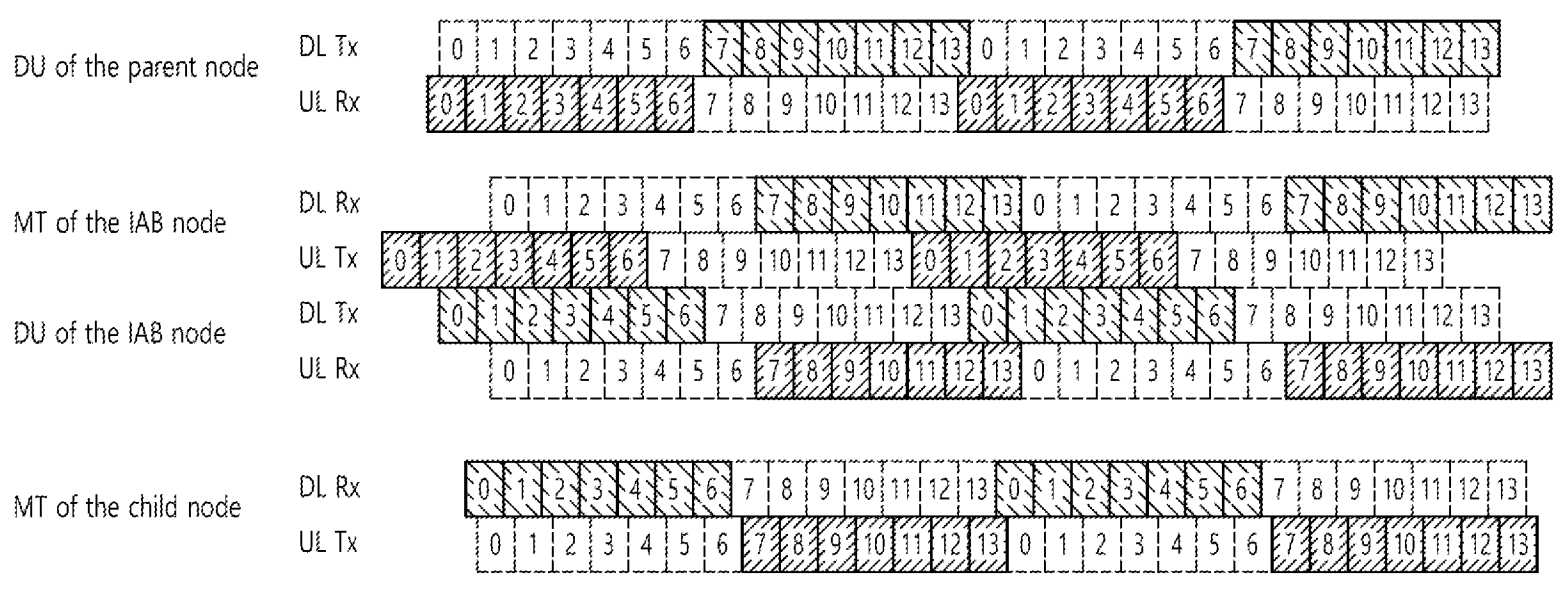

With reference to FIGS. 25 to 27, the following three examples of alignment of transmission/reception timing of an IAB node that can be considered in an IAB environment will be described. FIG. 25 shows timing alignment case 1, FIG. 26 shows timing alignment case 6, FIG. 27 shows timing alignment case 7.

Timing alignment case 1: DL transmission timing alignment across IAB nodes and IAB donors. This is a method in which downlink transmission timings of DUs between IAB nodes are aligned.

Referring to timing alignment case 1, if downlink transmission and uplink reception are not well aligned in the parent node, the child node needs additional information on the alignment to properly set its downlink transmission timing for OTA-based timing and synchronization. The MT transmission timing may be expressed as (MT reception timing-TA (timing advance)), and the DU transmission timing may be expressed as (MT reception timing-TA/2-$T_A$). Here, the $T_A$ value can be obtained from the parent node.

Timing alignment case 6: The DL transmission timing for all IAB nodes is aligned with the DL timing of the parent IAB node or donor. The UL transmission timing of the IAB node may be aligned with the DL transmission timing of the IAB node.

Referring to the timing alignment case 6, the uplink transmission timing for the MT of the IAB node and the downlink transmission timing for the DU of the IAB node are aligned. Since the uplink transmission timing of the MT of the IAB node is fixed, the uplink reception timing of the DU of the parent node receiving this is delayed by a propagation delay between the DU of the parent node and the MT of the IAB node compared to the uplink transmission timing of the MT of the IAB node. If the IAB node uses timing alignment case 6, since the uplink reception timing of the parent node is different from that of the existing one, if the IAB node wants to use the timing alignment case 6, the parent node also needs to know that information.

Timing alignment case 7: The downlink transmission timings of all IAB nodes are aligned with the downlink timings of the parent IAB node or the donor. The uplink reception timing of the IAB node may be aligned with the downlink reception timing of the IAB node.

Referring to Timing Alignment Case 7, if downlink transmission and uplink reception are not well aligned in the parent node, in order to properly configure its own downlink transmission timing for OTA-based timing and synchronization for a child node, additional information about the alignment is required. This is a scheme in which the MT downlink reception timing of the IAB node and the DU uplink reception timing of the IAB node are aligned. The transmission/reception timing from the MT perspective is the same as that of the existing IAB node or Rel-16 IAB node, the uplink reception timing of the DU of the IAB node may be aligned with the downlink reception timing of the MT of the IAB node. The IAB node may adjust the TA of the MTs of the child node so that the MTs of the child node transmit an uplink signal according to its uplink reception timing. Therefore, this timing alignment method may not reveal a difference in the operation of the IAB node according to specification when compared to the timing alignment case 1. Accordingly, timing alignment case 7 described herein may be replaced/interpreted as timing alignment case 1.

Meanwhile, in the present specification, timing alignment may mean slot-unit alignment or symbol-unit alignment.

The IAB node DU and the IAB node MT that exist in the same IAB node or co-located cannot operate at the same time and can be operated by TDM due to reasons such as intra-node interference, slot/symbol boundary misalignment, and power sharing.

On the other hand, multiplexing of SDM/FDM between the DU of the IAB node and the MT of the IAB node may be used. This is applicable, for example, when the DU of the IAB node and the MT of the IAB node use different panels, so there is little interference between panels. In this case, the DU of the IAB node existing or coexisting within the same IAB node and the MT of the IAB node can transmit or receive at the same time, it is impossible for the DU of the IAB node and the MT of the IAB node to simultaneously perform transmission and reception or reception and transmission, respectively.

Alternatively, full duplexing (FD) may be used between the DU of the IAB node and the MT of the IAB node. This is, for example, when there is little interference effect between the DU of the IAB node and the MT of the IAB node, such as when the frequency region in which the DU of the IAB node operates and the frequency region in which the MT of the IAB node operates are far apart. In this case, the DU of the IAB node and the MT of the IAB node existing or coexisting within the same IAB node can freely transmit and receive simultaneously. The DU of the IAB node and the MT of the IAB node can transmit or receive at the same time, and it is also possible that the DU of the IAB node and the MT of the IAB node perform transmission and reception or reception and transmission at the same time, respectively.

Figure 28:
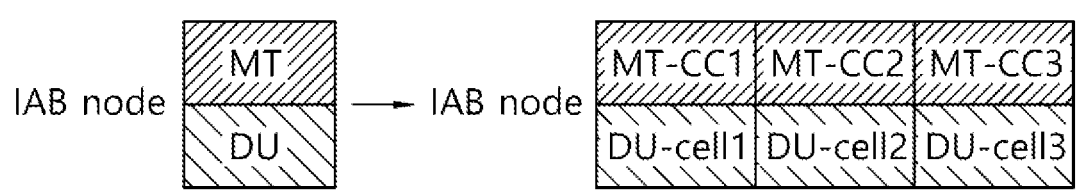
FIG. 28 illustrates an example in which a plurality of component carriers are configured for an IAB node.

FIG. 28 illustrates an example in which a plurality of component carriers are configured for an IAB node.

The MT of the IAB node and the DU of the IAB node may consist of a plurality of component carriers (CCs). In this case, different CCs may operate in the same or different frequency regions, or may use the same or different panels. For example, as shown in FIG. 28, three CCs may exist for each MT and DU in the IAB node. In FIG. 28, three CCs existing for the MT of the IAB node may be named MT-CC1, MT-CC2, and MT-CC3, respectively. In the case of DU, the CC may be replaced with a cell and may be called DU-cell1, DU-cell2, and DU-cell3.

In this case, one of TDM, SDM/FDM, and FD may be applied between a specific CC of the IAB node MT and a specific cell of the DU of the IAB node. For example, when a specific MT-CC and a DU-cell are located in different inter-band frequency regions, FD may be applied between the corresponding MT-CC and the DU-cell. On the other hand, the TDM scheme may be applied between the MT-CC and the DU-CC located in the same frequency region. In FIG. 28, MT-CC1, MT-CC2, DU-cell1, and DU-cell2 have f1 as a center frequency, MT-CC3, DU-cell3 have f2 as a center frequency, and f1 and f2 may be located in an inter-band relationship with each other. In this case, it operates in TDM with DU-cell1 and DU-cell2 in the position of MT-CC1 or MT-CC2, but may operate in FD with DU-cell3. On the other hand, from the standpoint of MT-CC3, it operates in FD with DU-cell1 and DU-cell2, but may operate in TDM with DU-cell3.

On the other hand, a different multiplexing scheme between the MT and the DU may be applied even within the same CC. For example, a plurality of parts may exist in the MT-CC and/or the DU-cell. Such a part may mean, for example, a link transmitted through an antenna having the same center frequency but a different physical location or a different panel. Alternatively, for example, the part may mean a link having the same center frequency but transmitted through different bandwidth parts (BWP). In this case, for example, when two parts exist in DU-cell1, a multiplexing type operating with a specific MT-CC or a specific part within a specific MT-CC may be different for each part. What will be described later is a case in which the type of multiplexing applied to each pair of CC of the MT of the IAB node and the cell of the DU of the IAB node may be different. However, it can also be extended and applied to a case in which the MT of the IAB node and the DU of the IAB node are divided into a plurality of parts, the multiplexing type applied for each pair of the CC and part of the MT of the IAB node and the cell and part of the DU of the IAB node may be different.

It may be considered that one IAB node is connected to two or a plurality of parent nodes. In this case, the MT of the IAB node may be connected to the DUs of the two parent nodes using a dual-connectivity (DC) method. The IAB node may have redundant routes to the IAB-donor centralized unit (CU). For IAB nodes operating in SA-mode, NR DC can be used to enable route redundancy in BH by allowing IAB-MT to have concurrent backhaul (BH) radio link control (RLC) channels with two parent nodes. Parent nodes may need to be connected to the same IAB-donor CU-CP (control plane) that controls establishment and release of a redundant route through the two parent nodes. Together with the IAB-donor CU, the parent nodes can acquire the roles of the master node and secondary node of the IAB-MT. The NR DC framework (e.g., MCG/SCG related procedures) may be used to establish dual radio links with parent nodes.

As one of the methods in which the IAB MT is connected to the DUs of two parent nodes, the following scenario may be considered.

Figure 29:
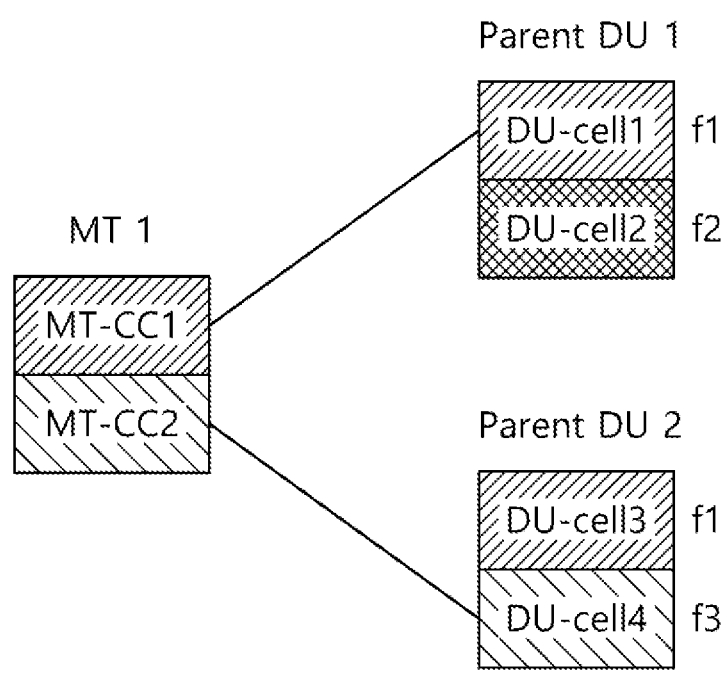
FIG. 29 schematically shows an example of Scenario 1.

Scenario 1: Multiple Parent DU Connection Using Different MT-CCs with Adjacent Carrier Frequencies FIG. 29 schematically shows an example of Scenario 1.

The MT of the IAB node may establish a connection with the DUs of a plurality of parent nodes (this may be simply referred to as a parent DU in this specification) using different MT-CCs. That is, one MT-CC establishes a connection with one parent DU-cell, and the corresponding parent DU-cells may exist in different parent DUs. For example, as shown in FIG. 29, MT-CC1 and MT-CC2 exist in the MT of the IAB node, MT-CC1 is connected to DU-cell 1 in the parent DU1, and MT-CC2 can be connected to the DU-cell4 in the parent DU2. In this case, a link between one MT-CC and one DU-cell may be referred to as one parent link from the point of view of the MT of the IAB node. In this case, the link between MT-CC1 and DU-cell 1 and the link between MT-CC2 and DU-cell 4 become different parent links.

In this way, in order to establish a connection with a DU-cell in different parent DUs using different MT-CCs, the existing DC method may be used. In this case, when the MT of the IAB node is connected to two parent DU-cells using different MT-CCs, one parent DU-cell may belong to the MCG and the other parent DU-cells may belong to the SCG.

It can be assumed that each MT-CC of the MT of the IAB node has an RF chain independent of each other. Accordingly, each MT-CC may perform transmit/receive operations independently and simultaneously with each other. Each MT-CC may set and manage transmission/reception timing based on a parent DU-cell connected to it.

In Scenario 1, it is considered that MT-CCs connected to different parent DUs operate on different carrier frequencies in the above-described situation. That is, in FIG. 29, the link between MT-CC1 and DU-cell 1 and the link between MT-CC2 and DU-cell 4 may have different carrier frequencies. In FIG. 29, the link between MT-CC1 and DU-cell 1 has a carrier frequency of f1, while the link between MT-CC2 and DU-cell 4 has a carrier frequency of f3. In this case, carrier frequency regions operating between two parent links may be adjacent. In this case, when the parent links operate in different downlink/uplink directions, cross link interference may occur. In this scenario, a situation in which the carrier frequency region between two parent links is adjacent to each other causes cross-link interference to the extent that it affects the performance.

Figure 30:
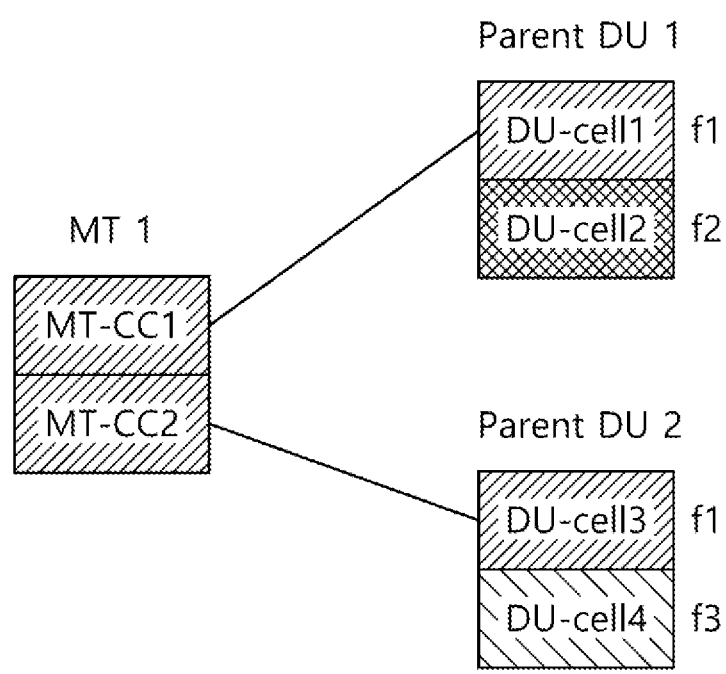
FIG. 30 shows an example of scenario 2.

Scenario 2: Multiple Parent DU Connection Using Different MT-CCs Having the Same Carrier Frequency FIG. 30 shows an example of scenario 2.

The MT of the IAB node may establish a connection with a plurality of parent DUs using different MT-CCs. That is, one MT-CC establishes a connection with one parent DU-cell, and the corresponding parent DU-cells may exist in different parent DUs. For example, as in FIG. 30, MT-CC1 and MT-CC2 exist in the MT of the IAB node, MT-CC1 is connected to DU-cell 1 in the parent DU1, MT-CC2 may be connected to DU-cell 3 in the parent DU2. In this case, a link between one MT-CC and one DU-cell may be referred to as one parent link from the point of view of the MT of the IAB node. In this case, the link between MT-CC1 and DU-cell 1 and the link between MT-CC2 and DU-cell 3 become different parent links.

In this way, in order to establish a connection with a DU-cell in different parent DUs using different MT-CCs, the existing DC method may be used. In this case, when the MT of the IAB node is connected to two parent DU-cells using different MT-CCs, one parent DU-cell may belong to the MCG, and the other parent DU-cell may belong to the SCG.

It can be assumed that each MT-CC of the MT of the IAB node has an RF chain independent of each other. Accordingly, each MT-CC may perform transmit/receive operations independently and simultaneously with each other. Each MT-CC may set and manage transmission/reception timing based on a parent DU-cell connected to it.

In the situation described above in Scenario 2, it is considered that MT-CCs connected to different parent DUs operate on the same carrier frequency. That is, in FIG. 30, a situation in which the link between the MT-CC1 and the DU-cell 1 and the MT-CC2 and the DU-cell 3 have the same carrier frequency is considered. That is, in this scenario, it means that different MT-CCs in the MT of the IAB node can operate with the same carrier frequency, and it means that a plurality of MT-CCs can exist in the same frequency region. In FIG. 30, the link between MT-CC1 and DU-cell 1 has a carrier frequency of f1, and the link between MT-CC2 and DU-cell 3 also has a carrier frequency of f1. In this case, cross-link interference may occur when the parent links operate in different downlink/uplink directions. In addition, when resources for transmitting an actual downlink signal/channel to the two MT-CCs overlap each other, interference may occur. Even in the case of uplink, when uplink signals/channels transmitted by two MT-CCs overlap, an uplink signal/channel transmitted to a specific parent DU may act as interference to other parent DUs.

Scenario 3: Connecting Multiple Parent DUs Using a Single MT-CC

Figure 31:
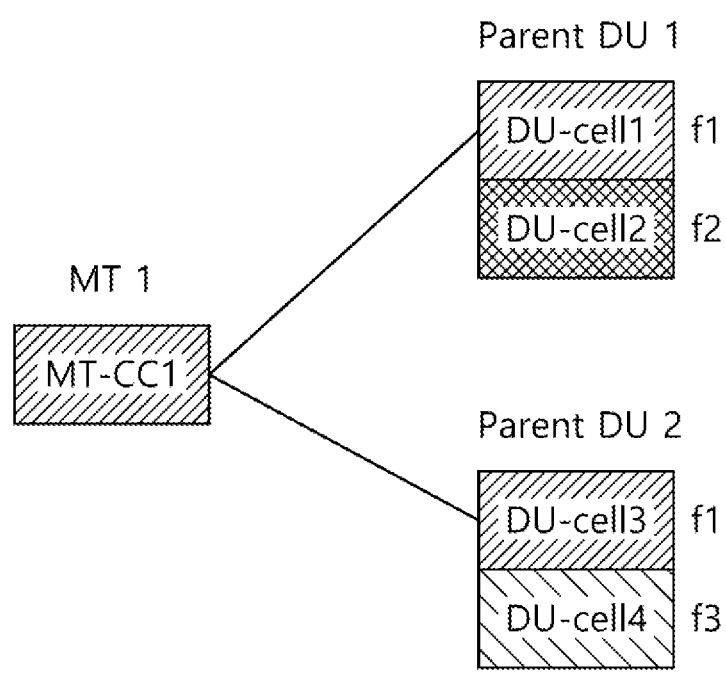
FIG. 31 shows an example of scenario 3.

FIG. 31 shows an example of scenario 3.

The MT of the IAB node may establish a connection with a plurality of parent DUs using one MT-CC. That is, one MT-CC may establish a connection with a plurality of parent DU-cells, and the corresponding parent DU-cells may exist in different parent DUs. For example, as in FIG. 31, MT-CC1 exists in the MT of the IAB node, and MT-CC1 may be connected to DU-Cell1 in parent DU1 and DU-Cell4 in parent DU2. In this case, a link between one MT-CC and one DU-cell may be referred to as one parent link from the point of view of the MT of the IAB node. In this case, the link between MT-CC1 and DU-cell 1 and the link between MT-CC1 and DU-cell 4 become different parent links. In FIG. 31, the link between MT-CC1 and DU-cell 1 has a carrier frequency of f1, and the link between MT-CC1 and DU-cell 3 also has a carrier frequency of f1.

Scenario 3-1: Multiple Parent DU Connection with Multiple RF Modules

One MT-CC in the MT of the IAB node may have a plurality of RF chains. That is, one MT-CC can support different parent DUs on the same carrier frequency by using two RF modules. In this case, MT-CC is one, but by supporting independent RF modules, it is possible to establish a connection with a plurality of parent DUs at the same time. Accordingly, the MT-CC may independently and simultaneously perform transmit/receive operations for a plurality of parent DUs. Each RF module of the MT-CC can set and manage the transmission/reception timing based on the parent DU-cell connected to it. In this case, cross-link interference may occur when the parent links operate in different downlink/uplink directions. In addition, when resources for transmitting an actual downlink signal/channel through two parent links overlap each other, interference may occur. Even in the case of uplink, when uplink signals/channels transmitted through two parent links overlap, an uplink signal/channel transmitted to a specific parent DU may act as interference to other parent DUs.

Scenario 3-2: Connecting Multiple Parent DUs with a Single RF Module

One MT-CC in the MT of the IAB node may have one RF chain. Accordingly, the MT-CC may not be able to transmit/receive simultaneously through two parent links operating at different transmit/receive timings. In addition, simultaneous transmission and reception may not be performed through two parent links operating in different analog beam directions. Accordingly, the MT-CC must perform operations on different parent links using different time resources. In this case, the MT-CC needs to independently set and manage the transmission/reception timing for each parent DU connected thereto.

Scenario 4: DAPS-HO (Dual Active Protocol Stack Based Handover)

DAPS HO is introduced for mobility enhancement of the UE. This DAPS HO may also be applied to the MT of the IAB node. When applying DAPS HO, when the MCG currently connected to the UE is referred to as a source MCG and the MCG to be handed over is referred to as a target MCG, the UE may be simultaneously connected to the source MCG and the target MCG using the same carrier frequency. When the MT of the IAB node establishes a connection with a plurality of parent DUs using the same carrier frequency, the DAPS HO scheme may be used. In this case, one parent DU may be a source MCG and the other parent DU may be a target MCG to establish a connection to two parent DUs.

The content proposed in this specification is based on operating by setting two parent DUs as MCG and SCG, respectively. However, it may include operating as a DAPS HO with the MCG and the SCG as the source MCG and the target MCG (or the target MCG and the source MCG), respectively. In this case, MCG and SCG mentioned in this specification may be interpreted by replacing them with source MCG and target MCG (or target MCG and source MCG), respectively.

The content proposed in the present specification describes the content assuming an in-band environment, but may also be applied in an out-band environment. In addition, the content proposed in this specification is described in consideration of an environment in which a donor gNB (donor gNB: DgNB), a relay node (RN), and a UE perform a half-duplex operation, it may be applied even in an environment in which the DgNB, the RN, and/or the UE performs a full-duplex operation.

In the present specification, a situation in which MT of the same IAB node is connected to different parent nodes is considered. Considering situations such as Scenarios 1, 2, 3 and 4 above, one MT-CC in the MT of the IAB node is connected to a specific DU-cell in two different parent nodes, or different MT-CCs in the MT of the IAB node may be connected to specific DU-cells in two different parent nodes, respectively. In this case, one parent node may mean one carrier group (CG).

Figure 32:
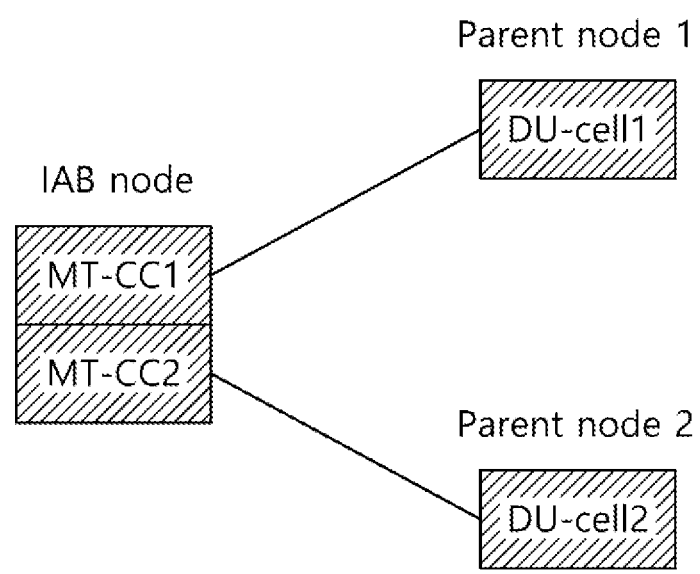
FIGS. 32 and 33 show an example in which a plurality of parent nodes are connected to one IAB node.
Figure 33:
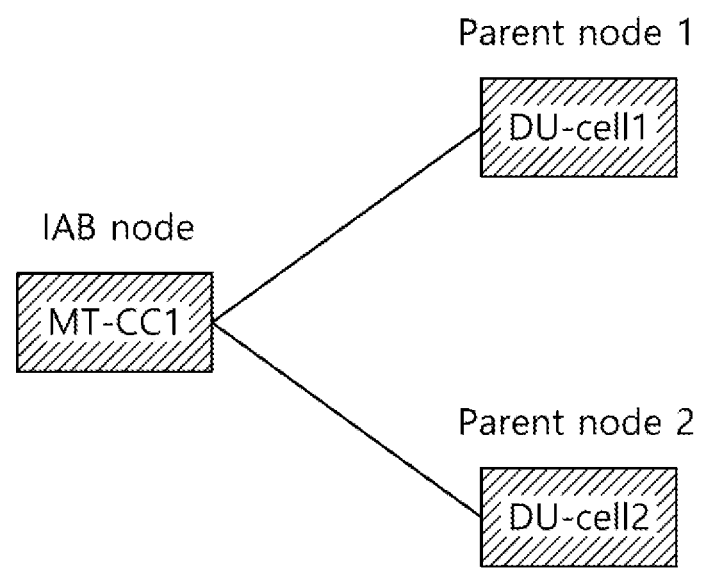

FIGS. 32 and 33 show an example in which a plurality of parent nodes are connected to one IAB node.

Combining these scenarios, the present specification considers the situation shown in FIGS. 32 and 33. The IAB node is simultaneously connected to the parent DU-cell 1 existing in the parent node 1 and the parent DU-cell 2 present in the parent node 2. In this case, the link between the IAB node and the parent DU-cell 1 is referred to as a parent link 1, and the link between the IAB node and the parent DU-cell 2 is referred to as a parent link 2. Parent link 1 and parent link 2 may operate through frequency resources having an intra-frequency relationship. That is, the parent DU-cell 1 and the parent DU-cell 2 may operate through frequency resources having an intra-frequency relationship. At this time, from the point of view of the IAB node, the parent link 1 and the parent link 2 may be connected through different MT-CCs as shown in FIG. 32. That is, the link with the parent DU-cell 1 may be connected through MT-CC1, and the link with the parent DU-cell 2 may be connected through MT-CC2. Alternatively, the parent link 1 and the parent link 2 may be connected through the same MT-CC as shown in FIG. 33. That is, both the parent DU-cell 1 and the parent DU-cell 2 may be connected through MT-CC1.

In this case, depending on the situation, the IAB node may perform reception through the parent link 1 and reception through the parent link 2 at the same time or non-simultaneous. The IAB node may also perform transmission through the parent link 1 and transmission through the parent link 2 simultaneously or non-simultaneously depending on the situation. The reason/situation in which simultaneous transmission/reception cannot be performed may be, for example, as follows.

(Situation 1) Whether simultaneous transmission/reception is possible may vary depending on the number of Tx/Rx chains used by the MT of the IAB node for transmission/reception with two parent DUs.

Whether simultaneous transmission/reception is possible may vary depending on the number of transmission/reception chains used by the MT of the IAB node for transmission/reception with two parent DUs. For example, if it has two Tx chains, simultaneous transmission is possible for two parent DUs, but if it has only one Tx chain, Tx is possible for only one parent DU in a specific time resource.

The number of Tx/Rx chains used by the MT of the IAB node for transmission/reception with two parent DUs may vary depending on the number of Tx/Rx chains that the MT of the IAB node has.

Or, when performing carrier aggregation (CA)/dual-connectivity (DC), the number of Tx/Rx chains that can be used in a specific CC or in a specific frequency resource may vary according to the number of CCs configured or activated for the MT of the IAB node.

(Situation 2) Whether simultaneous transmission/reception is possible may vary depending on the transmission/reception method performed by the MT of the IAB node.

Even if the MT of the IAB node performs transmission/reception with two parent DUs using the same number of Tx/Rx chains, whether simultaneous transmission/reception is possible may vary depending on the transmission/reception method applied by the MT of the IAB node.

For example, even if transmission is performed on two parent DUs using a single Tx chain, whether simultaneous transmission is possible may vary depending on the following factors.

- When analog beam directions are different (or QCL (quasi co-location) information is different), simultaneous transmission may not be possible.
- If the difference in transmission timing between two parent links is greater than a certain value, simultaneous transmission may not be possible.
- If the difference in transmission power between two parent links is greater than a certain value, simultaneous transmission may not be possible.

Or, for example, when there are two parent DUs, dynamic switching between using the 2 Tx/Rx chains for 2 layers transmission for one parent DU and for 1 layer simultaneous transmission for two parent DUs can be considered. In this case, whether simultaneous transmission is possible may vary according to an operation method.

First, as described above, when the MT of the IAB node is connected to two parent nodes, that is, when it is connected to two parent DU-cells belonging to different CGs, consider a situation in which simultaneous transmission and/or simultaneous reception on two parent links is not possible. In this case, below, the transmission/reception operation of the MT of the IAB node on two parent links is proposed.

The following description will be described on the assumption that there are two parent nodes, parent DU-cells, and/or parent links, but may be extended/applied to more than two parent nodes.

First, a method of operating a parent DU cell for preventing collision of transmission/reception resources between two parent links will be described.

When the MT of the IAB node cannot simultaneously perform downlink reception from two parent DU-cells or simultaneously perform uplink transmission, each of the two parent DU-cells needs to operate so as not to perform downlink reception or uplink transmission on the same resource to the MT of the IAB node. That is, only one parent DU-cell may have to perform transmission/reception with the MT of the IAB node in the same time resource. To this end, the following operation/method is proposed. Only one of the following methods may be applied or a plurality of methods may be applied together. Through the following method, when the specific parent DU-cell does not transmit/receive with the MT of the IAB node in a specific resource, scheduling may not be performed so that the MT of the IAB node performs transmission/reception with itself in the corresponding resource.

(Method 1-1) A parent DU-cell to operate is determined based on resource availability information for the parent DU-cell.

Here, the resource availability information indicates whether a specific resource (e.g., a DU resource for the parent DU-cell) is a hard resource, a soft resource, or a not available (NA) resource. Here, the hard (H) resource may mean a time resource always available for the DU child link, the soft (S) resource may mean a time resource in which availability of a time resource for a DU child link is explicitly or implicitly controlled by a parent node, respectively.

Figure 34:
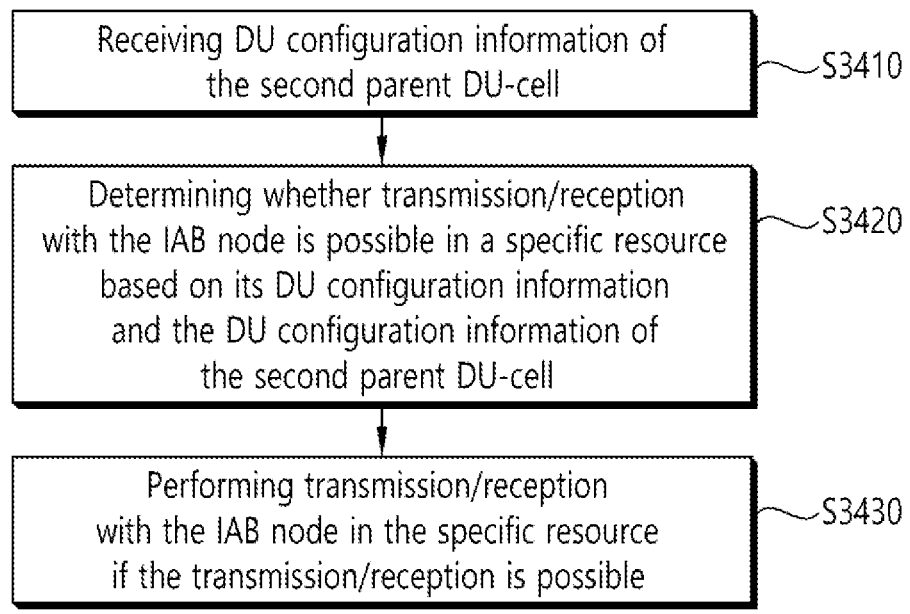
FIG. 34 is a flowchart illustrating an example of an operation of a first parent DU-cell when a first parent DU-cell and a second parent DU-cell are connected to an IAB node.

FIG. 34 is a flowchart illustrating an example of an operation of a first parent DU-cell when a first parent DU-cell and a second parent DU-cell are connected to an IAB node.

Referring to FIG. 34, the first parent DU-cell receives DU configuration information of the second parent DU-cell (S3410). Here, the DU configuration information may include information on the availability of resources configured for the parent DU-cell.

Thereafter, the first parent DU-cell determines whether transmission/reception with the IAB node is possible in a specific resource based on its DU configuration information and the DU configuration information of the second parent DU-cell (S3420).

Thereafter, when the first parent DU-cell determines that transmission/reception with the IAB node is possible in the specific resource, the first parent DU-cell performs transmission/reception with the IAB node in the specific resource (S3430).

That is, assuming that the parent DU-cells connected to the MT of the same IAB node are a first parent DU-cell (or parent DU-cell 1) and a second parent DU-cell (or parent DU-cell 2), respectively, the parent DU-cell 1 may determine whether transmission/reception with the MT of the IAB node is possible in the specific resource considering the resource availability information included in its DU configuration information and the resource availability information included in the DU configuration information of the parent DU-cell 2.

To this end, the parent DU-cell 1 may receive the DU configuration information of the parent DU-cell 2 or the availability information of a resource included in the DU configuration information.

Meanwhile, according to resource availability information of the parent DU-cell 1 and DU configuration information or resource availability information of the parent DU-cell 2 for a specific time resource, the parent DU-cell 1 may operate as follows.

a) When the resource availability information of the parent DU-cell 1 is unavailable (NA), the parent DU-cell 1 may not perform transmission/reception with the MT of the IAB node.

b) When the resource availability information of the parent DU-cell 1 is hard or soft and the resource availability information of the parent DU-cell 2 is NA, the parent DU-cell 1 may perform transmission/reception with the MT of the IAB node.

c) When the resource availability information of the parent DU-cell 1 is hard and the resource availability information of the parent DU-cell 2 is soft, (Alternative 1) the operation of the parent DU-cell 1, which is set to use the corresponding resource with certainty, may take priority. Accordingly, the parent DU-cell 1 may perform transmission/reception with the MT of the IAB node. Alternatively, (alternative 2) the parent DU-cell configured to have priority among the two parent DU-cells may perform transmission/reception with the MT of the IAB node. The parent DU-cell having priority may be determined as in Method 1-2 to be described later. If the parent DU-cell 1 has priority according to the priority determination method, the parent DU-cell 1 may perform transmission/reception with the MT of the IAB node. Otherwise, the parent DU-cell 1 may not perform transmission/reception with the MT of the IAB node. Alternatively, (alternative 3) a parent DU-cell configured to operate on a corresponding resource through TDM resource configuration may perform transmission/reception with the MT of the IAB node. TDM resource configuration may be configured as in Method 1-3 to be described later. If the parent DU-cell 1 is configured to operate in the corresponding resource by the corresponding TDM resource configuration, the parent DU-cell 1 may perform transmission/reception with the MT of the IAB node. Otherwise, the parent DU-cell 1 may not perform transmission/reception with the MT of the IAB node. Alternatively, (alternative 4) both parent DU-cells may perform transmission/reception with the MT of the IAB node. Accordingly, the parent DU-cell 1 may perform transmission/reception with the MT of the IAB node. In this case, additionally, when collision of transmission/reception resources between two parent links, which will be described later, occurs, the MT of the IAB node may perform transmission/reception for only one parent link by the method proposed in the operation method of the MT of the IAB node.

d) When the resource availability information of the parent DU-cell 1 is soft and the resource availability information of the parent DU-cell 2 is hard, (Alternative 1) The operation of the parent DU-cell 2, which is set to use the corresponding resource with certainty, may take precedence. Accordingly, the parent DU-cell 1 may not perform transmission/reception with the MT of the IAB node. Alternatively, (alternative 2) the parent DU-cell configured to have priority among the two parent DU-cells may perform transmission/reception with the MT of the IAB node. The parent DU-cell having priority may be determined as in Method 1-2 to be described later. If the parent DU-cell 1 has priority according to the priority determination method, the parent DU-cell 1 may perform transmission/reception with the MT of the IAB node. Otherwise, the parent DU-cell 1 may not perform transmission/reception with the MT of the IAB node. Alternatively, (alternative 3) a parent DU-cell configured to operate on a corresponding resource through TDM resource configuration may perform transmission/reception with the MT of the IAB node. TDM resource configuration may be configured as in Method 1-3 to be described later. If the parent DU-cell 1 is configured to operate in the corresponding resource by the corresponding TDM resource configuration, the parent DU-cell 1 may perform transmission/reception with the MT of the IAB node. Otherwise, the parent DU-cell 1 may not perform transmission/reception with the MT of the IAB node. Alternatively, (alternative 4) both parent DU-cells may perform transmission/reception with the MT of the IAB node. Accordingly, the parent DU-cell 1 may perform transmission/reception with the MT of the IAB node. In this case, when transmission/reception resources collide between two parent links, which will be further described later, the MT of the IAB node may perform transmission/reception on only one parent link according to the method proposed in the operation method of the MT of the IAB node.

e) When the resource availability information of the parent DU-cell 1 is hard and the resource availability information of the parent DU-cell 2 is hard, (Alternative 1) a parent DU-cell configured to have priority among two parent DU-cells may perform transmission/reception with the MT of the IAB node. The parent DU-cell having priority may be determined as in Method 1-2 to be described later. If the parent DU-cell 1 has priority according to the priority determination method, the parent DU-cell 1 may perform transmission/reception with the MT of the IAB node. Otherwise, the parent DU-cell 1 may not perform transmission/reception with the MT of the IAB node. Alternatively, (alternative 2) a parent DU-cell configured to operate on a corresponding resource through TDM resource configuration may perform transmission/reception with the MT of the IAB node. TDM resource configuration may be configured as in Method 1-3 to be described later. If the parent DU-cell 1 is configured to operate in the corresponding resource by the corresponding TDM resource configuration, the parent DU-cell 1 may perform transmission/reception with the MT of the IAB node. Otherwise, the parent DU-cell 1 may not perform transmission/reception with the MT of the IAB node. Alternatively, (alternative 3) both parent DU-cells may perform transmission/reception with the MT of the IAB node. Accordingly, the parent DU-cell 1 may perform transmission/reception with the MT of the IAB node. In this case, the MT of the IAB node may perform transmission/reception on only one parent link according to the method proposed in the method of operation of the MT of the IAB node when the transmission/reception resource collides between two parent links to be described later.

f) When the resource availability information of the parent DU-cell 1 is soft and the configuration information of the parent DU-cell 2 is soft, (Alternative 1) a parent DU-cell configured to have priority among two parent DU-cells may perform transmission/reception with the MT of the IAB node. The parent DU-cell having priority may be determined as in Method 1-2 to be described later. If the parent DU-cell 1 has priority according to the priority determination method, the parent DU-cell 1 may perform transmission/reception with the MT of the IAB node. Otherwise, the parent DU-cell 1 may not perform transmission/reception with the MT of the IAB node. Alternatively, (alternative 2) a parent DU-cell configured to operate on a corresponding resource through TDM resource configuration may perform transmission/reception with the MT of the IAB node. TDM resource configuration may be configured as in Method 1-3 to be described later. If the parent DU-cell 1 is configured to operate in the corresponding resource by the corresponding TDM resource configuration, the parent DU-cell 1 may perform transmission/reception with the MT of the IAB node. Otherwise, the parent DU-cell 1 may not perform transmission/reception with the MT of the IAB node. Alternatively, (alternative 3) both parent DU-cells may perform transmission/reception with the MT of the IAB node. Accordingly, the parent DU-cell 1 may perform transmission/reception with the MT of the IAB node. In this case, the MT of the IAB node may perform transmission/reception on only one parent link according to the method proposed in the method of operation of the MT of the IAB node when the transmission/reception resource collides between two parent links to be described later.

The foregoing has been written from the perspective of parent DU-cell 1, similarly, the parent DU-cell 2 also can determine whether transmission/reception with the MT of the IAB node is possible in a specific resource considering the resource availability information of the parent DU-cell 2 and the resource availability information of the parent DU-cell 1.

(Method 1-2) Determination of a parent DU-cell to operate based on priority setting for parent DU-cells.

Assuming that two parent DU-cells connected to the MT of the same IAB node are respectively a parent DU-cell 1 and a parent DU-cell 2, each parent DU-cell may determine whether transmission/reception with the MT of the IAB node is possible in a specific resource by a method of determining priority. In this case, the parent DU-cell having the priority (or having a relatively higher priority) may perform transmission/reception with the MT of the IAB node, and the parent DU-cell having no priority (or having a relatively lower priority) may not perform transmission/reception with the MT of the IAB node. In this case, a method of specifically determining the priority may be as follows.

(Alternative 1) When two parent DU-cells are in DC relationship from the point of view of the MT of the IAB node, (Alternative 1-a) the parent DU-cell belonging to the MCG may have a priority (or a relatively higher priority). Alternatively, (alternative 1-b) the parent DU-cell belonging to the SCG may have a priority (or a relatively higher priority).

(Alternative 2) When two parent DU-cells are in a DAPS-HO relationship from the point of view of the MT of the IAB node, (Alternative 2-a) the parent DU-cell belonging to the source MCG has priority (or relatively higher priority). Alternatively, (alternative 2-b) the parent DU-cell belonging to the target MCG may have a priority (or a relatively higher priority).

(Alternative 3) The information of the parent DU-cell having priority may be configurable information. For example, each parent DU-cell may receive information on which parent DU-cell has priority from the donor node/CU.

(Method 1-3) Determination of a parent DU-cell through TDM resource configuration.

Assuming that the parent DU-cells connected to the MT of the same IAB node are the parent DU-cell 1 and the parent DU-cell 2, respectively, information of a parent DU-cell having a priority (or a relatively higher priority) may vary according to time resources. In this case, the parent DU-cell having a priority (or a relatively higher priority) may perform transmission/reception with the MT of the IAB node, and the parent DU-cell having no priority (or having a relatively lower priority) may not perform transmission/reception with the MT of the IAB node.

Information on the parent DU-cell having priority according to time resources may be configured by the donor node/CU. Alternatively, a parent DU-cell having a priority may be changed according to a predetermined rule (for example, the parent DU-cell having priority in the even-numbered slot and the odd-numbered slot is determined to be different according to the slot index).

In the foregoing, that the specific parent DU-cell does not operate or does not perform transmission and reception with the MT of the IAB node may mean that the resource availability of the corresponding parent DU-cell is maintained as set, but the parent DU-cell does not perform transmission/reception with the MT of the IAB node. Or, that the specific parent DU-cell does not operate or does not perform transmission/reception with the MT of the IAB node can be interpreted as operating as NA configured in the corresponding resource or operating as soft resource not configured as available resource.

Characteristically, if a specific parent DU-cell determines whether its operation is possible using the above-described methods, whether the corresponding operation is possible may be equally applied to transmission/reception with all child links of its own (i.e., MTs and/or UEs of all child nodes connected to the corresponding parent DU-cell). That is, transmission/reception may or may not be performed for all child links of the parent DU-cell according to the determination of whether operation is possible.

Alternatively, if a specific parent DU-cell determines whether its operation is possible, whether the corresponding operation is possible may be applied only to transmission/reception with a specific child link (i.e., an MT and/or a UE of a specific child node connected to the corresponding parent DU-cell). In this case, information referenced by a specific parent DU-cell to determine whether its own operation is possible (e.g., DU configuration or resource availability information of another parent DU-cell, TDM information, and priority-related information on the parent DU-cell, etc.) may be configured in a child link-specific manner (i.e., MT-specific and/or UE-specific in a child node).

Next, an operation method of the MT of the IAB node when resources collide between two parent links will be described.

Figure 35:
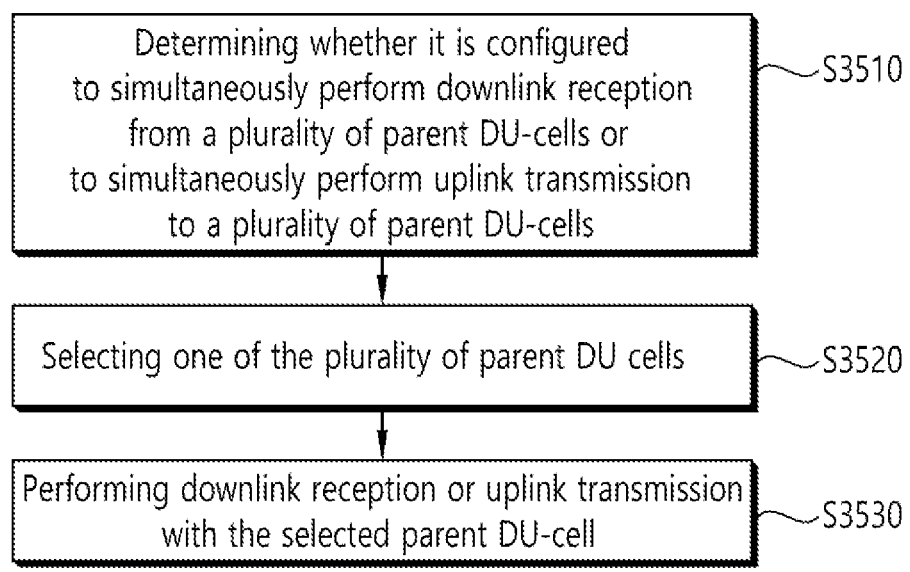
FIG. 35 is a flowchart of an example of an operation of an IAB node when a plurality of parent DU-cells are connected to the IAB node. Here, the IAB node may mean the MT of the IAB node.

FIG. 35 is a flowchart of an example of an operation of an IAB node when a plurality of parent DU-cells are connected to the IAB node. Here, the IAB node may mean the MT of the IAB node.

Referring to FIG. 35, the IAB node determines whether it is configured to simultaneously perform downlink reception from a plurality of parent DU-cells or to simultaneously perform uplink transmission to a plurality of parent DU-cells (S3510).

Thereafter, the IAB node selects one of the plurality of parent DU cells (S3520).

Thereafter, the IAB node performs downlink reception or uplink transmission with the selected parent DU-cell (S3530).

When the MT of the IAB node cannot simultaneously perform downlink reception from two parent DU-cells or simultaneously perform uplink transmission, each of the two parent DU-cells uses the method described above, in the same time resource, downlink reception or uplink transmission should not be performed to the MT of the IAB node.

However, inevitably, the MT of the IAB node may be configured/scheduled to simultaneously perform downlink reception from two parent DU-cells or simultaneously perform uplink transmission.

In this case, the MT of the IAB node may perform downlink reception or uplink transmission for only one parent DU-cell, and may not perform downlink reception or uplink transmission for another parent DU-cell. Hereinafter, a method for determining a parent DU-cell performing downlink reception or uplink transmission is proposed. For example, in the step of selecting one of the plurality of parent DU-cells in FIG. 35 (S3520), the IAB node may apply at least one of the following methods.

(Method 2-1) Set available resources for each parent link.

When the MT of the IAB node is configured/scheduled for uplink transmission to two parent DU-cells or downlink reception from two parent DU-cells in a specific time resource, the MT of the IAB node may determine the parent DU-cell to which the MT of the IAB node will transmit/receive by receiving resource information operable for each parent link. To this end, the MT of the IAB node may receive information on time resources that can be used for operation on the corresponding parent link for each parent link. Characteristically, this setting may be set through RRC signaling from the donor node/CU. When the IAB node is configured/scheduled for transmission/reception for a specific parent DU-cell, the corresponding transmission/reception may be performed when the resource on which the corresponding transmission/reception is performed is set as a resource usable in the corresponding parent link. If the IAB node is configured/scheduled for transmission/reception for two parent DU-cells in a specific time resource, and the corresponding time resource is set as a resource that can be used for both parent links, the following operation may be performed.

(Alternative a) It may operate based on Method 2-4 to be described later.

(Alternative b) It may operate based on Method 2-2 to be described later.

(Method 2-2) Determining transmission and reception with priority (or relatively higher priority)

When the MT of the IAB node is configured/scheduled for uplink transmission to two parent DU-cells or downlink reception from two parent DU-cells in a specific time resource, transmission and reception having a priority or a relatively higher priority may be preferentially performed. In this case, when the MT of the IAB node is configured/scheduled for uplink transmission to two parent DU-cells or downlink reception from two parent DU-cells, the MT of the IAB node may only perform transmission/reception with priority (or relatively higher priority), and may not perform transmission/reception without priority (or relatively lower priority). In this case, transmission and reception having a priority (or having a relatively higher priority) may be determined as follows.

(Alternative a) Determined according to the transmission timing of the scheduling DCI for the corresponding downlink/uplink transmission.

(Alternative a-1) The transmission/reception in which the scheduling DCI for the corresponding downlink/uplink transmission is transmitted earlier has priority (relatively higher).

(Alternative a-2) Transmission/reception in which the scheduling DCI for the corresponding downlink/uplink transmission is transmitted later has (relatively higher) priority.

(Alternative b) Determined according to the time resource of the corresponding downlink/uplink transmission.

(Alternative b-1) Transmission/reception in which a time resource for performing the corresponding downlink/uplink transmission starts earlier (relatively higher) has priority.

(Alternative b-2) Transmission/reception in which the time resource for performing the corresponding downlink/uplink transmission starts later (relatively higher) has priority.

(Alternative c) If two parent DU-cells are in DC relationship from the point of view of the MT of the IAB node, (Alternative c-1) transmission/reception for the parent DU-cell belonging to the MCG has (relatively higher) priority. Alternatively, (alternative c-2) transmission/reception for the parent DU-cell belonging to the SCG has a (relatively higher) priority.

(Alternative d) When two parent DU-cells are in a DAPS-HO relationship from the point of view of the MT of the IAB node, (Alternative d-1) transmission/reception for the parent DU-cell belonging to the source MCG has (relatively higher) priority. Alternatively, (alternative d-2) transmission/reception for the parent DU-cell belonging to the target MCG has (relatively higher) priority.

(Alternative e) Information about the parent DU-cell having a (relatively higher) priority may be configured. For example, the MT of the IAB node may receive information about which parent DU-cell has a priority (relatively higher) from the donor/CU. In this case, transmission/reception for the parent DU-cell having a (relatively higher) priority may be transmission/reception having a (relatively higher) priority.

(Method 2-3) Determine a parent DU-cell to operate through TDM resource configuration.

When the MT of the IAB node is configured/scheduled for uplink transmission to two parent DU-cells or downlink reception from two parent DU-cells in a specific time resource, a parent DU-cell to perform uplink transmission or downlink reception may be differently determined according to time resources. That is, information on the parent DU-cell having a (relatively higher) priority for MT transmission/reception of the IAB node may vary according to time resources. In this case, when the MT of the IAB node is configured/scheduled for uplink transmission to two parent DU-cells or downlink reception from two parent DU-cells, the MT of the IAB node performs configured/scheduled transmission/reception with a parent DU-cell having a (relatively higher) priority, and may not perform the configured/scheduled transmission/reception with a parent DU-cell having no (relatively higher) priority.

To this end, information on the parent DU-cell having a (relatively higher) priority for transmission and reception according to time resources may be configured from the donor node/CU. Alternatively, a parent DU-cell having a (relatively higher) priority may be changed according to a predetermined rule (for example, determining that the parent DU-cell having a (relatively higher) priority in an even-numbered slot and an odd-numbered slot is different according to the slot index).

(Method 2-4) The MT of the IAB node determines a parent DU-cell to operate arbitrarily.

When the MT of the IAB node is configured/scheduled for uplink transmission to two parent DU-cells or downlink reception from two parent DU-cells in a specific time resource, MT of the IAB node can perform one transmission or reception which is randomly selected.

Hereinafter, timing misalignment between parent links will be described.

When the UE is connected to two eNBs through DC (dual connectivity) in the existing LTE environment, the difference between the maximum transmission/reception timings for MCG and SCG considered from the UE's point of view is 33 us based on a synchronous DC scenario and 500 us based on an asynchronous DC scenario.

In the case of EN-DC in the NR environment, a maximum uplink transmission timing difference value in an asynchronous inter-band EN-DC situation is as follows.

TABLE 9

| Sub-carrier spacing in E-UTRA PCell (kHz) | UL Sub-carrier spacing for data in PSCell (kHz) | Maximum uplink transmission timing difference (μs) |
| --- | --- | --- |
| 15 | 15 | 500 |
| 15 | 30 | 250 |
| 15 | 60 | 125 |
| 15 | 120 | 62.5 |

Here, for EN-DC in the E-UTRA FDD-NR FDD band, if a requirement is defined in advance by a standard or the like, and the table is applicable, a scenario for a 120 kHz PCell may not exist.

On the other hand, the maximum uplink transmission timing difference value in the EN-DC situation in the synchronization band is as follows.

TABLE 10

| Sub-carrier spacing in E-UTRA PCell (kHz) | UL Sub-carrier spacing for data in PSCell (kHz) | Maximum uplink transmission timing difference (μs) |
| --- | --- | --- |
| 15 | 15 | 5.21 |
| 15 | 30 | 5.21 |
| 15 | 60 | 5.21 |

Here, when the UL subcarrier spacing for data in the PSCell is 15 kHz, it does not apply to a UE indicating the ability to support only single UL timing (ul-TimingAlignmentEUTRA-NR is signaled). A single UL timing for E-UTRA and NR cells is assumed for this UE.

Also, in the case of Table 10 above, if the transmission timing difference exceeds the cyclic prefix length of the UL subcarrier interval for data of the PSCell, NR UE Tx EVM degradation is expected for symbols overlapping LTE subframe boundaries.

On the other hand, in the IAB environment, a synchronous deployment situation is assumed in which downlink transmission timings between IAB nodes are aligned. However, despite the synchronous environment, when an IAB node is connected to two parent nodes, a difference in uplink transmission timings for two parent nodes may be larger than in a conventional synchronous DC environment.

Figure 36:
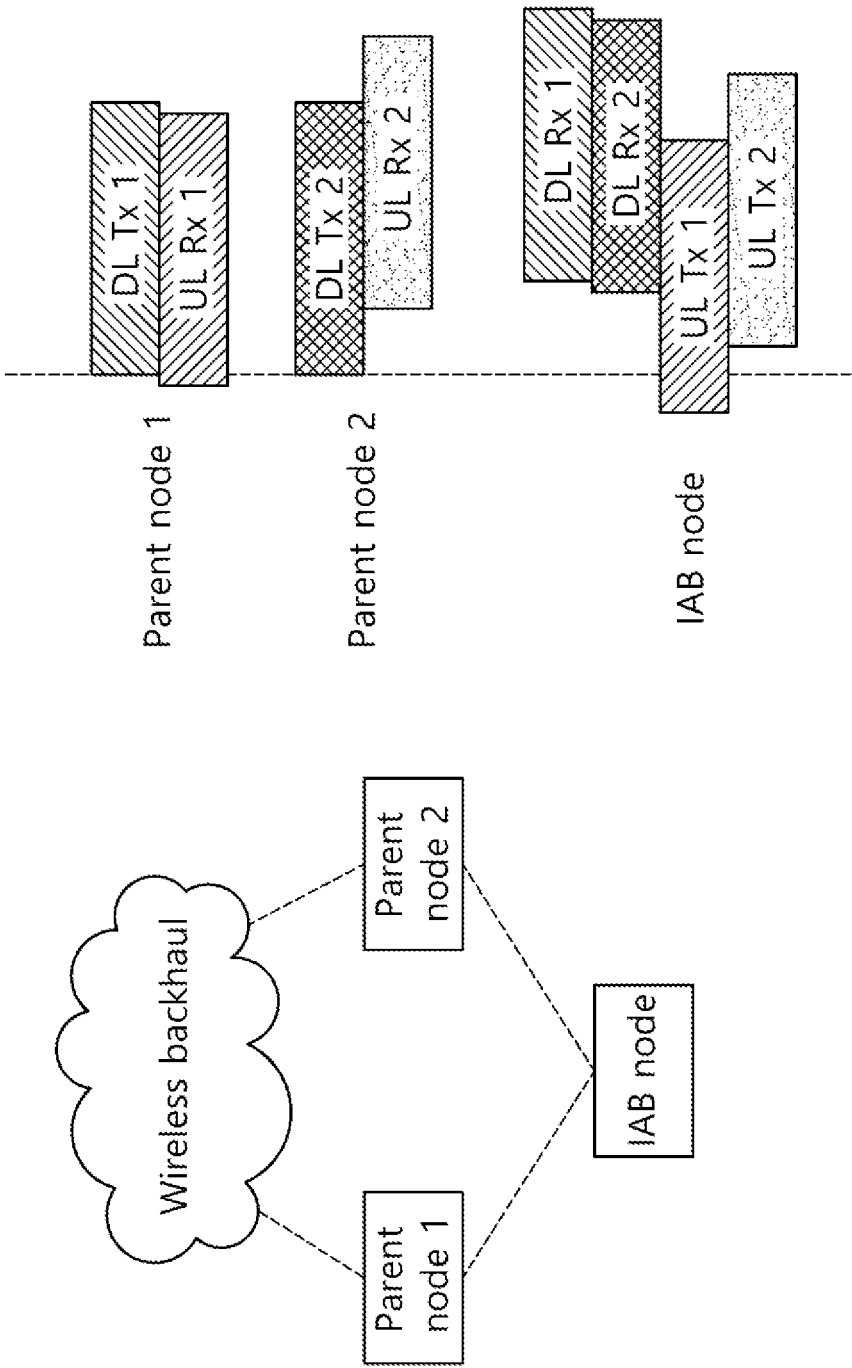
FIG. 36 illustrates an example of transmission/reception timing of each node when two parent nodes are connected to one IAB node.

FIG. 36 illustrates an example of transmission/reception timing of each node when two parent nodes are connected to one IAB node.

For example, when DU reception timings between parent nodes are set differently due to different timing alignment methods applied between nodes, this phenomenon may occur. As shown in FIG. 36, the IAB node is connected to the parent node 1 and the parent node 2, and the parent node 1 and the parent node 2 can be connected to a wireless backhaul directly or through a connection with another node. That is, the parent node 1 and the parent node 2 are connected through a non-ideal backhaul. Here, in the case of the parent node 1, the uplink reception timing of the DU may be set by applying the timing alignment case 1. On the other hand, in the case of the parent node 2, by applying the timing alignment case 7, the DU reception timing may be set to be the same as its own MT reception timing. In this case, the IAB node sets the uplink transmission timing for each parent node using a timing advance (TA) value set according to the DU reception timing of each parent node. In FIG. 36, the IAB node sets the transmission timing of uplink transmission 1 (UL Tx 1) according to the timing of uplink reception 1 (UL Rx 1) of the parent node 1, and the transmission timing of uplink transmission 2 (UL Tx 2) is set according to the uplink reception 2 (UL Rx) of the parent node 2. In this case, the UL Tx 1 transmission timing and the UL Tx 2 transmission timing may have a larger difference than when the UL transmission timing is performed in accordance with the same DU reception timing between the existing parent nodes.

As another example, the IAB node may apply the timing alignment case 1 when transmitting/receiving with the parent node 1, but may apply the timing alignment case 6 when transmitting/receiving with the parent node 2. In this case, when transmitting/receiving with the parent node 1, the MT transmission timing of the IAB node may be set to advance by the TA value set from the parent node 1 (in accordance with the DU reception timing of the parent node 1). On the other hand, the IAB node may set the MT transmission timing to be the same as its DU transmission timing during transmission/reception with the parent node 2. Also in this case, the difference in the uplink transmission timing of the IAB node with respect to the two parent nodes may have a larger range than before.

Since the DU transmission timing between the parent nodes is synchronous, the difference in the MT reception timing for the two parent links is affected by the difference value of the propagation delay with the two parent nodes. It may be similar to the situation in the existing DC. However, the difference value of the MT transmission timing for the two parent nodes may be affected by the timing alignment method applied to the parent node and the IAB node as well as the propagation delay with the two parent nodes. In this case, the uplink transmission timing difference may be larger than that of the existing synchronous DC scenario.

Hereinafter, non-simultaneous transmission/reception for two parent links will be described.

When an IAB node is connected with two parent nodes, frequency resources connected to two parent nodes may use a co-channel (same frequency) or an adjacent channel (intra-frequency and intra-band). In this case, the connection with these two parent nodes may use, for example, a DC method or a DAPS-HO method.

When two parent nodes are connected using the same or different frequency resources within a band, it may be assumed that a single RF chain is used. That is, the IAB node may perform uplink transmission to the parent node 1 and uplink transmission to the parent node 2 using the same transmission RF chain. In this case, if the difference in uplink transmission timings to the two parent nodes is equal to or greater than a certain value, simultaneous uplink transmission to the two parent nodes may not be performed, and only non-simultaneous uplink transmission may have to be used. This means that the IAB node should perform uplink transmission for two parent nodes in the TDM method.

In the case of downlink, the IAB node may perform downlink reception for the parent node 1 and downlink reception on the parent node 2 using the same reception RF chain. In this case, if the difference in downlink reception timings to the two parent nodes is equal to or greater than a certain value, simultaneous downlink reception from the two parent nodes cannot be performed, and only non-simultaneous downlink reception may have to be performed. This means that the IAB node should perform downlink reception for two parent nodes in a TDM manner.

Hereinafter, transmission/reception timing misalignment for two parent links will be described.

When the IAB node performs transmission and/or reception operations for two parent nodes non-simultaneously, in order for the IAB node to perform transmission/reception from one parent node and transmission/reception to another parent node, it may need to perform a transmission/reception switching operation. When the IAB node transmits/receives with one parent node and transmits/receives with another parent node, a guard time may be required when switching transmission/reception with two parent nodes due to switching of transmission/reception operations and misalignment between transmission/reception timings with the two parent nodes.

Figure 37:
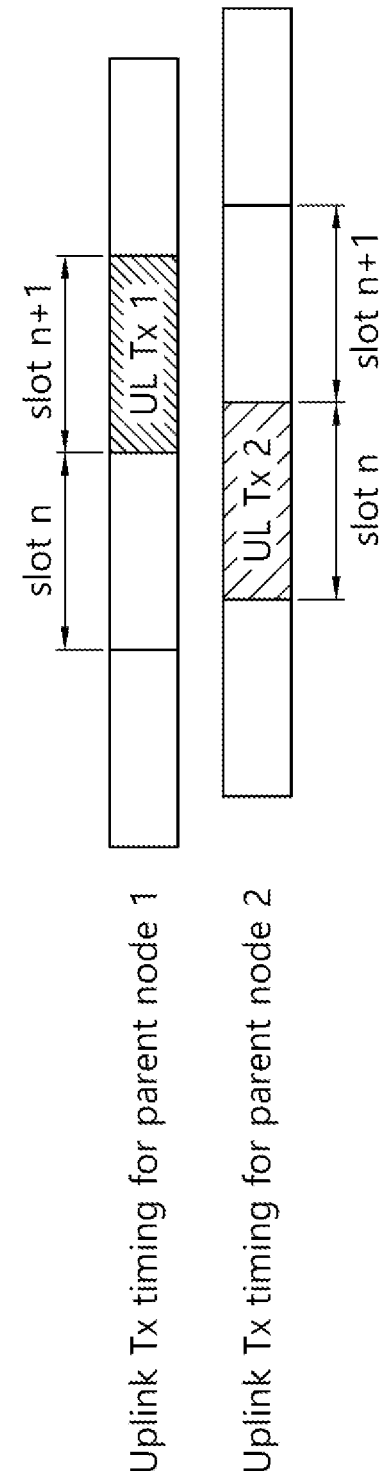
FIG. 37 illustrates an example of a difference in uplink transmission timing of an IAB node with respect to two parent nodes.

FIG. 37 illustrates an example of a difference in uplink transmission timing of an IAB node with respect to two parent nodes.

Referring to FIG. 36, the transmission/reception timing of the IAB node with respect to the two parent nodes is misaligned. Therefore, for example, when uplink transmission is performed to the parent node 2 up to symbol #n and uplink transmission is performed from symbol #n+1 to the parent node 1, since there is a difference in the uplink transmission timings to the two parent nodes, a resource collision problem may occur. The example of FIG. 37 shows the uplink transmission timing to the parent node 1 and the uplink transmission timing to the parent node 2 from the viewpoint of the IAB node. When the IAB node performs uplink transmission to the parent node 2 in slot #n and performs uplink transmission to the parent node 2 in slot #n+1, due to misalignment between the two uplink transmission timings, overlap occurs in uplink transmission to two parent nodes. In this case, the IAB node is unable to perform both uplink transmission in the overlapped resource. The problem due to such timing misalignment does not only occur in uplink transmission to two parent nodes, it may also occur when the transmission directions to the parent node 1 and the parent node 2 are downlink and downlink, uplink and downlink, and/or downlink and uplink, respectively.

Meanwhile, in this specification, a parent node may refer to a parent DU-cell belonging to the parent node.

Hereinafter, a method of operating a parent node for preventing collision of transmission/reception resources between two parent links will be described.

As described above, when the IAB node switches the parent node performing transmission/reception, a resource overlap problem may occur. In this case, each parent node needs to know information about the overlapping resources so that it can determine information about the resources that cannot transmit/receive with the IAB node due to the resource overlap problem. To this end, the parent node and the IAB node may have to share information on resources that cannot transmit/receive with the IAB node due to a resource overlap problem.

Accordingly, guard symbol reporting/configuration related to an operation method of a parent node for preventing collision of transmission/reception resources between two parent links will be described. Here, the guard symbol may be a time resource in which an IAB node does not communicate with another IAB node or a time resource in which an IAB node connected to a plurality of parent nodes performs switching from a first parent node to a second parent node.

Since the IAB node knows the transmission/reception timing to each parent node, it can know information about resources that cannot be used due to resource overlap between the parent links for two parent nodes. The IAB node may report information on the 'required number of guard symbols' to the parent node and/or the CU (or the donor node) based on the degree of timing misalignment between the two parent links.

In this case, the IAB node and each parent node of the IAB node may determine the number of guard symbols applied when the IAB node switches the parent node performing transmission/reception as follows.

(Method 3-1) The IAB node may determine that the number of guard symbols it reports to the parent node and/or CU (or donor node) is the number of guard symbols it uses. In this case, each parent node of the IAB node may determine that the number of necessary guard symbols reported by the IAB node is the number of guard symbols used by the IAB node.

(Method 3-2) The IAB node may be configured with the number of guard symbols from the CU (or donor node) through RRC signaling and/or F1-AP (application protocol) signaling. To this end, the CU (or donor node) may set the number of guard symbols applied to the IAB node based on the number of necessary guard symbols reported by the IAB node or independently. Additionally, each parent node (or DU of the parent node) of the IAB node may also be informed of the number of guard symbols applied to the IAB node.

In this case, information on the number of guard symbols reported by the IAB node (or configured by the IAB node and/or the parent node) may have the form of guard symbol related information to be described later.

Figure 38:
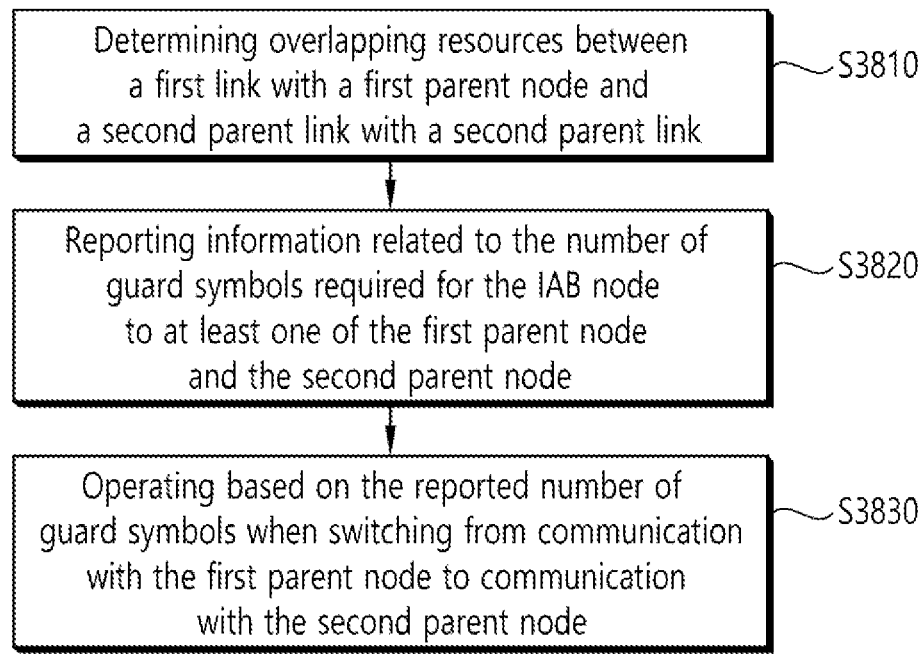
FIG. 38 is a flowchart of an example of a method for setting a guard symbol of an IAB node according to some implementations of the present specification.

FIG. 38 is a flowchart of an example of a method for setting a guard symbol of an IAB node according to some implementations of the present specification.

Referring to FIG. 38, the IAB node determines overlapping resources between a first link with a first parent node and a second parent link with a second parent node (S3810).

Thereafter, the IAB node reports information related to the number of guard symbols required for the IAB node to at least one of the first parent node and the second parent node (S3820).

Thereafter, the IAB node operates based on the reported number of guard symbols when switching from communication with the first parent node to communication with the second parent node (S3830).

Hereinafter, guard symbol related information related to a method of operating a parent node for preventing collision of transmission/reception resources between two parent links will be described.

The above-described number of guard symbols may have a different value according to a situation when the IAB node switches a parent node performing transmission/reception. As in the example of FIG. 36, both the downlink reception timing and the uplink transmission timing for the two parent links of the IAB node may have different timings. When the IAB node performs switching for the parent node performing transmission/reception, the number of required guard symbols may vary according to a downlink reception/uplink transmission operation before switching and a downlink reception/uplink transmission operation after switching. That is, the number of guard symbols may be different according to the following switching cases.

Switching from downlink reception to downlink reception

Switching from downlink reception to uplink transmission

Switching from uplink transmission to downlink reception

Switching from uplink transmission to uplink transmission

In this case, the number of guard symbols may be defined only for some combinations among combinations of all DL/UL directions between the parent node 1 and the parent node 2. For example, assuming that the difference between downlink reception timings to two parent nodes is always smaller than a predetermined value, when switching from downlink reception to downlink reception, switching may be performed without a separate guard symbol. In consideration of this case, the guard symbol may be set only for the remaining switching cases except for the case of switching from downlink reception to downlink reception.

In this case, if the number of guard symbols is not set for a specific switching case, it may be assumed that the number of guard symbols is 0.

Additionally, when the IAB node is connected with parent node 1 and parent node 2, depending on whether switching is performed from parent node 1 to parent node 2 or from parent node 2 to parent node 1 for the DL/UL direction of a specific parent node 1 and parent node 2 (i.e. depending on the switching direction between parent node 1 and parent node 2), the number of guard symbols may be different.

Figure 39:
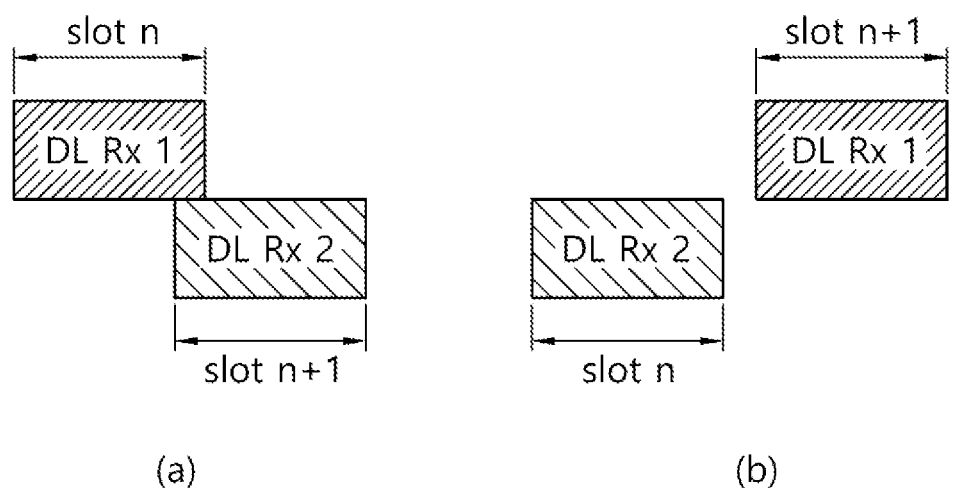
FIG. 39 shows an example in which downlinks are configured for the parent node 1 and the parent node 2.
Figure 40:
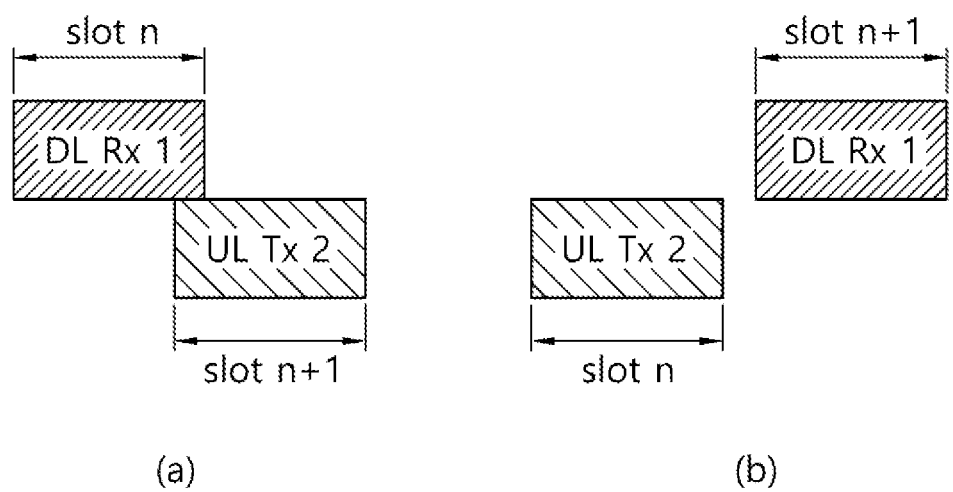
FIG. 40 shows an example in which the parent node 1 is configured for downlink and the parent node 2 is configured for uplink.
Figure 41:
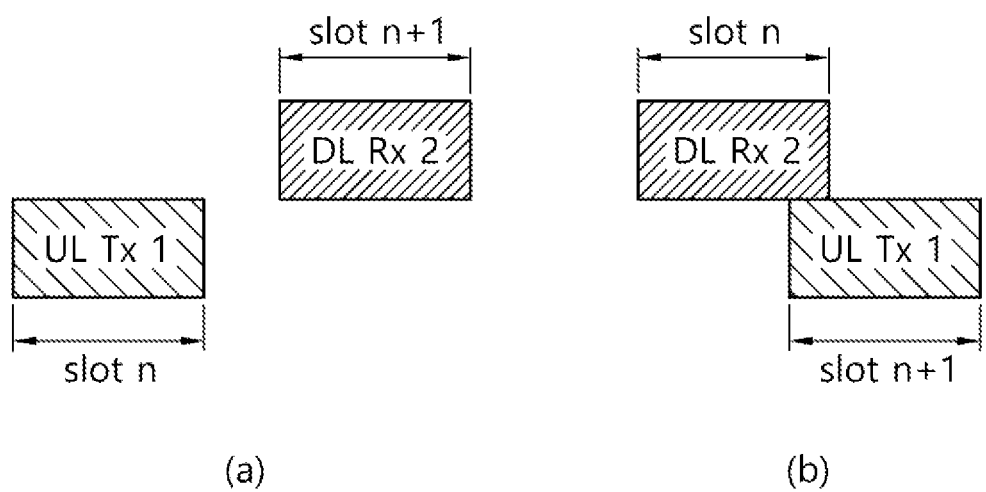
FIG. 41 shows an example in which the parent node 1 is configured with an uplink and the parent node 2 is configured with a downlink.
Figure 42:
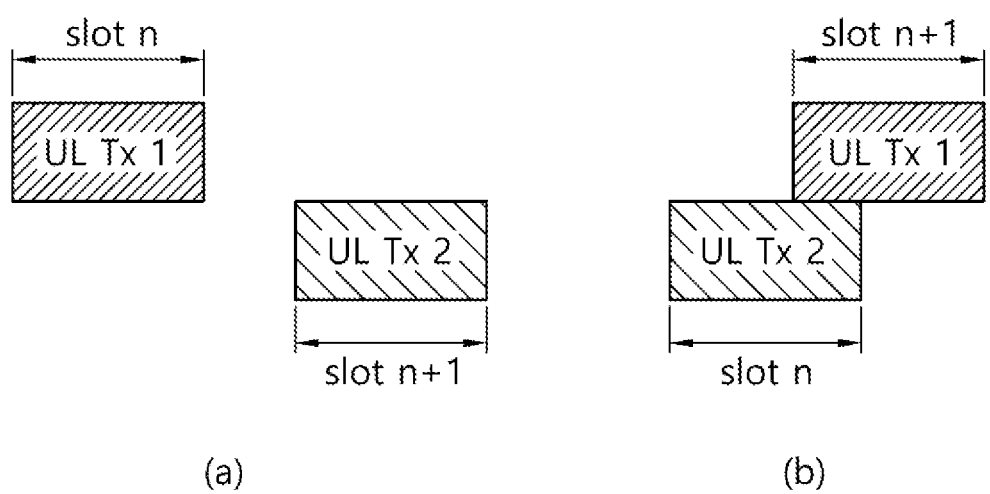
FIG. 42 shows an example in which uplinks are configured for the parent node 1 and the parent node 2.

FIG. 39 shows an example in which downlinks are configured for the parent node 1 and the parent node 2. FIG. 40 shows an example in which the parent node 1 is configured with downlink and the parent node 2 is configured with uplink. FIG. 41 shows an example in which the parent node 1 is configured with an uplink and the parent node 2 is configured with a downlink. FIG. 42 shows an example in which uplinks are configured for the parent node 1 and the parent node 2.

In the example of FIGS. 39 to 42, based on the downlink reception timing and the uplink transmission timing for the two parent links of the IAB node shown in FIG. 36, the resource overlap type according to each switching case is shown. FIG. 39 to FIG. 42 shows the case in which the parent node 1 and the parent node 2 have resource directions of downlink and downlink, downlink and uplink, uplink and downlink, and uplink and uplink, respectively. (a) of FIGS. 39 to 42 show a case of switching from the parent node 1 to the parent node 2, and (b) of FIGS. 39 to 42 show a case of switching from the parent node 2 to the parent node 1. It can be seen that the amount of overlapped resources varies according to a total of eight switching cases in FIGS. 39 to 42.

Accordingly, the guard symbol used by the IAB node when switching between two parent nodes may be defined for the following switching case. It may be defined differently according to the switching direction between the parent node 1 and the parent node 2 and the DL/UL direction between the parent node 1 and the parent node 2.

Hereinafter, a position of a guard symbol related to an operation method of a parent node for preventing collision of transmission/reception resources between two parent links will be described.

In order to determine transmission/reception resources with the IAB node in consideration of the guard symbol applied by the IAB node when switching the parent node, it is necessary to know when the IAB node switches the parent node. However, each parent node of the IAB node does not know each other's scheduling information for the IAB node.

Therefore, when the IAB node dynamically performs switching of the parent node according to the DL/UL scheduling of each parent node, the parent node cannot determine the switching time of the IAB node and the position to which the guard symbol is applied.

When the parent node knows the parent node switching time of the IAB node, it may determine the guard symbol application time of the IAB node. For this, it is assumed that the parent node can determine the followings such as a time resource for the IAB node to transmit/receive with the parent node and/or time resource for transmitting/receiving with another parent node, or the time when the IAB node performs switching to another parent node while performing transmission/reception with the parent node, and/or a time point when switching to parent node while performing transmission/reception with another parent node, through a method such as setting from a CU/donor node.

When the IAB node switches the parent node to transmit/receive from the parent node 1 to the parent node 2, or when switching of the parent node to transmit/receive from the parent node 2 to the parent node 1 is performed, the IAB node and each parent node may determine that the guard symbol of the IAB node is generated at the following positions.

(Alternative 1) The position of the guard symbol may be determined according to the direction in which the IAB node performs switching between the parent nodes.

(Alternative 1-a) A specific parent node may determine that the IAB node uses x symbols positioned before switching from itself to another parent node as guard symbols. That is, when the IAB node transmits/receives to/from the parent node 1 up to symbol #n and transmits/receives to/from the parent node 2 from symbol #n+1, the IAB node and each parent node determine that the IAB node uses x symbols before symbol #n as a guard symbol.

(Alternative 1-b) A specific parent node may determine that the IAB node uses n symbols located after switching to itself from another parent node as a guard symbol. When the IAB node transmits/receives to/from the parent node 1 up to symbol #n, and transmits/receives to/from the parent node 2 from symbol #n+1, the IAB node and each parent node may determine that n symbols after symbol #n+1 are used as guard symbols.

(Alternative 2) When the IAB node is connected to two parent nodes using DC, the position of the guard symbol may be determined according to whether the parent node is MCG/SCG.

(Alternative 2-a) If the specific parent node is an MCG, it may be determined that the IAB node uses x symbols positioned before switching from the specific parent node to another parent node as guard symbols. In addition, when a specific parent node is an MCG, it may be determined that the IAB node uses n symbols positioned after switching from another parent node to the specific parent node as guard symbols. That is, when the IAB node performs the switching of the transmitting/receiving parent node, the IAB node and each parent node may determine that x symbols or n symbols operating with the MCG parent node are used as guard symbols. As an example, when the IAB node performs transmission/reception with the parent node 1 up to symbol #n and transmits/receives with the parent node 2 from symbol #n+1, if parent node 1 is MCG, it is determined that x symbols before symbol #n are used as guard symbols, and if the parent node 2 is an MCG, it may be determined that n symbols after symbol #n+1 are used as guard symbols.

(Alternative 2-b) If the specific parent node is an SCG, it may be determined that the IAB node uses x symbols positioned before switching from the specific parent node to another parent node as guard symbols. In addition, if the specific parent node is an SCG, it may be determined that the IAB node uses n symbols positioned after switching from another parent node to the specific parent node as guard symbols. That is, when the IAB node performs switching of the transmitting/receiving parent node, the IAB node and each parent node may determine that x symbols or n symbols operating with the SCG parent node are used as guard symbols. As an example, when the IAB node performs transmission/reception with the parent node 1 up to symbol #n and transmits/receives with the parent node 2 from symbol #n+1, if parent node 1 is SCG, it is determined that x symbols before symbol #n are used as guard symbols, and if the parent node 2 is an SCG, it may be determined that n symbols after symbol 1 #n+1 are used as guard symbols.

(Alternative 3) When the IAB node is connected to two parent nodes using DAPS/DAPS-HO, the position of the guard symbol may be determined according to whether the parent node is a source MCG/target MCG.

(Alternative 3-a) When the specific parent node is the source MCG, it may be determined that the IAB node uses x symbols positioned before switching from the specific parent node to another parent node as the guard symbols. Also, when the specific parent node is the source MCG, it may be determined that n symbols located after the IAB node performs switching from another parent node to the specific parent node are used as guard symbols. That is, when the IAB node performs switching of the transmitting/receiving parent node, the IAB node and each parent node may determine that x symbols or n symbols operating with the MCG parent node are used as guard symbols. When the IAB node transmits/receives to/from the parent node 1 up to symbol #n and transmits/receives to/from the parent node 2 from symbol #n+1, if parent node 1 is the source MCG, it is determined that x symbols before symbol #n are used as guard symbols, and if the parent node 2 is the source MCG, it is determined that n symbols after symbol #n+1 are used as guard symbols.

(Alternative 3-b) When the specific parent node is the target MCG, it may be determined that the IAB node uses x symbols located before switching from the specific parent node to another parent node as the guard symbols. In addition, if the specific parent node is the target MCG, it may be determined that the IAB node uses n symbols located after switching from another parent node to the specific parent node as the guard symbols. That is, when the IAB node performs switching of the transmitting/receiving parent node, the IAB node and each parent node may determine that x symbols operating with the SCG parent node are used as guard symbols. As an example, when the IAB node performs transmission/reception with the parent node 1 up to symbol #n and transmits/receives with the parent node 2 from symbol #n+1, if the parent node 1 is the target MCG, it is determined that x symbols or n symbols before symbol #n are used as guard symbols, and if the parent node 2 is the target MCG, it may be determined that n symbols after symbol #n+1 are used as guard symbols.

(Alternative 4) The position of the guard symbol may be determined according to the downlink/uplink transmission direction. When the IAB node switches the parent node performing transmission/reception, the position of the guard symbol may be determined based on the transmission/reception direction with the IAB node.

(Alternative 4-a) The IAB node and each parent node may determine that x symbols of the parent node having uplink resources are used as guard symbols when the IAB node switches the parent node performing transmission/reception. When the IAB node performs transmission/reception with the parent node 1 through uplink resources up to symbol #n, and transmits/receives with the parent node 2 from symbol #n+1, it can be determined that x symbols before symbol #n are used as guard symbols. As an example, when the IAB node performs transmission/reception with the parent node 1 up to symbol #n, and transmits/receives transmission/reception with the parent node 2 through uplink resources from symbol #n+1, it can be determined that x symbols after symbol #n+1 are used as guard symbols.

For example, when the IAB node switches the parent node performing transmission and reception, if transmission and reception are performed with the parent node through downlink resources before switching, and transmission/reception is also performed with the parent node after switching through downlink resources, from the viewpoint of the IAB node, it may be assumed that the difference in downlink reception timings between the two parent nodes is not large and that the guard symbol is not generated. Alternatively, it may be assumed that the IAB node does not generate a guard symbol because simultaneous reception is possible in the case of downlink reception with two parent nodes. Alternatively, in this case, the method of alternative 4-b described later may be applied.

For example, when the IAB node switches the parent node performing transmission and reception, if transmission and reception are performed with the parent node through uplink resources before switching and transmission/reception is also performed with the parent node after switching through uplink resources, considering the case where two parent nodes do not know each other's downlink/uplink transmission direction information, both parent nodes may generate a guard symbol in the operation resource between itself and the IAB node. For example, when the IAB node performs transmission/reception through uplink resources with the parent node 1 up to symbol #n, and performs an uplink operation with the parent node 2 from symbol #n+1, parent node 1 determines that x1 symbols before symbol #n are used as guard symbols, and parent node 2 may determine that x2 symbols after symbol #n+1 are used as guard symbols. Here, x1 and x2 may be the same as or different from each other. Alternatively, in this case, the method of alternative 4-b described later may be applied.

(Alternative 4-b) In consideration of a case in which two parent nodes can know each other's downlink/uplink transmission direction information, the following operation may be performed.

For example, when the IAB node performs transmission/reception through uplink resources with the parent node before switching of the parent node, and performs transmission/reception with the parent node through uplink resources after switching, it may be determined that the IAB node and each parent node do not generate guard symbols in both transmission/reception resources with the two parent nodes. In this case, each parent node may operate without considering a separate guard symbol. When a collision occurs in uplink transmission resources between two parent nodes, the IAB node may operate as in the operation method of the IAB node when resources collide between two parent links, which will be described later.

In another example, when the IAB node performs transmission/reception through uplink resources with the parent node before switching of the parent node, and performs transmission/reception through uplink resources with the parent node after switching and/or when transmission/reception is performed with the parent node before switching through downlink resources and transmission/reception is also performed with the parent node after switching through downlink resources, the IAB node and each parent node may determine the generation position of the guard symbol using the methods of Alternatives 1 to 3 above.

In this case, the number of guard symbols may be determined as suggested in the above-described guard symbol report/configuration.

Hereinafter, a method of operating an IAB node when resources collide between two parent links will be described.

When the IAB node is connected to two parent nodes and performs downlink reception and/or uplink transmission with two parent nodes non-simultaneous, each parent node generates a guard symbol when the IAB node performs switching of the parent node using one of the methods proposed in this specification, it is possible to prevent the IAB node from having a resource overlap problem due to misalignment of transmit/receive timing with two parent nodes. However, if the switching of the parent node of the IAB node is dynamically changed or the parent node cannot know the switching time of the parent node of the IAB node, etc., from the point of view of the IAB node, a problem in which transmission and reception resources to two parent nodes may overlap may occur. Accordingly, in the following, the operation of the IAB node is proposed when two transmissions/receptions in which the IAB node cannot perform simultaneous transmission/reception operations from two parent nodes are configured/scheduled in overlapping resources.

When an IAB node is connected and operated with two parent nodes, even if the transmit/receive resources for two parent nodes are set/scheduled through different symbol resources, as shown in FIGS. 37 and 39 to 42, resource overlap may occur due to misalignment of transmit/receive timings for two parent nodes. In this case, the IAB node can solve the problem by performing only one transmission/reception of the two transmission/reception and not the other transmission/reception. Hereinafter, a specific method for this is proposed.

(Alternative 1) When the IAB node switches to the parent node to transmit/receive from the parent node 1 to the parent node 2, if there is a collision in transmission/reception resources with two parent nodes, (Alternative 1-a) the IAB node may not perform transmission/reception for the parent node 2 set/scheduled after the parent node is switched. Alternatively, (alternative 1-b) the IAB node may not perform transmission/reception with respect to the parent node 1 set/scheduled before switching of the parent node. Alternatively, (alternative 1-c) the IAB node selects any transmission/reception among transmission/reception for two parent nodes and may not perform the selected transmission/reception.

In the above description, not performing transmission/reception may mean dropping the entire transmission/reception of the corresponding channel/signal or puncturing the corresponding channel/signal in a symbol in which a collision occurs.

(Alternative 2) When the IAB node switches to the parent node to transmit/receive from the parent node 1 to the parent node 2, if there is a collision in transmission/reception resources with two parent nodes, and one of transmission/reception to/from the two parent nodes is an uplink, the IAB node may perform downlink reception without performing uplink transmission during transmission/reception for two parent nodes.

In the above description, not performing transmission/reception may mean dropping the entire transmission/reception of the corresponding channel/signal or puncturing the corresponding channel/signal in a symbol in which a collision occurs.

In this case, when both transmission and reception to the two parent nodes are all downlink or all uplink, the method of Alternative 1 may be used.

Figure 43:
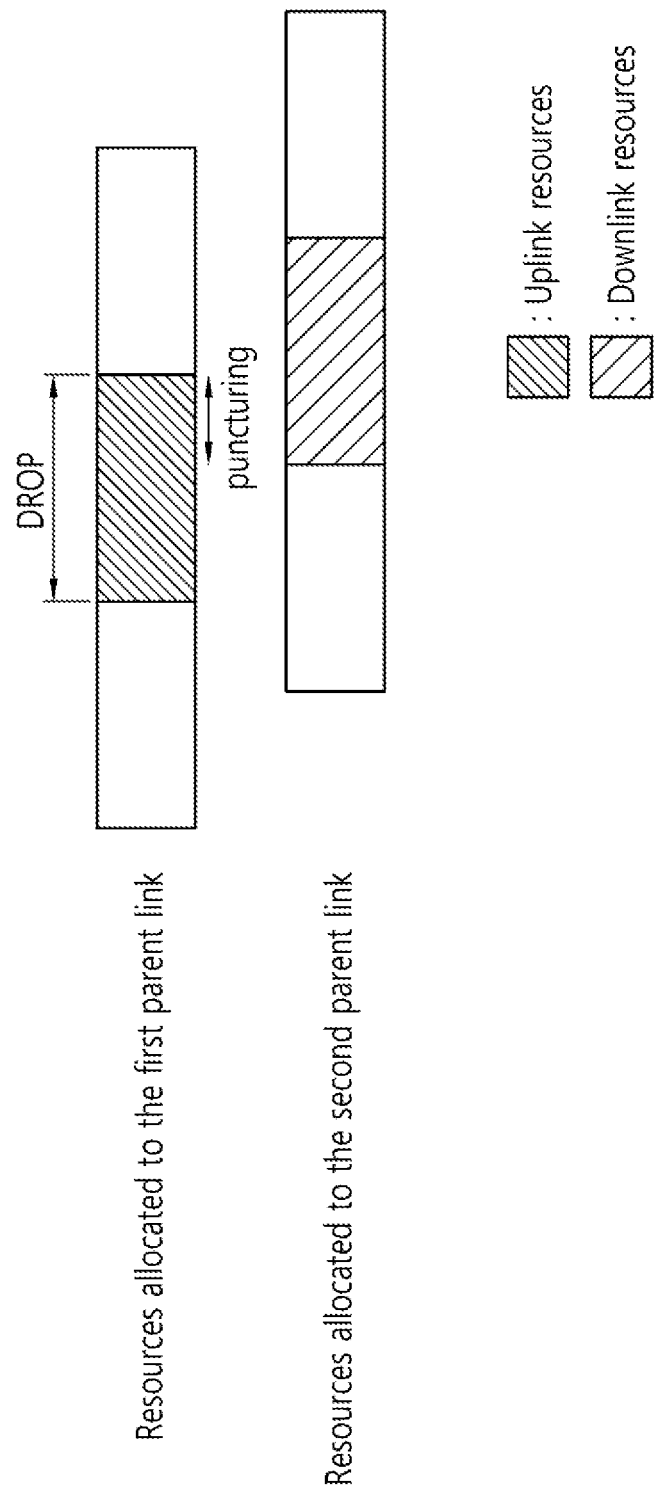
FIG. 43 illustrates an example in which Alternative 2 is applied among operating methods of an IAB node when resources collide between two parent links.

FIG. 43 illustrates an example in which Alternative 2 is applied among operating methods of an IAB node when resources collide between two parent links.

Referring to FIG. 43, the IAB node may switch to communicate with the second parent node while communicating with the first parent node. In this case, a collision situation in which the resource allocated to the first parent link with the first parent node overlaps the resource allocated to the second parent link with the second parent node and transmission directions are different may occur. For example, as shown in FIG. 43, in the overlapped resources, the resource allocated to the first parent link may be an uplink resource, and the resource allocated to the second parent link may be a downlink resource. In this case, the IAB node does not perform uplink transmission on the resource in which the overlap occurs, (that is, the corresponding channel/signal is punctured only in the symbol in which the overlap occurs, or the uplink transmission of the entire corresponding channel/signal in which the overlap occurs is dropped), downlink reception may be performed.

Figure 44:
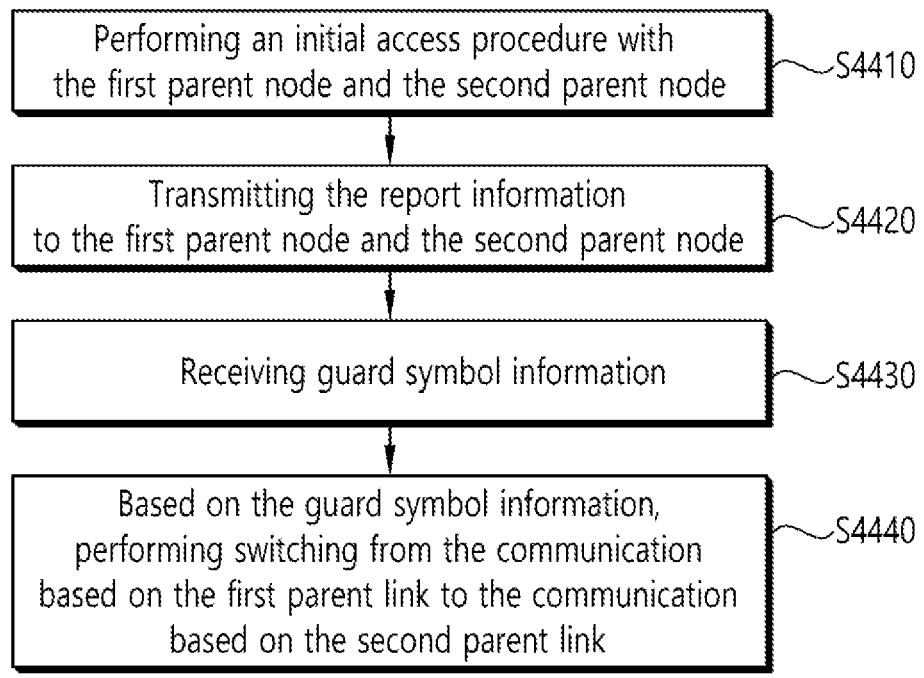
FIG. 44 is a flowchart for an example of a resource setting method of an IAB node according to some implementations of the present specification.

FIG. 44 is a flowchart for an example of a resource setting method of an IAB node according to some implementations of the present specification.

Referring to FIG. 44, the IAB node performs an initial access procedure with the first parent node and the second parent node (S4410). Here, the initial access procedure may refer to the procedure of FIG. 16.

Thereafter, the IAB node transmits the report information to the first parent node and the second parent node (S4420). Here, the report information may indicate overlapping resources between a first parent link with the first parent node and a second parent link with the second parent node.

Thereafter, the IAB node receives guard symbol information (S4430). Here, the guard symbol information may inform the guard symbol configured to the IAB node.

Thereafter, the IAB node performs switching from the communication based on the first parent link to the communication based on the second parent link based on the guard symbol information (S4440).

The claims described herein may be combined in various ways. For example, the technical features of the method claims of the present specification may be combined and implemented as an apparatus, and the technical features of the apparatus claims of the present specification may be combined and implemented as a method. In addition, the technical features of the method claim of the present specification and the technical features of the apparatus claim may be combined to be implemented as an apparatus, and the technical features of the method claim of the present specification and the technical features of the apparatus claim may be combined and implemented as a method.

The methods proposed in the present specification can be performed by the IAB node. In addition, the methods proposed in the present specification can be also performed by at least one computer-readable medium including an instruction based on being executed by at least one processor. The methods proposed in the present specification can be also performed by an apparatus configured to control the IAB node. The apparatus includes one or more processors and one or more memories operably coupled by the one or more processors and storing instructions, wherein the one or more processors execute the instructions to perform the methods proposed herein. Also, it is obvious that, according to the methods proposed in the present specification, an operation by another IAB node corresponding to an operation performed by the IAB node may be considered.

Hereinafter, an example of a communication system to which the present disclosure is applied will be described.

Although not limited thereto, the various descriptions, functions, procedures, proposals, methods, and/or operation flowcharts of the present disclosure disclosed in this document may be applied to various fields requiring wireless communication/connection (e.g., 5G) between devices.

Hereinafter, it will be exemplified in more detail with reference to the drawings. In the following drawings/descriptions, the same reference numerals may represent the same or corresponding hardware blocks, software blocks, or functional blocks, unless otherwise indicated.

Figure 45:
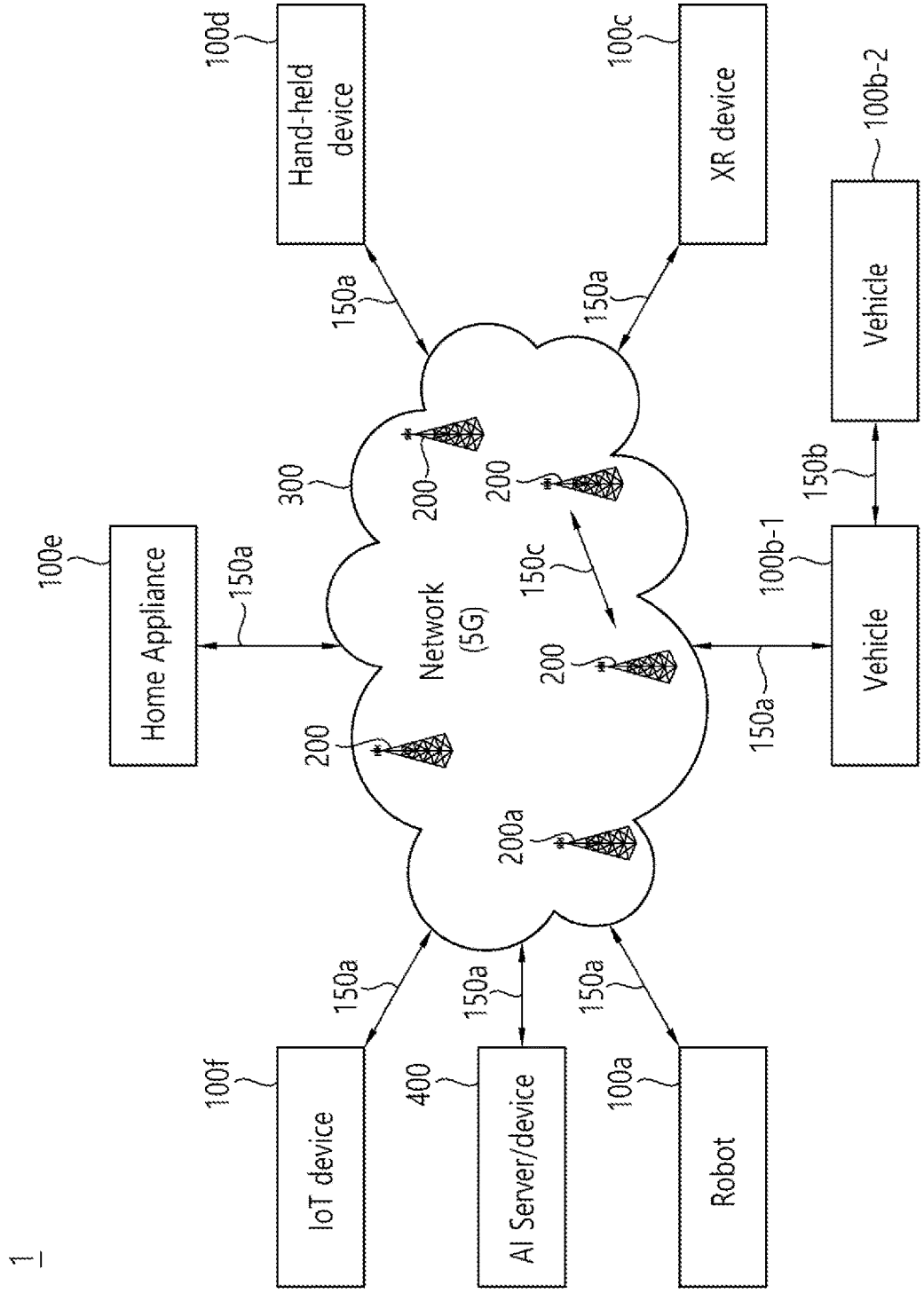
FIG. 45 illustrates a communication system 1 applied to the present specification.

FIG. 45 illustrates a communication system 1 applied to the present disclosure.

Referring to FIG. 45, the communication system 1 applied to the present disclosure includes a wireless device, a base station, and a network. Here, the wireless device refers to a device that performs communication using a wireless access technology (e.g., 5G NR (New RAT), LTE (Long Term Evolution)), and may be referred to as a communication/wireless/5G device. Although not limited thereto, the wireless device may include a robot 100a, a vehicle 100b-1, 100b-2, an eXtended Reality (XR) device 100c, a hand-held device 100d, and a home appliance 100e.), an Internet of Things (IoT) device 100f, and an AI device/server 400. For example, the vehicle may include a vehicle equipped with a wireless communication function, an autonomous driving vehicle, a vehicle capable of performing inter-vehicle communication, and the like. Here, the vehicle may include an Unmanned Aerial Vehicle (UAV) (e.g., a drone). XR devices include AR (Augmented Reality)/VR (Virtual Reality)/MR (Mixed Reality) devices, and it may be implemented in the form of a Head-Mounted Device (HMD), a Head-Up Display (HUD) provided in a vehicle, a television, a smartphone, a computer, a wearable device, a home appliance, a digital signage, a vehicle, a robot, and the like. The portable device may include a smart phone, a smart pad, a wearable device (e.g., a smart watch, smart glasses), a computer (e.g., a laptop computer), and the like. Home appliances may include a TV, a refrigerator, a washing machine, and the like. The IoT device may include a sensor, a smart meter, and the like. For example, the base station and the network may be implemented as a wireless device, and a specific wireless device 200a may operate as a base station/network node to other wireless devices.

Here, the wireless communication technology implemented in the wireless device of the present specification may include a narrowband Internet of Things for low-power communication as well as LTE, NR, and 6G. In this case, for example, the NB-IoT technology may be an example of a Low Power Wide Area Network (LPWAN) technology. In addition, it may be implemented in standards such as LTE Cat NB1 and/or LTE Cat NB2, and is not limited to the above-described name. Additionally or alternatively, the wireless communication technology implemented in the wireless device of the present specification may perform communication based on LTE-M technology. In this case, as an example, the LTE-M technology may be an example of an LPWAN technology, and may be called by various names such as enhanced machine type communication (eMTC). For example, LTE-M technology may be implemented in at least one of various standards such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the above-described name. Additionally or alternatively, the wireless communication technology implemented in the wireless device of the present specification may include at least one of ZigBee, Bluetooth, and Low Power Wide Area Network (LPWAN) in consideration of low-power communication, and is not limited to the above-described name. For example, the ZigBee technology can create PAN (personal area networks) related to small/low-power digital communication based on various standards such as IEEE 802.15.4, and can be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). In addition, the IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 46:
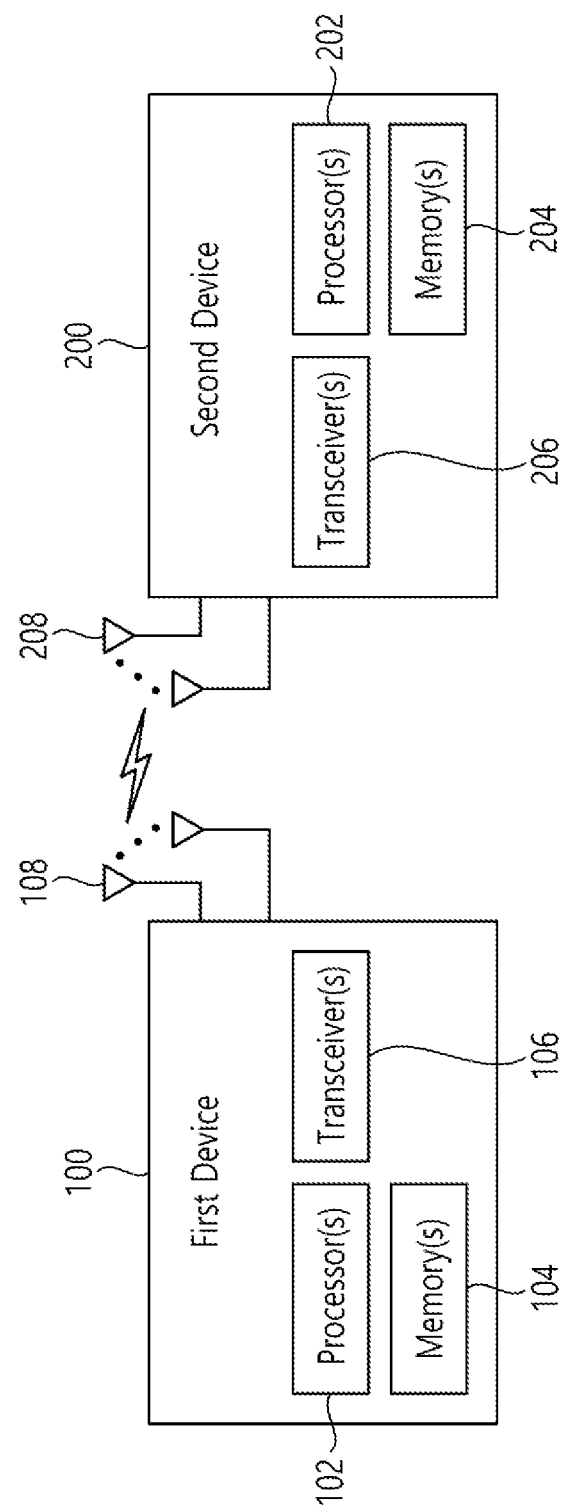
FIG. 46 illustrates a wireless device applicable to the present disclosure.

FIG. 46 illustrates a wireless device applicable to the present disclosure.

Referring to FIG. 46, the first wireless device 100 and the second wireless device 200 may transmit and receive wireless signals through various wireless access technologies (e.g., LTE, NR). Here, {first wireless device 100, second wireless device 200} may correspond to {wireless device 100x, base station 200} and/or {wireless device 100x, wireless device 100x} of FIG. 45.

The first wireless device 100 may include one or more processors 102 and one or more memories 104 and additionally further include one or more transceivers 106 and/or one or more antennas 108. The processors 102 may control the memory 104 and/or the transceivers 106 and may be configured to implement the descriptions, functions, procedures, proposals, methods, and/or operational flowcharts disclosed in this document. For example, the processors 102 may process information within the memory 104 to generate first information/signals and then transmit radio signals including the first information/signals through the transceivers 106. In addition, the processor 102 may receive radio signals including second information/signals through the transceiver 106 and then store information obtained by processing the second information/signals in the memory 104. The memory 104 may be connected to the processory 102 and may store a variety of information related to operations of the processor 102. For example, the memory 104 may store software code including commands for performing a part or the entirety of processes controlled by the processor 102 or for performing the descriptions, functions, procedures, proposals, methods, and/or operational flowcharts disclosed in this document. Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. The transceiver 106 may include a transmitter and/or a receiver. The transceiver 106 may be interchangeably used with a radio frequency (RF) unit. In the present disclosure, the wireless device may represent a communication modem/circuit/chip.

The second wireless device 200 may include one or more processors 202 and one or more memories 204 and additionally further include one or more transceivers 206 and/or one or more antennas 208. The processor 202 may control the memory 204 and/or the transceiver 206 and may be configured to implement the descriptions, functions, procedures, proposals, methods, and/or operational flowcharts disclosed in this document. For example, the processor 202 may process information within the memory 204 to generate third information/signals and then transmit radio signals including the third information/signals through the transceiver 206. In addition, the processor 202 may receive radio signals including fourth information/signals through the transceiver 106 and then store information obtained by processing the fourth information/signals in the memory 204. The memory 204 may be connected to the processor 202 and may store a variety of information related to operations of the processor 202. For example, the memory 204 may store software code including commands for performing a part or the entirety of processes controlled by the processor 202 or for performing the descriptions, functions, procedures, proposals, methods, and/or operational flowcharts disclosed in this document. Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. The transceiver 206 may include a transmitter and/or a receiver. The transceiver 206 may be interchangeably used with an RF unit. In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. In addition, the one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. In addition, the one or more processors 102 and 202 may perform control so that the one or more transceivers 106 and 206 may receive user data, control information, or radio signals from one or more other devices. In addition, the one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 47:
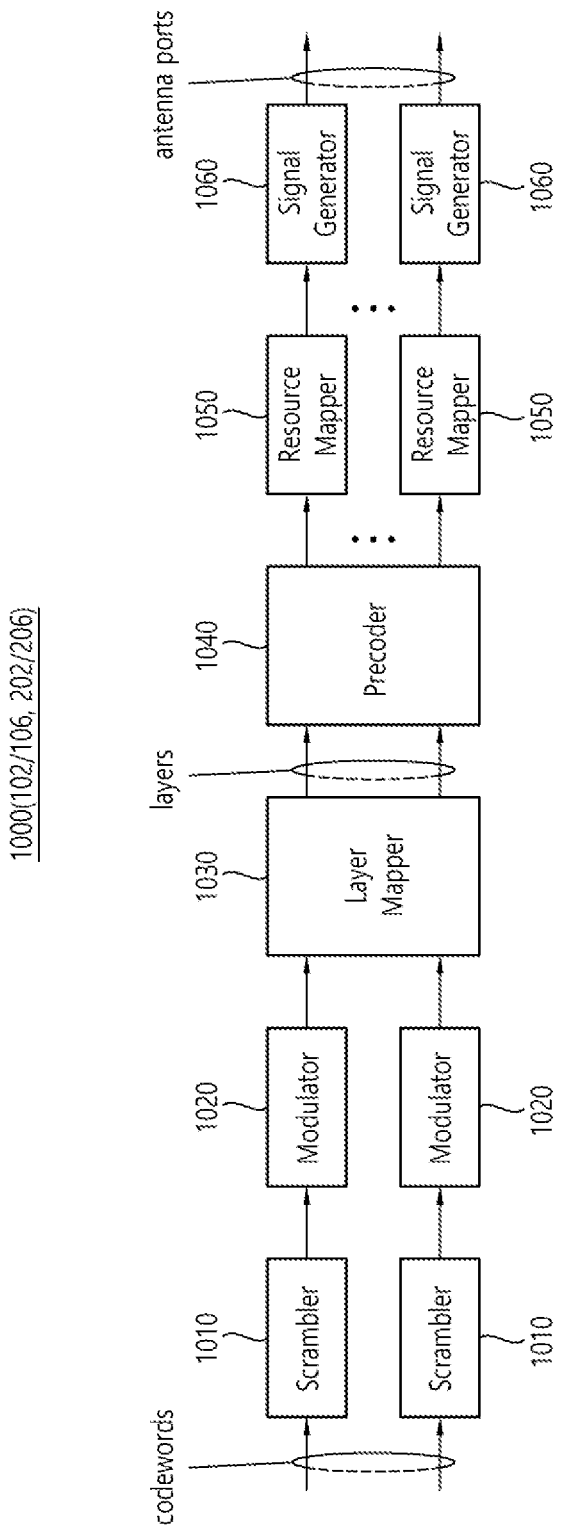
FIG. 47 illustrates a signal processing circuit for a transmission signal.

FIG. 47 exemplifies a signal processing circuit for a transmission signal.

Referring to FIG. 47, a signal processing circuit 1000 includes a scrambler 1010, a modulator 1020, a layer mapper 1030, a precoder 1040, a resource mapper 1050, and a signal generator 1060. The operations/functions of FIG. 47 may be performed in the processors 102 and 202 and/or the transceivers 106 and 206 of FIG. 46 but are not limited thereto. The hardware elements of FIG. 47 may be implemented in the processors 102 and 202 and/or the transceivers 106 and 206 of FIG. 46. For example, blocks 1010 to 1060 may be implemented in the processors 102 and 202 of FIG. 46. In addition, blocks 1010 to 1050 may be implemented in the processors 102 and 202 of FIG. 46, and block 1060 may be implemented in the transceivers 106 and 206 of FIG. 46.

A codeword may be converted into a wireless signal through the signal processing circuit 1000 of FIG. 47. Here, the codeword is an encoded bit sequence of an information block. The information block may include a transport block (e.g., a UL-SCH transport block or a DL-SCH transport block). The wireless signal may be transmitted through various physical channels (e.g., PUSCH or PDSCH).

Specifically, the codeword may be converted into a scrambled bit sequence by the scrambler 1010. The scramble sequence used for scrambling is generated based on an initialization value, and the initialization value may include ID information of a wireless device. The scrambled bit sequence may be modulated by the modulator 1020 into a modulation symbol sequence. The modulation scheme may include pi/2-binary phase shift keying (pi/2-BPSK), m-phase shift keying (m-PSK), m-quadrature amplitude modulation (m-QAM), and the like. The complex modulation symbol sequence may be mapped to one or more transport layers by the layer mapper 1030. The modulation symbols of each transport layer may be mapped to the corresponding antenna port(s) by the precoder 1040 (precoding). An output z of the precoder 1040 may be obtained by multiplying an output y of the layer mapper 1030 by an N*M precoding matrix W. Here, N is the number of antenna ports and M is the number of transmission layers. Here, the precoder 1040 may perform precoding after performing transform precoding (e.g., DFT transform) on complex modulation symbols. Also, the precoder 1040 may perform precoding without performing transform precoding.

The resource mapper 1050 may map modulation symbols of each antenna port to a time-frequency resource. The time-frequency resource may include a plurality of symbols (e.g., CP-OFDMA symbols or DFT-s-OFDMA symbols) in a time domain and may include a plurality of subcarriers in a frequency domain. The signal generator 1060 may generate a wireless signal from the mapped modulation symbols, and the generated wireless signal may be transmitted to another device through each antenna. To this end, the signal generator 1060 may include an inverse fast Fourier transform (IFFT) module, a cyclic prefix (CP) inserter, a digital-to-analog converter (DAC), a frequency uplink converter, and the like.

A signal processing process for a received signal in the wireless device may be configured as the reverse of the signal processing process (1010 to 1060) of FIG. 47. For example, a wireless device (e.g., 100 or 200 in FIG. 46) may receive a wireless signal from the outside through an antenna port/transmitter. The received wireless signal may be converted into a baseband signal through a signal restorer. To this end, the signal restorer may include a frequency downlink converter, an analog-to-digital converter (ADC), a CP canceller, and a fast Fourier transform (FFT) module. Thereafter, the baseband signal may be restored into a codeword through a resource de-mapper process, a postcoding process, a demodulation process, and a de-scramble process. The codeword may be restored to an original information block through decoding. Accordingly, a signal processing circuit (not shown) for a received signal may include a signal restorer, a resource demapper, a postcoder, a demodulator, a descrambler, and a decoder.

Figure 48:
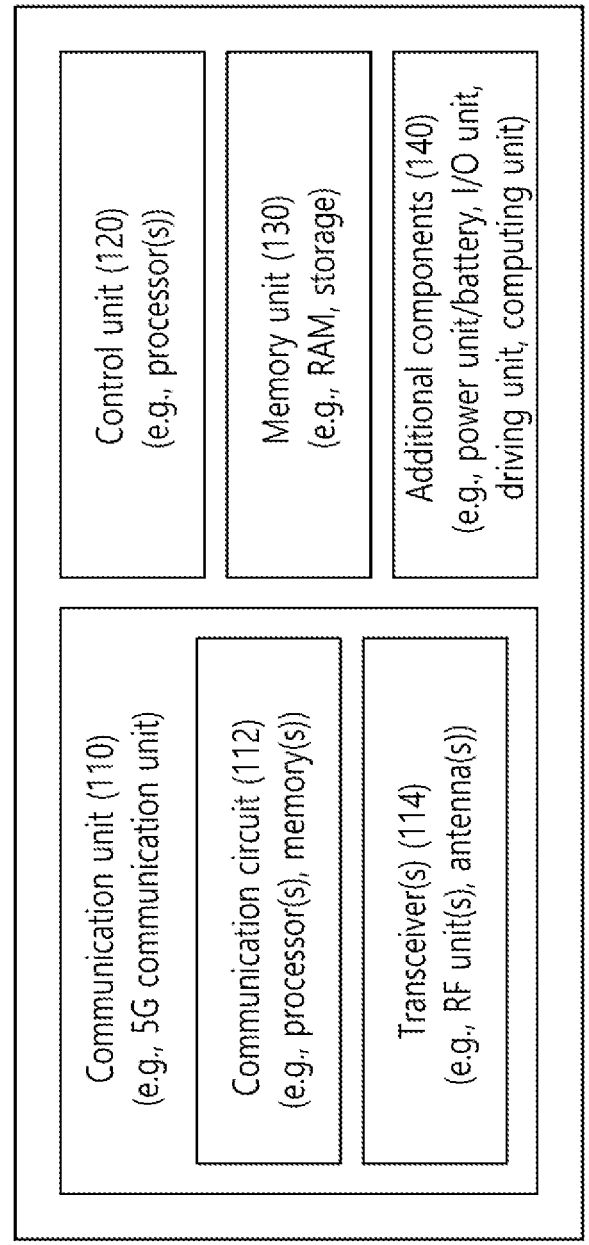
FIG. 48 shows another example of a wireless device applied to the present disclosure.

FIG. 48 shows another example of a wireless device applied to the present disclosure. The wireless device can be implemented in various forms according to use-examples/services (Refer to FIG. 45).

Referring to FIG. 48, wireless devices (100, 200) may correspond to the wireless devices (100, 200) of FIG. 46 and may be configured by various elements, components, units/portions, and/or modules. For example, each of the wireless devices (100, 200) may include a communication unit (110), a control unit (120), a memory unit (130), and additional components (140). The communication unit may include a communication circuit (112) and transceiver(s) (114). For example, the communication circuit (112) may include the one or more processors (102, 202) and/or the one or more memories (104, 204) of FIG. 46. For example, the transceiver(s) (114) may include the one or more transceivers (106, 206) and/or the one or more antennas (108, 208) of FIG. 46. The control unit (120) is electrically connected to the communication unit (110), the memory (130), and the additional components (140) and controls overall operation of the wireless devices. For example, the control unit (120) may control an electric/mechanical operation of the wireless device based on programs/code/instructions/information stored in the memory unit (130). The control unit (120) may transmit the information stored in the memory unit (130) to the exterior (e.g., other communication devices) via the communication unit (110) through a wireless/wired interface or store, in the memory unit (130), information received through the wireless/wired interface from the exterior (e.g., other communication devices) via the communication unit (110).

The additional components (140) may be variously configured according to types of wireless devices. For example, the additional components (140) may include at least one of a power unit/battery, input/output (I/O) unit, a driving unit, and a computing unit. The wireless device may be implemented in the form of, without being limited to, the robot (100a of FIG. 45), the vehicles (100b-1, 100b-2 of FIG. 45), the XR device (100c of FIG. 45), the hand-held device (100d of FIG. 45), the home appliance (100e of FIG. 45), the IoT device (100f of FIG. 45), a digital broadcast UE, a hologram device, a public safety device, an MTC device, a medicine device, a fintech device (or a finance device), a security device, a climate/environment device, the AI server/device (400 of FIG. 45), the BSs (200 of FIG. 45), a network node, and so on. The wireless device may be used in a mobile or fixed place according to a usage-example/service.

In FIG. 48, the entirety of the various elements, components, units/portions, and/or modules in the wireless devices (100, 200) may be connected to each other through a wired interface or at least a part thereof may be wirelessly connected through the communication unit (110). For example, in each of the wireless devices (100, 200), the control unit (120) and the communication unit (110) may be connected by wire and the control unit (120) and first units (e.g., 130, 140) may be wirelessly connected through the communication unit (110). Each element, component, unit/portion, and/or module within the wireless devices (100, 200) may further include one or more elements. For example, the control unit (120) may be configured by a set of one or more processors. As an example, the control unit (120) may be configured by a set of a communication control processor, an application processor, an Electronic Control Unit (ECU), a graphical processing unit, and a memory control processor. As another example, the memory (130) may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 48 will be described in detail with reference to the drawings.

Figure 49:
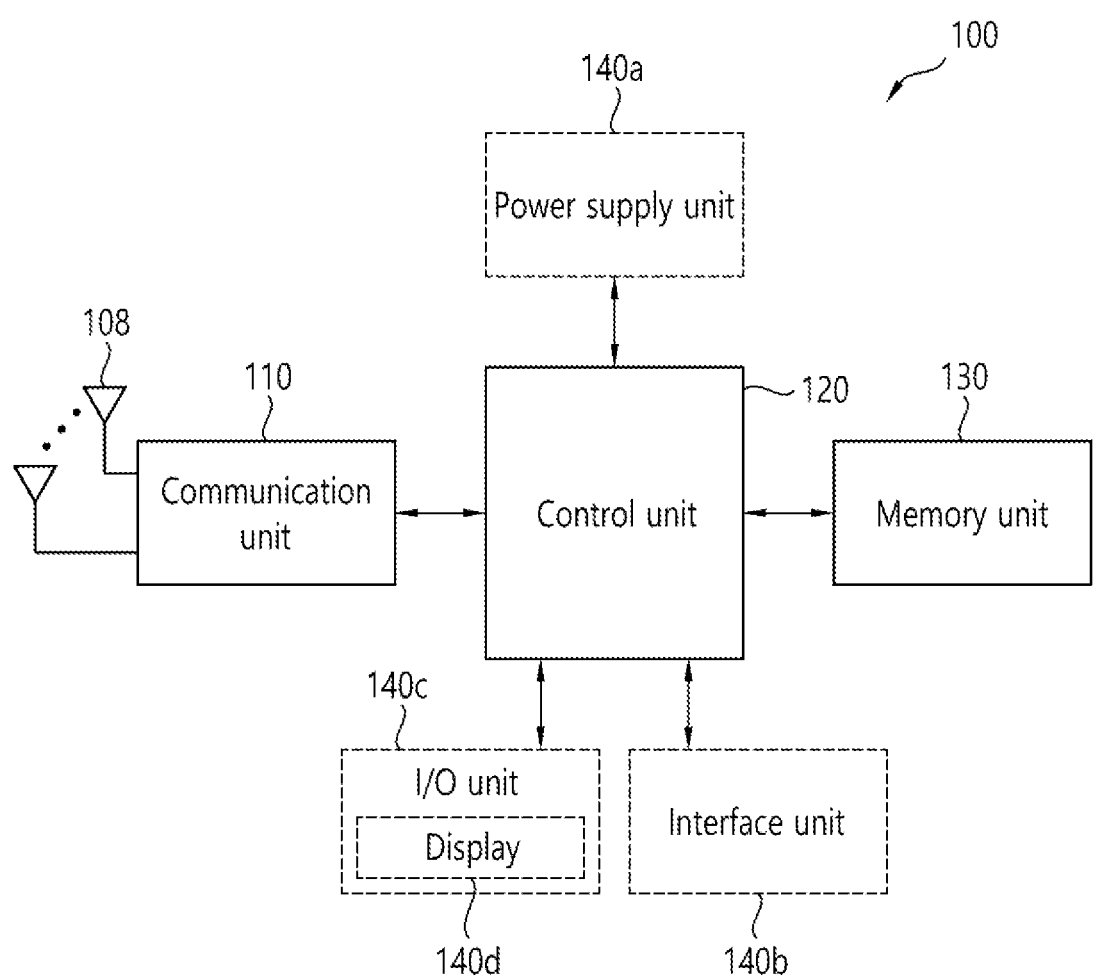
FIG. 49 illustrates a portable device applied to the present disclosure.

FIG. 49 illustrates a portable device applied to the present disclosure. The portable device may include a smartphone, a smart pad, a wearable device (e.g., smart watch or smart glasses), a portable computer (e.g., a notebook), etc. The portable device may be referred to as a mobile station (MS), a user terminal (UT), a mobile subscriber station (MSS), a subscriber station (SS), an advanced mobile station (AMS), or a wireless terminal (WT).

Referring to FIG. 49, the portable device 100 may include an antenna unit 108, a communication unit 110, a controller 120, a memory unit 130, a power supply unit 140a, an interface unit 140b, and input/output unit 140c. The antenna unit 108 may be configured as a part of the communication unit 110. Blocks 110 to 130/140a to 140c correspond to blocks 110 to 130/140 of FIG. 48, respectively.

The communication unit 110 may transmit and receive signals (e.g., data, control signals, etc.) with other wireless devices and BSs. The controller 120 may perform various operations by controlling components of the portable device 100. The controller 120 may include an application processor (AP). The memory unit 130 may store data/parameters/programs/codes/commands required for driving the portable device 100. Also, the memory unit 130 may store input/output data/information, and the like. The power supply unit 140*a* supplies power to the portable device 100 and may include a wired/wireless charging circuit, a battery, and the like. The interface unit 140*b* may support connection between the portable device 100 and other external devices. The interface unit 140*b* may include various ports (e.g., audio input/output ports or video input/output ports) for connection with external devices. The input/output unit 140*c* may receive or output image information/signal, audio information/signal, data, and/or information input from a user. The input/output unit 140*c* may include a camera, a microphone, a user input unit, a display unit 140*d*, a speaker, and/or a haptic module.

For example, in the case of data communication, the input/output unit 140*c* acquires information/signals (e.g., touch, text, voice, image, or video) input from the user, and the acquired information/signals may be stored in the memory unit 130. The communication unit 110 may convert information/signals stored in the memory into wireless signals and may directly transmit the converted wireless signals to other wireless devices or to a BS. In addition, after receiving a wireless signal from another wireless device or a BS, the communication unit 110 may restore the received wireless signal to the original information/signal. The restored information/signal may be stored in the memory unit 130 and then output in various forms (e.g., text, voice, image, video, or haptic) through the input/output unit 140*c*.

Figure 50:
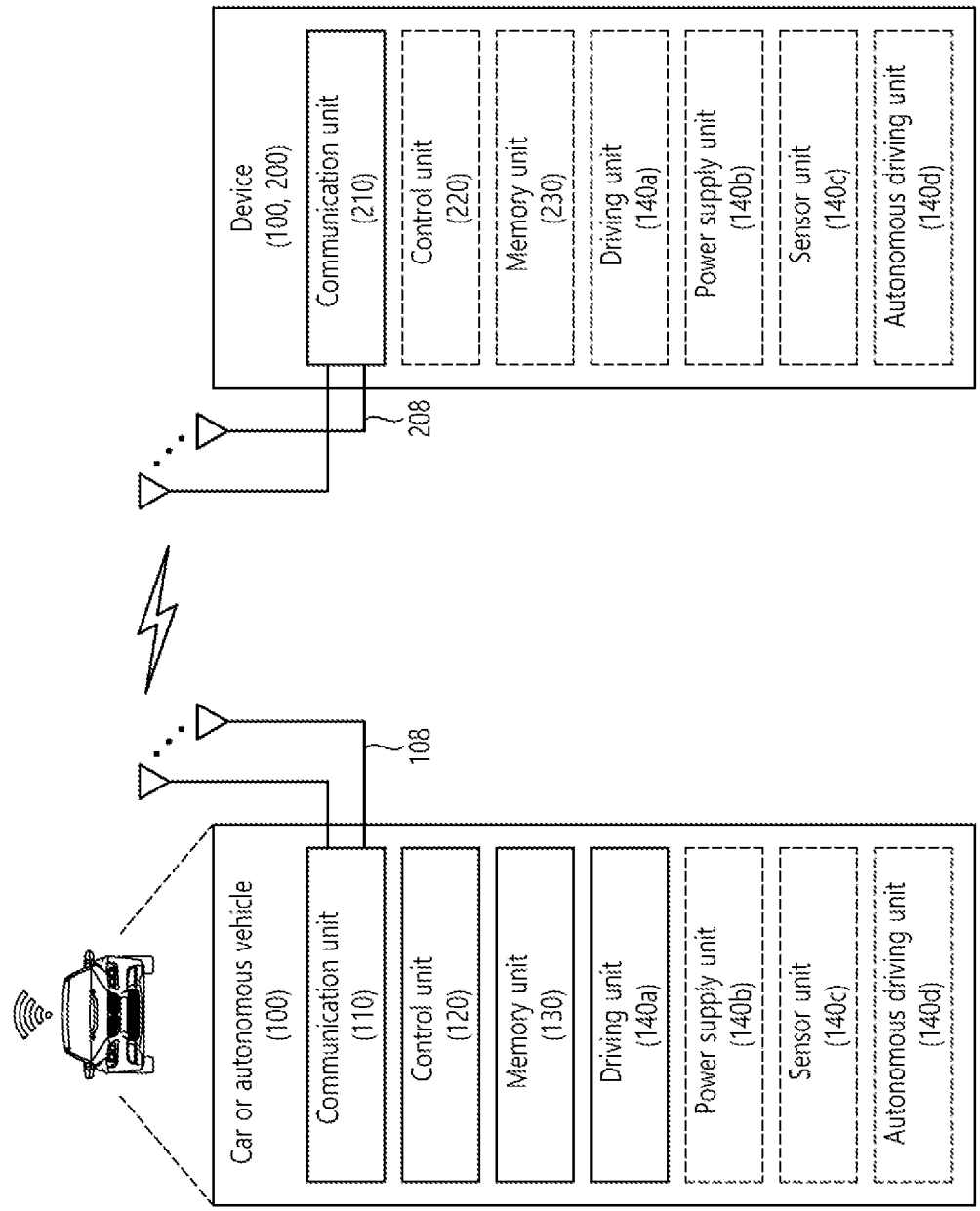
FIG. 50 illustrates a vehicle or an autonomous driving vehicle applied to the present disclosure.

FIG. 50 illustrates a vehicle or an autonomous vehicle applied to the present disclosure. A vehicle or an autonomous vehicle may be implemented as a moving robot, a vehicle, a train, an aerial vehicle (AV), a ship, or the like.

Referring to FIG. 50, a vehicle or autonomous vehicle 100 includes an antenna unit 108, a communication unit 110, a control unit 120, a driving unit 140*a*, a power supply unit 140*b*, and a sensor unit 140*c*, and an autonomous driving unit 140*d*. The antenna unit 108 may be configured as a portion of the communication unit 110. Blocks 110/130/140*a* to 140*d* correspond to blocks 110/130/140 of FIG. 48, respectively.

The communication unit 110 may transmit and receive signals (e.g., data, control signals, etc.) with external devices such as other vehicles, base stations (BSs) (e.g. base station, roadside unit, etc.), and servers. The control unit 120 may perform various operations by controlling elements of the vehicle or the autonomous vehicle 100. The control unit 120 may include an electronic control unit (ECU). The driving unit 140*a* may cause the vehicle or the autonomous vehicle 100 to travel on the ground. The driving unit 140*a* may include an engine, a motor, a power train, a wheel, a brake, a steering device, and the like. The power supply unit 140*b* supplies power to the vehicle or the autonomous vehicle 100, and may include a wired/wireless charging circuit, a battery, and the like. The sensor unit 140*c* may obtain vehicle status, surrounding environment information, user information, and the like. The sensor unit 140*c* may include an inertial measurement unit (IMU) sensor, a collision sensor, a wheel sensor, a speed sensor, an inclination sensor, a weight detection sensor, a heading sensor, a position module, a vehicle forward/reverse sensor, a battery sensor, a fuel sensor, a tire sensor, a steering sensor, a temperature sensor, a humidity sensor, an ultrasonic sensor, an illuminance sensor, a pedal position sensor, etc. The autonomous driving unit 140*d* may implement a technology of maintaining a driving lane, a technology of automatically adjusting a speed such as adaptive cruise control, a technology of automatically traveling along a predetermined route, and a technology of automatically setting a route and traveling when a destination is set.

For example, the communication unit 110 may receive map data, traffic information data, and the like from an external server. The autonomous driving unit 140*d* may generate an autonomous driving route and a driving plan based on the acquired data. The control unit 120 may control the driving unit 140*a* so that the vehicle or the autonomous vehicle 100 moves along the autonomous driving route according to the driving plan (e.g., speed/direction adjustment). During autonomous driving, the communication unit 110 may asynchronously/periodically acquire the latest traffic information data from an external server and may acquire surrounding traffic information data from surrounding vehicles. In addition, during autonomous driving, the sensor unit 140*c* may acquire vehicle state and surrounding environment information. The autonomous driving unit 140*d* may update the autonomous driving route and the driving plan based on newly acquired data/information. The communication unit 110 may transmit information on a vehicle location, an autonomous driving route, a driving plan, and the like to the external server. The external server may predict traffic information data in advance using AI technology or the like based on information collected from the vehicle or autonomous vehicles and may provide the predicted traffic information data to the vehicle or autonomous vehicles.

Figure 51:
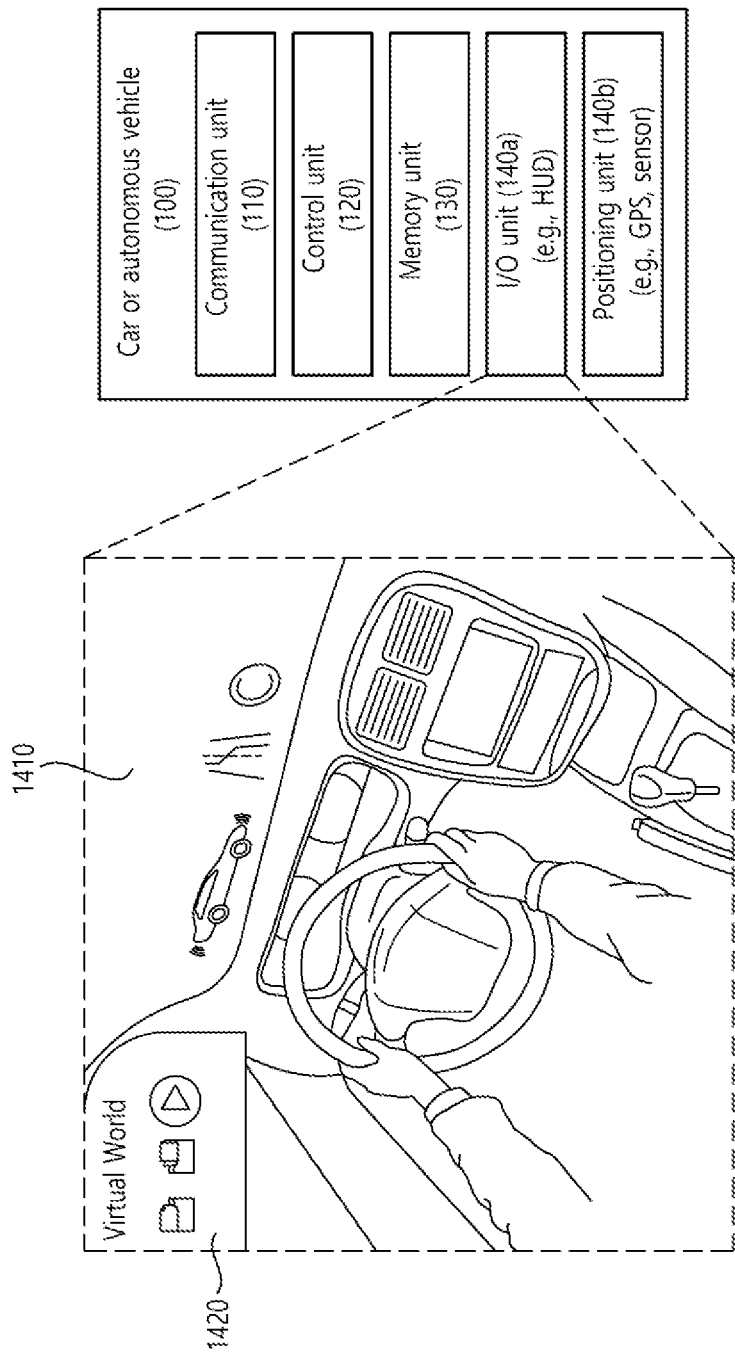
FIG. 51 illustrates a vehicle applied to the present disclosure.

FIG. 51 illustrates a vehicle applied to the present disclosure. Vehicles may also be implemented as means of transportation, trains, aircraft, and ships.

Referring to FIG. 51, the vehicle 100 may include a communication unit 110, a control unit 120, a memory unit 130, an input/output unit 140*a*, and a position measurement unit 140*b*. Here, blocks 110 to 130/140*a* to 140*d* correspond to blocks 110 to 130/140 of FIG. 48, respectively.

The communication unit 110 may transmit and receive signals (e.g., data, control signals, etc.) with other vehicles or external devices such as a BS. The control unit 120 may perform various operations by controlling components of the vehicle 100. The memory unit 130 may store data/parameters/programs/codes/commands supporting various functions of the vehicle 100. The input/output unit 140*a* may output an AR/VR object based on information in the memory unit 130. The input/output unit 140*a* may include a HUD. The location measurement unit 140*b* may acquire location information of the vehicle 100. The location information may include absolute location information of the vehicle 100, location information within a driving line, acceleration information, location information with surrounding vehicles, and the like. The location measurement unit 140*b* may include a GPS and various sensors.

For example, the communication unit 110 of the vehicle 100 may receive map information, traffic information, etc., from an external server and store the information in the memory unit 130. The location measurement unit 140*b* may acquire vehicle location information through GPS and various sensors and store the vehicle location information in the memory unit 130. The control unit 120 may generate a virtual object based the on map information, the traffic information, the vehicle location information, and the like, and the input/output unit 140*a* may display the generated virtual object on a window of the vehicle (1410, 1420). In addition, the control unit 120 may determine whether the vehicle 100 is operating normally within a driving line based on vehicle location information. When the vehicle 100 deviates from the driving line abnormally, the control unit 120 may display a warning on a windshield of the vehicle through the input/output unit 140*a*. In addition, the control unit 120 may broadcast a warning message regarding a driving abnormality to nearby vehicles through the communication unit 110. Depending on a situation, the control unit 120 may transmit location information of the vehicle and information on driving/vehicle abnormalities to related organizations through the communication unit 110.

Figure 52:
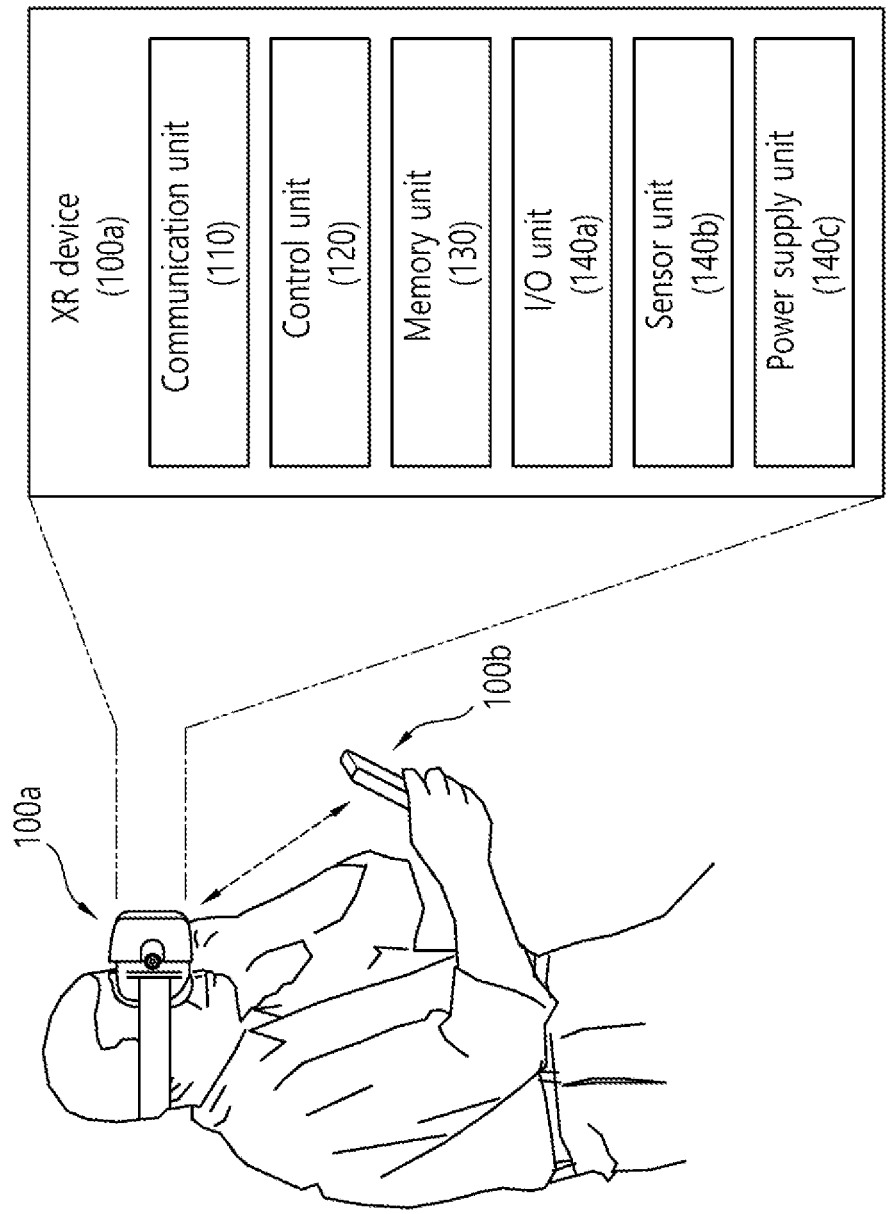
FIG. 52 illustrates an XR device applied to the present disclosure.

FIG. 52 illustrates an XR device applied to the present disclosure. The XR device may be implemented as an HMD, a head-up display (HUD) provided in a vehicle, a television, a smartphone, a computer, a wearable device, a home appliance, a digital signage, a vehicle, a robot, and the like.

Referring to FIG. 52, the XR device 100*a* may include a communication unit 110, a control unit 120, a memory unit 130, an input/output unit 140*a*, a sensor unit 140*b*, and a power supply unit 140*c*. Here, blocks 110 to 130/140*a* to 140*c* correspond to blocks 110 to 130/140 of FIG. 48, respectively.

The communication unit 110 may transmit and receive signals (e.g., media data, control signals, etc.) with external devices such as other wireless devices, portable devices, media servers. Media data may include images, sounds, and the like. The control unit 120 may perform various operations by controlling components of the XR device 100*a*. For example, the control unit 120 may be configured to control and/or perform procedures such as video/image acquisition, (video/image) encoding, and metadata generating and processing. The memory unit 130 may store data/parameters/programs/codes/commands required for driving the XR device 100*a*/generating an XR object. The input/output unit 140*a* may obtain control information, data, etc. from the outside and may output the generated XR object. The input/output unit 140*a* may include a camera, a microphone, a user input unit, a display unit, a speaker, and/or a haptic module. The sensor unit 140*b* may obtain XR device status, surrounding environment information, user information, and the like. The sensor unit 140*b* may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, and/or a radar. The power supply unit 140*c* may supply power to the XR device 100*a* and may include a wired/wireless charging circuit, a battery, and the like.

As an example, the memory unit 130 of the XR device 100*a* may include information (e.g., data, etc.) necessary for generating an XR object (e.g., AR/VR/MR object). The input/output unit 140*a* may acquire a command to manipulate the XR device 100*a* from a user, and the control unit 120 may drive the XR device 100*a* according to the user's driving command. For example, when the user tries to watch a movie, news, etc., through the XR device 100*a*, the control unit 120 may transmit content request information through the communication unit 130 to another device (for example, the portable device 100*b*) or to a media server. The communication unit 130 may download/stream content such as movies and news from another device (e.g., the portable device 100*b*) or the media server to the memory unit 130. The control unit 120 may control and/or perform procedures such as video/image acquisition, (video/image) encoding, and metadata generating/processing for the content, and generate/output an XR object based on information on a surrounding space or a real object through the input/output unit 140*a*/sensor unit 140*b*.

In addition, the XR device 100*a* may be wirelessly connected to the portable device 100*b* through the communication unit 110, and an operation of the XR device 100*a* may be controlled by the portable device 100*b*. For example, the portable device 100*b* may operate as a controller for the XR device 100*a*. To this end, the XR device 100*a* may acquire 3D location information of the portable device 100*b*, generate an XR entity corresponding to the portable device 100*b*, and output the generated XR entity.

Figure 53:
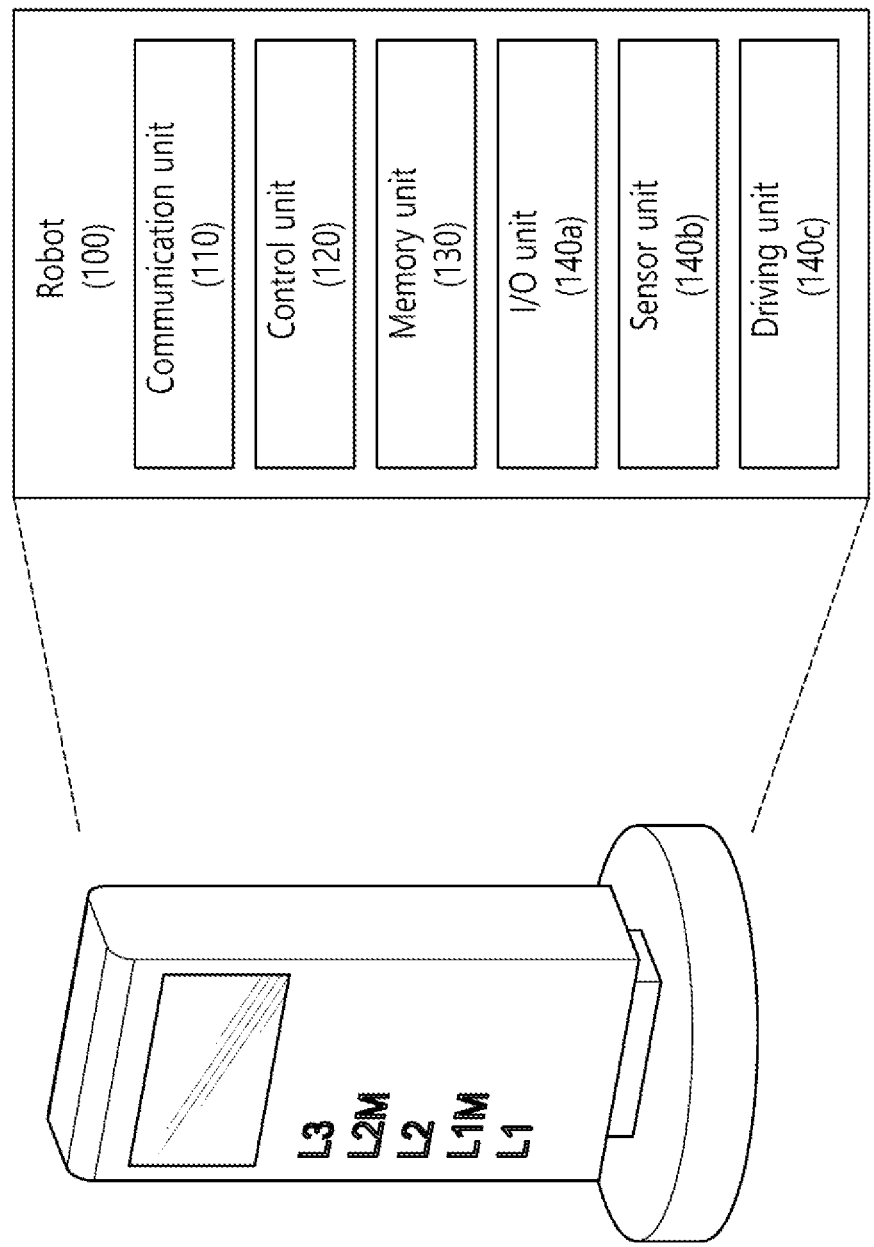
FIG. 53 illustrates a robot applied to the present disclosure.

FIG. 53 illustrates a robot applied to the present disclosure. Robots may be classified as industrial, medical, household, military, etc. depending on the purpose or field of use.

Referring to FIG. 53, a robot 100 may include a communication unit 110, a control unit 120, a memory unit 130, an input/output unit 140*a*, a sensor unit 140*b*, and a driving unit 140*c*. Here, blocks 110 to 130/140*a* to 140*d* correspond to blocks 110 to 130/140 of FIG. 48, respectively.

The communication unit 110 may transmit and receive signals (e.g., driving information, control signals, etc.) with other wireless devices, other robots, or external devices such as a control server. The control unit 120 may perform various operations by controlling components of the robot 100. The memory unit 130 may store data/parameters/programs/codes/commands supporting various functions of the robot 100. The input/output unit 140*a* may acquire information from the outside of the robot 100 and may output the information to the outside of the robot 100. The input/output unit 140*a* may include a camera, a microphone, a user input unit, a display unit, a speaker, and/or a haptic module. The sensor unit 140*b* may obtain internal information, surrounding environment information, user information, and the like of the robot 100. The sensor unit 140*b* may include a proximity sensor, an illuminance sensor, an acceleration sensor, a magnetic sensor, a gyro sensor, an inertial sensor, an IR sensor, a fingerprint recognition sensor, an ultrasonic sensor, an optical sensor, a microphone, a radar, and the like. The driving unit 140*c* may perform various physical operations such as moving a robot joint. In addition, the driving unit 140*c* may cause the robot 100 to travel on the ground or fly in the air. The driving unit 140*c* may include an actuator, a motor, a wheel, a brake, a propeller, and the like.

Figure 54:
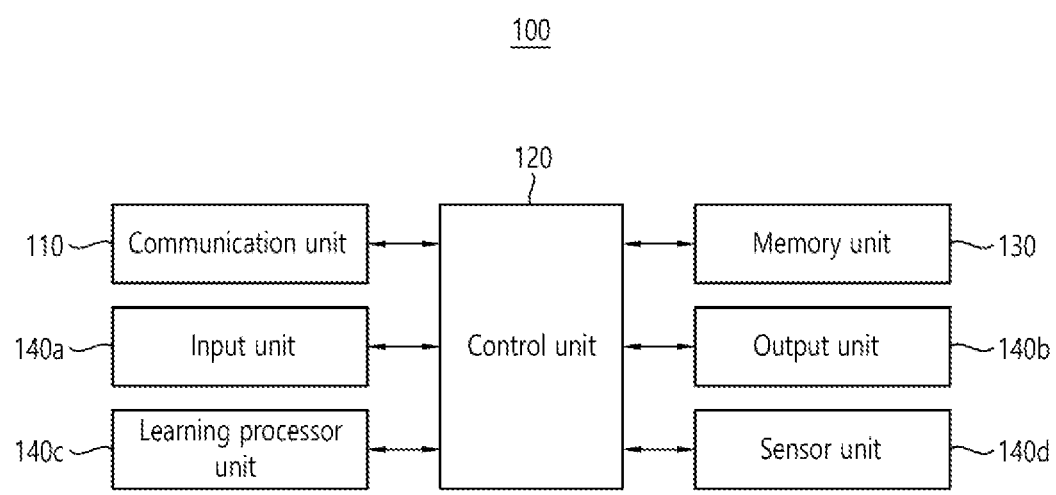
FIG. 54 illustrates an AI device applied to the present disclosure.

FIG. 54 illustrates an AI device applied to the present disclosure. AI devices may be implemented as fixed devices or moving devices such as TVs, projectors, smartphones, PCs, notebooks, digital broadcasting UEs, tablet PCs, wearable devices, set-top boxes (STBs), radios, washing machines, refrigerators, digital signage, robots, vehicles, etc.

Referring to FIG. 54, the AI device 100 may include a communication unit 110, a control unit 120, a memory unit 130, an input/output unit 140*a*/140*b*, a learning processor unit 140*c*, and a sensor unit. Blocks 110 to 130/140*a* to 140*d* correspond to blocks 110 to 130/140 of FIG. 48, respectively.

The communication unit 110 may transmit and receive wireless signals (e.g., sensor information, user input, learning model, control signals, etc.) with external devices such as another AI device (e.g., FIG. 45, 100*x*, 200, or 400) or an AI server (e.g., 400 in FIG. 45) using wired/wireless communication technology. To this end, the communication unit 110 may transmit information in the memory unit 130 to an external device or may transfer a signal received from the external device to the memory unit 130.

The control unit 120 may determine at least one executable operation of the AI device 100 based on information determined or generated using a data analysis algorithm or a machine learning algorithm. In addition, the control unit 120 may perform a determined operation by controlling the components of the AI device 100. For example, the control unit 120 may request, search, receive, or utilize data from the learning processor unit 140*c* or the memory unit 130, and may control components of the AI device 100 to execute a predicted operation among at least one an executable operation or an operation determined to be desirable. In addition, the control unit 120 may collect history information including operation content of the AI device 100 or the user's feedback on the operation, and store the collected information in the memory unit 130 or the learning processor unit 140c or transmit the information to an external device such as an AI server (400 of FIG. 46). The collected historical information may be used to update a learning model.

The memory unit 130 may store data supporting various functions of the AI device 100. For example, the memory unit 130 may store data obtained from the input unit 140a, data obtained from the communication unit 110, output data from the learning processor unit 140c, and data obtained from the sensing unit 140. In addition, the memory unit 130 may store control information and/or software codes necessary for the operation/execution of the control unit 120.

The input unit 140a may acquire various types of data from the outside of the AI device 100. For example, the input unit 140a may acquire training data for model training and input data to which the training model is applied. The input unit 140a may include a camera, a microphone, and/or a user input unit. The output unit 140b may generate output related to visual, auditory, or tactile sense. The output unit 140b may include a display unit, a speaker, and/or a haptic module. The sensing unit 140 may obtain at least one of internal information of the AI device 100, surrounding environment information of the AI device 100, and user information by using various sensors. The sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, and/or a radar.

The learning processor unit 140c may train a model configured as an artificial neural network using training data. The learning processor unit 140c may perform AI processing together with the learning processor unit (400 in FIG. 36) of the AI server. The learning processor unit 140c may process information received from an external device through the communication unit 110 and/or information stored in the memory unit 130. In addition, an output value of the learning processor unit 140c may be transmitted to an external device through the communication unit 110 and/or may be stored in the memory unit 130.

What is claimed is:

1. A method, comprising:
  receiving, by a first parent distributed unit (DU), a DU resource configuration message; and
  using, by the first parent DU, information in the DU resource configuration message for resource coordination,
  wherein the DU resource configuration message comprises DU configuration for a second parent DU,
  wherein the DU configuration for the second parent DU comprises 'Hard Soft NotAvailable' (HSNA) configuration which informs whether a specific resource is a hard resource, a soft resource, or a not available (NA) resource, and
  wherein based on that i) an integrated access and backhaul-mobile terminal (IAB-MT) is configured with the first parent DU included in a master cell group (MCG) and the second parent DU included in a secondary cell group (SCG) ii) the IAB-MT is not capable of simultaneous transmission and reception, iii) the IAB-MT would simultaneously transmit and receive on the first parent DU and the second parent DU, and iv) specific time resources are configured by both the first parent DU and the second parent DU, an operation of the IAB-MT is performed based on scheduling of the first parent DU included in the MCG.

2. The method of claim 1, wherein the first parent DU communicates with the LAB-MT.

3. The method of claim 2, wherein the second parent DU communicates with the LAB-MT.

4. The method of claim 3, wherein whether the first parent DU can communicate with the LAB-MT in the specific resource is determined based on DU configuration for the first parent DU and the DU configuration for the second parent DU.

5. The method of claim 1, wherein the specific time resources are flexible symbols.

6. A first parent distributed unit (DU), comprising:
  at least one memory storing instructions;
  at least one transceiver; and
  at least one processor coupling the at least one memory and the at least one transceiver,
  wherein the at least one memory stores instructions that, based on being executed by the at least one processor, cause the at least one processor to perform operations comprising:
  receives a DU resource configuration message; and
  uses information in the DU resource configuration message for resource coordination,
  wherein the DU resource configuration message comprises DU configuration for a second parent DU,
  wherein the DU configuration for the second parent DU comprises 'Hard Soft NotAvailable' (HSNA) configuration which informs whether a specific resource is a hard resource, a soft resource, or a not available (NA) resource, and
  wherein based on that i) an integrated access and backhaul-mobile terminal (IAB-MT) is configured with the first parent DU included in a master cell group (MCG) and the second parent DU included in a secondary cell group (SCG) ii) the IAB-MT is not capable of simultaneous transmission and reception, iii) the IAB-MT would simultaneously transmit and receive on the first parent DU and the second parent DU, and iv) specific time resources are configured by both the first parent DU and the second parent DU, an operation of the IAB-MT is performed based on scheduling of the first parent DU included in the MCG.

7. The first parent DU of claim 6, wherein the first parent DU communicates with the IAB-MT.

8. The first parent DU of claim 7, wherein the second parent DU communicates with the IAB-MT.

9. The first parent DU of claim 8, wherein whether the first parent DU can communicate with the LAB-MT in the specific resource is determined based on DU configuration for the first parent DU and the DU configuration for the second parent DU.

10. The first parent DU of claim 6, wherein the specific time resources are flexible symbols.

11. An apparatus configured to control a first parent distributed unit (DU), the apparatus comprising:
  at least one processor; and
  at least one memory operably connected to the at least one processor, wherein the at least one memory stores instructions that, based on being executed by the at least one processor, cause the at least one processor to perform operations comprising:
  receive a DU resource configuration message; and use information in the DU resource configuration message for resource coordination, wherein the DU resource configuration message comprises DU configuration for a second parent DU, wherein the DU configuration for the second parent DU comprises 'Hard Soft NotAvailable' (HSNA) configuration which informs whether a specific resource is a hard resource, a soft resource, or a not available (NA) resource, and wherein based on that i) an integrated access and backhaul-mobile terminal (IAB-MT) is configured with the first parent DU included in a master cell group (MCG) and the second parent DU included in a secondary cell group (SCG) ii) the IAB-MT is not capable of simultaneous transmission and reception, iii) the IAB-MT would simultaneously transmit and receive on the first parent DU and the second parent DU, and iv) specific time resources are configured by both the first parent DU and the second parent DU, an operation of the IAB-MT is performed based on scheduling of the first parent DU included in the MCG.

12. The apparatus of claim 11, wherein the specific time resources are flexible symbols.

* * * * *